United States Patent
Pedregal et al.

(10) Patent No.: US 8,832,062 B1
(45) Date of Patent: Sep. 9, 2014

(54) EXPERIENCE SHARING SYSTEM AND METHOD

(75) Inventors: Christopher Pedregal, New York, NY (US); Michael J. LeBeau, New York, NY (US); Mathew Cowan, New York, NY (US)

(73) Assignee: Google Inc., Mountain View, CA (US)

( * ) Notice: Subject to any disclaimer, the term of this patent is extended or adjusted under 35 U.S.C. 154(b) by 110 days.

(21) Appl. No.: 13/362,986

(22) Filed: Jan. 31, 2012

(51) Int. Cl.
*G06F 17/30* (2006.01)

(52) U.S. Cl.
USPC ........... 707/707; 707/706; 707/722; 707/758; 707/759; 707/779

(58) Field of Classification Search
CPC .............................................. G06F 17/30867
USPC .................. 707/706, 707, 722, 758, 759, 779
See application file for complete search history.

(56) References Cited

U.S. PATENT DOCUMENTS

| | | | |
|---|---|---|---|
| 5,940,803 A | 8/1999 | Kanemitsu | |
| 5,948,040 A | 9/1999 | DeLorme et al. | |
| 6,249,741 B1 | 6/2001 | Iwasaki et al. | |
| 7,669,123 B2 | 2/2010 | Zuckerberg et al. | |
| 7,725,492 B2 | 5/2010 | Sittig et al. | |
| 7,809,805 B2 | 10/2010 | Stremel et al. | |
| 7,827,208 B2 | 11/2010 | Bosworth et al. | |
| 7,945,653 B2 | 5/2011 | Zuckerberg et al. | |
| 8,136,145 B2 | 3/2012 | Fetterman et al. | |
| 8,150,844 B2 | 4/2012 | Redstone et al. | |
| 8,171,128 B2 | 5/2012 | Zuckerberg et al. | |
| 2004/0205065 A1 | 10/2004 | Petras et al. | |
| 2005/0234750 A1 | 10/2005 | Attebury | |
| 2006/0031258 A1 | 2/2006 | Seed | |
| 2006/0075019 A1 | 4/2006 | Donovan et al. | |
| 2006/0212319 A1 | 9/2006 | Strothmann et al. | |
| 2007/0143155 A1 | 6/2007 | Whitsett et al. | |
| 2007/0255807 A1 | 11/2007 | Hayashi et al. | |
| 2008/0046298 A1 | 2/2008 | Ben-Yehuda et al. | |
| 2008/0091482 A1 | 4/2008 | Whitsett et al. | |
| 2008/0222295 A1 | 9/2008 | Robinson et al. | |
| 2008/0234921 A1 | 9/2008 | Groenhuijzen et al. | |
| 2009/0216633 A1 | 8/2009 | Whitsett et al. | |
| 2009/0248516 A1 | 10/2009 | Gross | |
| 2009/0265197 A1 | 10/2009 | Chan | |
| 2009/0313055 A1 | 12/2009 | Martin et al. | |

(Continued)

OTHER PUBLICATIONS

International Search Report and Written Opinion mailed Apr. 8, 2013 in PCT/US2013/124108.

*Primary Examiner* — Etienne Leroux
*Assistant Examiner* — Cindy Nguyen
(74) *Attorney, Agent, or Firm* — Patent Law Works LLP

(57) ABSTRACT

A method, computer program product, and computing system for the sharing of experiences is provided. The method may include receiving an indication of an experience search to be performed on the experience database, wherein the experience search defines one or more search criteria and is associated with one or more extrinsic conditions. The method may also include searching the experience database based, at least in part, upon one or more search criteria to generate a result set including a plurality of experience data cards. The method may further include sequencing, the plurality of experience data cards based at least in part upon the extrinsic conditions. The method may also include generating a sequence result set based at least in part on the sequenced experience data cards and presenting at least a portion of the sequence result set to a user.

33 Claims, 49 Drawing Sheets

(56) References Cited

U.S. PATENT DOCUMENTS

| | | |
|---|---|---|
| 2010/0049852 A1 | 2/2010 | Whitnah et al. |
| 2010/0088190 A1 | 4/2010 | Fliess et al. |
| 2010/0293105 A1 | 11/2010 | Blinn et al. |
| 2010/0329572 A1 | 12/2010 | Kamay et al. |
| 2011/0004831 A1 | 1/2011 | Steinberg et al. |
| 2011/0022426 A1 | 1/2011 | Eijdenberg et al. |
| 2011/0022529 A1 | 1/2011 | Barsoba et al. |
| 2011/0047119 A1 | 2/2011 | Kaplan |
| 2011/0099201 A1 | 4/2011 | Shen et al. |
| 2011/0179029 A1* | 7/2011 | Kim et al. .................... 707/737 |
| 2011/0191417 A1 | 8/2011 | Rathod |
| 2011/0208822 A1* | 8/2011 | Rathod .......................... 709/206 |
| 2011/0211737 A1 | 9/2011 | Krupka et al. |
| 2011/0231383 A1 | 9/2011 | Smyth et al. |
| 2011/0276396 A1 | 11/2011 | Rathod |
| 2011/0283172 A1 | 11/2011 | Berger et al. |
| 2011/0301835 A1* | 12/2011 | Bongiorno .................... 701/201 |
| 2011/0307463 A1 | 12/2011 | Kasterstein et al. |
| 2012/0084362 A1 | 4/2012 | McBrearty |
| 2012/0095862 A1 | 4/2012 | Schiff et al. |
| 2012/0109953 A1 | 5/2012 | Brown |
| 2012/0209902 A1 | 8/2012 | Outerbridge |
| 2012/0221964 A1 | 8/2012 | Markel |
| 2012/0311032 A1 | 12/2012 | Murphy et al. |
| 2012/0331053 A1 | 12/2012 | Dunn |
| 2013/0198277 A1 | 8/2013 | Pedregal et al. |

* cited by examiner

2100

Google | Blarney Stone | GO

2102

Kiss The Blarney Stone  [ Generate experience data card ]  2106
www.blarneycastle.ie/pages/kiss-the-blarney-stone  2104
The Stone of Eloquence For over 200 years, world statesmen, literary giants, and legends of the silver screen have joined the millions of pilgrims climbing the ...

Blarney Castle  [ Generate experience data card ]
www.blarneycastle.ie/
Now that might have something to do with the Blarney Stone, the legendary Stone of Eloquence, found at the top of our Tower. Kiss it and you'll never again be ...

The Blarney Stone  [ Generate experience data card ]
www.blarneystoneboston.com/
The Blarney Stone. The Feed. Chef's Winter Menu starting this evening, Tue Jan 10th, so exciting... Items such as Crispy Pork Belly, Crab Arancini and Coq au ...
8 Google reviews - Write a review
1509 Dorchester Avenue  Dorchester, MA 02122-1346
(617) 436-8223

Blarney Stone - Wikipedia, the free encyclopedia  [ Generate experience data card ]
en.wikipedia.org/wiki/Blarney_Stone
The Blarney Stone (Irish: Cloch na Blarnan) is a block of bluestone built into the battlements of Blarney Castle, Blarney, about 8 kilometres (5 mi) from Cork, ...
Origins - Ritual - Legend - References

EXPERIENCE SHARING SYSTEM AND METHOD

TECHNICAL FIELD

This disclosure relates to social networks and, more particularly, to experience-based social networks.

BACKGROUND

As technology continues to advance, people are increasingly more likely to consume content via a computer, as opposed to via traditional printed publications. Oftentimes, when consuming such content, the consumer's interest may be piqued concerning something that they would like to do in the future (e.g. dine at the top of the Eiffel Tower, take a white water rafting ride through the Grand Canyon, ski the Andes Mountains in Chile). Quite often, these ideas would be stashed away in a person's mind and quickly forgotten, especially when they concern discrete details that are difficult to recall (e.g. eating a chocolate croissant at a certain French bakery in New York City). Alternatively, people may attempt to compile a to do list concerning these experiences that they would like to someday experience. However, unless this to do list is readily available, it will oftentimes not be used or, alternatively, may grow to an unmanageable size/complexity.

SUMMARY OF DISCLOSURE

In a first implementation, a method of browsing experience data cards executes on a client electronic device. The method includes accessing, via the client electronic device, an experience database. The experience database includes a plurality of experience data cards that are each associated with an experience and are each accessible by users of the experience database. A first experience data card, chosen from the plurality of experience data cards, is rendered on a display associated with the client electronic device. A browse indication is received on a physical interface associated with the client electronic device, requesting that the client electronic device render a second experience data card, chosen from the plurality of experience data cards. The browse indication is generated in response to a user sweeping a finger in an essentially linear fashion across the physical interface included within the client electronic device. The second experience data card is rendered on the display associated with the client electronic device based at least in part based upon the received browse indication.

One or more of the following features may be included. A select indication may be received on the client electronic device, requesting that the client electronic device tag the second experience data card. The select indication may be generated in response to the user sweeping a finger in an essentially vertical fashion across the physical interface included within the client electronic device. The second experience data card may be tagged. Tagging the second experience data card may include adding the second experience data card to an experience to-do list associated with the user on the experience database. Tagging the second experience data card may include adding the second experience data card to a review list associated with the user on the experience database. The display associated with the client electronic device may include a touch screen display and the physical interface associated with the client electronic device may be the touch screen display.

Sweeping the finger in an essentially linear fashion across the physical interface included within the client electronic device may include sweeping the finger in an essentially horizontal fashion across the physical interface included within the client electronic device. Sweeping the finger in an essentially horizontal fashion across the display included within the client electronic device may include one of more of: sweeping the finger in a left-to-right, essentially horizontal fashion across the display included within the client electronic device to iteratively cycle through the plurality of experience data cards included within the experience database in a first direction; and sweeping the finger in a right-to-left, essentially horizontal fashion across the display included within the client electronic device to iteratively cycle through the plurality of experience data cards included within the experience database in a second direction.

In another implementation, a computer program product resides on a computer readable medium and has a plurality of instructions stored on it. When executed by a processor, the instructions cause the processor to perform operations including accessing, via the client electronic device, an experience database. The experience database includes a plurality of experience data cards that are each associated with an experience and are each accessible by users of the experience database. A first experience data card, chosen from the plurality of experience data cards, is rendered on a display associated with the client electronic device. A browse indication is received on a physical interface associated with the client electronic device, requesting that the client electronic device render a second experience data card, chosen from the plurality of experience data cards. The browse indication is generated in response to a user sweeping a finger in an essentially linear fashion across the physical interface included within the client electronic device. The second experience data card is rendered on the display associated with the client electronic device based at least in part based upon the received browse indication.

One or more of the following features may be included. A select indication may be received on the client electronic device, requesting that the client electronic device tag the second experience data card. The select indication may be generated in response to the user sweeping a finger in an essentially vertical fashion across the physical interface included within the client electronic device. The second experience data card may be tagged. Tagging the second experience data card may include adding the second experience data card to an experience to-do list associated with the user on the experience database. Tagging the second experience data card may include adding the second experience data card to a review list associated with the user on the experience database. The display associated with the client electronic device may include a touch screen display and the physical interface associated with the client electronic device may be the touch screen display.

Sweeping the finger in an essentially linear fashion across the physical interface included within the client electronic device may include sweeping the finger in an essentially horizontal fashion across the physical interface included within the client electronic device. Sweeping the finger in an essentially horizontal fashion across the display included within the client electronic device may include one of more of: sweeping the finger in a left-to-right, essentially horizontal fashion across the display included within the client electronic device to iteratively cycle through the plurality of experience data cards included within the experience database in a first direction; and sweeping the finger in a right-to-left, essentially horizontal fashion across the display included within the client electronic device to iteratively cycle through the plurality of experience data cards included within the experience database in a second direction.

In another implementation, a computing system includes at least one processor and at least one memory architecture coupled with the at least one processor. One or more software modules are executed on the at least one processor and the at least one memory architecture and perform operation including accessing, via the client electronic device, an experience database. The experience database includes a plurality of experience data cards that are each associated with an experience and are each accessible by users of the experience database. A first experience data card, chosen from the plurality of experience data cards, is rendered on a display associated with the client electronic device. A browse indication is received on a physical interface associated with the client electronic device, requesting that the client electronic device render a second experience data card, chosen from the plurality of experience data cards. The browse indication is generated in response to a user sweeping a finger in an essentially linear fashion across the physical interface included within the client electronic device. The second experience data card is rendered on the display associated with the client electronic device based at least in part based upon the received browse indication.

One or more of the following features may be included. A select indication may be received on the client electronic device, requesting that the client electronic device tag the second experience data card. The select indication may be generated in response to the user sweeping a finger in an essentially vertical fashion across the physical interface included within the client electronic device. The second experience data card may be tagged. Tagging the second experience data card may include adding the second experience data card to an experience to-do list associated with the user on the experience database. Tagging the second experience data card may include adding the second experience data card to a review list associated with the user on the experience database. The display associated with the client electronic device may include a touch screen display and the physical interface associated with the client electronic device may be the touch screen display.

Sweeping the finger in an essentially linear fashion across the physical interface included within the client electronic device may include sweeping the finger in an essentially horizontal fashion across the physical interface included within the client electronic device. Sweeping the finger in an essentially horizontal fashion across the display included within the client electronic device may include one of more of: sweeping the finger in a left-to-right, essentially horizontal fashion across the display included within the client electronic device to iteratively cycle through the plurality of experience data cards included within the experience database in a first direction; and sweeping the finger in a right-to-left, essentially horizontal fashion across the display included within the client electronic device to iteratively cycle through the plurality of experience data cards included within the experience database in a second direction.

In a first implementation, a method for sharing experiences is provided. The method may include receiving user commentary concerning a user experience and generating a user experience data card for the user experience based, at least in part, upon the user commentary. The method may further include storing the user experience data card, wherein the stored user experience data card corresponds to a first view of the user experience data card and receiving a request for an experience data card from a second user. The method may further include providing the user experience data card to the second user at least in part based on the request received from the second user and receiving feedback from the second user concerning the user experience data card. The method may also include generating a second view of the user experience data card based, at least in part, upon the feedback from the second user, wherein the second view of the user experience data card is distinct form the first view of the experience data card.

One of more of the following features may be included. The method may include receiving a second request for a second request experience data card from a third user and determining whether to present the experience data card to the third user in response to the second request. When it is determined to present the experience data card to the third user based on the second request, the method may include determining whether to present the third user with the first view of the experience data card or the second view of the experience data card. The method may further include presenting either the first view of the experience data card or the second view of the experience data card to the third user. In some embodiments, determining whether to present the third user with the first view or the second view of the experience data card may include determining a first social affinity of the third user with the first user and a second social affinity and determining whether to present the third user with the first view or the second view of the experience data card based, at least, in part, upon at least one of the first social affinity and the second social affinity. In some embodiments, the user commentary may include text-based commentary, video-based commentary, audio-based commentary, and/or photographic commentary. The method may further include enabling the second user to save the user experience data card to a second user future experience list. In some embodiments, the experience data card may be associated with geographic data.

In another implementation, a computer program product resides on a computer readable medium and has a plurality of instructions stored on it. When executed by a processor, the instructions cause the processor to perform operations including receiving user commentary concerning a user experience and generating a user experience data card for the user experience based, at least in part, upon the user commentary. Operations may further include storing the user experience data card, wherein the stored user experience data card corresponds to a first view of the user experience data card and receiving a request for an experience data card from a second user. Operations may further include providing the user experience data card to the second user at least in part based on the request received from the second user and receiving feedback from the second user concerning the user experience data card. Operations may also include generating a second view of the user experience data card based, at least in part, upon the feedback from the second user, wherein the second view of the user experience data card is distinct form the first view of the experience data card.

One of more of the following features may be included. Operations may include receiving a second request for a second request experience data card from a third user and determining whether to present the experience data card to the third user in response to the second request. When it is determined to present the experience data card to the third user based on the second request, the method may include determining whether to present the third user with the first view of the experience data card or the second view of the experience data card. Operations may further include presenting either the first view of the experience data card or the second view of the experience data card to the third user. In some embodiments, determining whether to present the third user with the first view or the second view of the experience data card may include determining a first social affinity of the third user with the first user and a second social affinity and determining whether to present the third user with the first view or the second view of the experience data card based, at least in part, upon at least one of the first social affinity and the second social affinity. In some embodiments, the user commentary may include text-based commentary, video-based commentary, audio-based commentary, and/or photographic commentary. Operations may further include enabling the second user to save the user experience data card to a second user future experience list. In some embodiments, the experience data card may be associated with geographic data.

In another implementation, a computing system includes at least one processor and at least one memory architecture coupled with the at least one processor. One or more software modules are executed on the at least one processor and the at least one memory architecture and perform operation including receiving user commentary concerning a user experience and generating a user experience data card for the user experience based, at least in part, upon the user commentary. Operations may further include storing the user experience data card, wherein the stored user experience data card corresponds to a first view of the user experience data card and receiving a request for an experience data card from a second user. Operations may further include providing the user experience data card to the second user at least in part based on the request received from the second user and receiving feedback from the second user concerning the user experience data card. Operations may also include generating a second view of the user experience data card based, at least in part, upon the feedback from the second user, wherein the second view of the user experience data card is distinct form the first view of the experience data card.

One of more of the following features may be included. Operations may include receiving a second request for a second request experience data card from a third user and determining whether to present the experience data card to the third user in response to the second request. When it is determined to present the experience data card to the third user based on the second request, the method may include determining whether to present the third user with the first view of the experience data card or the second view of the experience data card. Operations may further include presenting either the first view of the experience data card or the second view of the experience data card to the third user. In some embodiments, determining whether to present the third user with the first view or the second view of the experience data card may include determining a first social affinity of the third user with the first user and a second social affinity and determining whether to present the third user with the first view or the second view of the experience data card based, at least in part, upon at least one of the first social affinity and the second social affinity. In some embodiments, the user commentary may include text-based commentary, video-based commentary, audio-based commentary, and/or photographic commentary. Operations may further include enabling the second user to save the user experience data card to a second user future experience list. In some embodiments, the experience data card may be associated with geographic data.

In a first implementation, a method for sharing experiences is provided. The method may include providing for display an interface depicting event data related to two or more events and receiving from a first user a selection of one or more elements of the event data, the one or more elements being related to at least one of the two or more events. The method may further include generating an experience data card in an experience database based at least in part on the selected one or more elements and receiving an indication, from the first user, to store the generated experience data card collected card. The method may also include storing in an experience data store coupled to the one or more computing devices, the generated experience data card.

One of more of the following features may be included. The method may further include providing a representation of the experience data card for display to a second user. The method may also include receiving a comment from the second user, the comment associated with the experience data card. The method may additionally include storing the comment received from the second user. The method may further include providing a notification to the first user that a member of the first user's social networking stream collected the generated experience data card. The method may also include generating an indication that the first user stored the collected card. The method may also include providing the indication at the stream of event data. In some embodiments, the one or more computing devices may be configured to receive comments associated with the experience data card from a plurality of users, the plurality of users being different from the first user. In some embodiments, receiving a selection may include receiving a selection of one or more elements associated with a social networking stream. In some embodiments, the generated experience data card may include at least one of a written description, a photograph, and a geographical location.

In another implementation, a computer program product resides on a computer readable medium and has a plurality of instructions stored on it. When executed by a processor, the instructions cause the processor to perform operations including providing for display an interface depicting event data related to two or more events and receiving from a first user a selection of one or more elements of the event data, the one or more elements being related to at least one of the two or more events. Operations may further include generating an experience data card in an experience database based at least in part on the selected one or more elements and receiving an indication, from the first user, to store the generated experience data card collected card. Operations may also include storing in an experience data store coupled to the one or more computing devices, the generated experience data card.

One of more of the following features may be included. Operations may further include providing a representation of the experience data card for display to a second user. Operations may also include receiving a comment from the second user, the comment associated with the experience data card. Operations may additionally include storing the comment received from the second user. Operations may further include providing a notification to the first user that a member of the first user's social networking stream collected the generated experience data card. Operations may also include generating an indication that the first user stored the collected card. Operations may also include providing the indication at the stream of event data. In some embodiments, the one or more computing devices may be configured to receive comments associated with the experience data card from a plurality of users, the plurality of users being different from the first user. In some embodiments, receiving a selection may include receiving a selection of one or more elements associated with a social networking stream. In some embodiments, the generated experience data card may include at least one of a written description, a photograph, and a geographical location.

In another implementation, a computing system includes at least one processor and at least one memory architecture coupled with the at least one processor. One or more software modules are executed on the at least one processor and the at least one memory architecture and perform operation including providing for display an interface depicting event data related to two or more events and receiving from a first user a selection of one or more elements of the event data, the one or more elements being related to at least one of the two or more events. Operations may further include generating an experience data card in an experience database based at least in part on the selected one or more elements and receiving an indication, from the first user, to store the generated experience data card collected card. Operations may also include storing in an experience data store coupled to the one or more computing devices, the generated experience data card.

One of more of the following features may be included. Operations may further include providing a representation of the experience data card for display to a second user. Operations may also include receiving a comment from the second user, the comment associated with the experience data card. Operations may additionally include storing the comment received from the second user. Operations may further include providing a notification to the first user that a member of the first user's social networking stream collected the generated experience data card. Operations may also include generating an indication that the first user stored the collected card. Operations may also include providing the indication at the stream of event data. In some embodiments, the one or more computing devices may be configured to receive comments associated with the experience data card from a plurality of users, the plurality of users being different from the first user. In some embodiments, receiving a selection may include receiving a selection of one or more elements associated with a social networking stream. In some embodiments, the generated experience data card may include at least one of a written description, a photograph, and a geographical location.

In a first implementation, a method for the sharing of experiences is provided. The method may include receiving a request for suggested experience data from the first user, said first user being associated with first user profile data stored in an experience data store and determining location data for the first user. The method may further include determining one or more interests for the first user based at least in part on the first user profile data. The method may also include determining at least one suggested experience based at least in part on the location data for the first user and the one or more determined interests for the first user. The method may further include providing the at least one suggested experience to the first user in response to the received request.

One of more of the following features may be included. In some embodiments, determining one or more interests for the first user may include determining one or more interests from a second user profile, the second user profile being associated with the first user profile. In some embodiments, determining a location may include receiving location coordinates using at least one of a global positioning system, an assisted global positioning system, and a differential global positioning system. In some embodiments, determining a location may be based upon, at least in part, information from a WiFi network or information obtained based on near-field communications. In some embodiments, determining a location may include receiving an indication that a user has checked into the location. In some embodiments, the location data may be included within the request or may be received separate from the request. The method may further include providing a second suggested experience to the first user based upon, at least in part, a relationship between the first suggested experience and the second suggested experience. In some embodiments, the relationship may include at least one of a travel time between the first suggested experience and the second suggested experience, a starting location of one of the first suggested experience and the second suggested experience, and an ending location of one of the first suggested experience and the second suggested experience.

In another implementation, a computer program product resides on a computer readable medium and has a plurality of instructions stored on it. When executed by a processor, the instructions cause the processor to perform operations including receiving a request for suggested experience data from the first user, said first user being associated with first user profile data stored in an experience data store and determining location data for the first user. Operations may further include determining one or more interests for the first user based at least in part on the first user profile data. Operations may also include determining at least one suggested experience based at least in part on the location data for the first user and the one or more determined interests for the first user. Operations may further include providing the at least one suggested experience to the first user in response to the received request.

One of more of the following features may be included. In some embodiments, determining one or more interests for the first user may include determining one or more interests from a second user profile, the second user profile being associated with the first user profile. In some embodiments, determining a location may include receiving location coordinates using at least one of a global positioning system, an assisted global positioning system, and a differential global positioning system. In some embodiments, determining a location may be based upon, at least in part, information from a WiFi network or information obtained based on near-field communications. In some embodiments, determining a location may include receiving an indication that a user has checked into the location. In some embodiments, the location data may be included within the request or may be received separate from the request. Operations may further include providing a second suggested experience to the first user based upon, at least in part, a relationship between the first suggested experience and the second suggested experience. In some embodiments, the relationship may include at least one of a travel time between the first suggested experience and the second suggested experience, a starting location of one of the first suggested experience and the second suggested experience, and an ending location of one of the first suggested experience and the second suggested experience.

In another implementation, a computing system includes at least one processor and at least one memory architecture coupled with the at least one processor. One or more software modules are executed on the at least one processor and the at least one memory architecture and perform operation including receiving a request for suggested experience data from the first user, said first user being associated with first user profile data stored in an experience data store and determining location data for the first user. Operations may further include determining one or more interests for the first user based at least in part on the first user profile data. Operations may also include determining at least one suggested experience based at least in part on the location data for the first user and the one or more determined interests for the first user. Operations may further include providing the at least one suggested experience to the first user in response to the received request.

One of more of the following features may be included. In some embodiments, determining one or more interests for the first user may include determining one or more interests from a second user profile, the second user profile being associated with the first user profile. In some embodiments, determining a location may include receiving location coordinates using at least one of a global positioning system, an assisted global positioning system, and a differential global positioning system. In some embodiments, determining a location may be based upon, at least in part, information from a WiFi network or information obtained based on near-field communications. In some embodiments, determining a location may include receiving an indication that a user has checked into the location. In some embodiments, the location data may be included within the request or may be received separate from the request. Operations may further include providing a second suggested experience to the first user based upon, at least in part, a relationship between the first suggested experience and the second suggested experience. In some embodiments, the relationship may include at least one of a travel time between the first suggested experience and the second suggested experience, a starting location of one of the first suggested experience and the second suggested experience, and an ending location of one of the first suggested experience and the second suggested experience.

In a first implementation, a method of generating experience data cards executes on one or more computing devices. The method includes monitoring, on the one or more computing devices, a content feed portion that may include experience content. The content feed portion is a portion of a content feed. The content feed portion is forwarded to a first data processing body so that a determination may be made concerning whether the content feed portion includes experience content. If it is determined that the content feed portion includes experience content, the content feed portion is forwarded to a second data processing body to extract specific experience content. The specific experience content is received from the second data processing body. An experience data card is generated, on the one or more computing devices, based at least in part upon the specific experience content. The experience data card is stored in an experience database using the one or more computing devices. The experience database includes a plurality of experience data cards that are each associated with an experience and are each accessible by users of an interface to the experience database.

One or more of the following features may be included. A view indication may be received, on the one or more computing devices, from a user of the experience database concerning a request to view the experience data card within the experience database. A representation of the experience data card may be provided to the user. The content feed may be a social media stream. The content feed may be XML-formatted content. The first data processing body may include one or more human data review professionals. The second data processing body may include one or more human data processing professionals.

In another implementation, a computer program product resides on a computer readable medium and has a plurality of instructions stored on it. When executed by a processor, the instructions cause the processor to perform operations including monitoring, on the one or more computing devices, a content feed portion that may include experience content. The content feed portion is a portion of a content feed. The content feed portion is forwarded to a first data processing body so that a determination may be made concerning whether the content feed portion includes experience content. If it is determined that the content feed portion includes experience content, the content feed portion is forwarded to a second data processing body to extract specific experience content. The specific experience content is received from the second data processing body. An experience data card is generated, on the one or more computing devices, based at least in part upon the specific experience content. The experience data card is stored in an experience database using the one or more computing devices. The experience database includes a plurality of experience data cards that are each associated with an experience and are each accessible by users of an interface to the experience database.

One or more of the following features may be included. A view indication may be received, on the one or more computing devices, from a user of the experience database concerning a request to view the experience data card within the experience database. A representation of the experience data card may be provided to the user. The content feed may be a social media stream. The content feed may be XML-formatted content. The first data processing body may include one or more human data review professionals. The second data processing body may include one or more human data processing professionals.

In another implementation, a computing system includes at least one processor and at least one memory architecture coupled with the at least one processor. One or more software modules are executed on the at least one processor and the at least one memory architecture and perform operation including monitoring, on the one or more computing devices, a content feed portion that may include experience content. The content feed portion is a portion of a content feed. The content feed portion is forwarded to a first data processing body so that a determination may be made concerning whether the content feed portion includes experience content. If it is determined that the content feed portion includes experience content, the content feed portion is forwarded to a second data processing body to extract specific experience content. The specific experience content is received from the second data processing body. An experience data card is generated, on the one or more computing devices, based at least in part upon the specific experience content. The experience data card is stored in an experience database using the one or more computing devices. The experience database includes a plurality of experience data cards that are each associated with an experience and are each accessible by users of an interface to the experience database.

One or more of the following features may be included. A view indication may be received, on the one or more computing devices, from a user of the experience database concerning a request to view the experience data card within the experience database. A representation of the experience data card may be provided to the user. The content feed may be a social media stream. The content feed may be XML-formatted content. The first data processing body may include one or more human data review professionals. The second data processing body may include one or more human data processing professionals.

In a first implementation, a method for the sharing of experiences is provided. The method may include receiving a photograph having image capture data associated therewith and determining one or more places of a plurality of places with which to associate the photograph, wherein the plurality of places each have one or more locations associated therewith, and wherein determining which one or more places of the plurality of places to which to associate the photograph comprises comparing the image capture data associated with the photograph to the locations associated with the plurality of places. The method may further include generating an experience data card based upon, at least in part, the photograph and storing in a data store an association between the experience data card and the determined one or more places, wherein the data store is communicatively coupled to the one or more computing devices.

One of more of the following features may be included. In some embodiments, the generated experience data card may include a proposed experience associated with the photograph. The method may include sharing the proposed experience with one or more participants of a social network. The method may further include allowing a user to either modify or accept the proposed experience. In some embodiments, the image capture data may include at least one of time of day, global positioning system location, and aperture settings. In some embodiments, determining may occur at a date later than a date the photograph was generated. In some embodiments, determining may occur in a geographical location that differs from the geographical location of the one or more places. The method may also include suggesting one or more additional proposed experiences based upon, at least in part, the image capture data associated with the photograph.

In another implementation, a computer program product resides on a computer readable medium and has a plurality of instructions stored on it. When executed by a processor, the instructions cause the processor to perform operations including receiving a photograph having image capture data associated therewith and determining one or more places of a plurality of places with which to associate the photograph, wherein the plurality of places each have one or more locations associated therewith, and wherein determining which one or more places of the plurality of places to which to associate the photograph comprises comparing the image capture data associated with the photograph to the locations associated with the plurality of places. Operations may further include generating an experience data card based upon, at least in part, the photograph and storing in a data store an association between the experience data card and the determined one or more places, wherein the data store is communicatively coupled to the one or more computing devices.

One of more of the following features may be included. In some embodiments, the generated experience data card may include a proposed experience associated with the photograph. Operations may include sharing the proposed experience with one or more participants of a social network. Operations may further include allowing a user to either modify or accept the proposed experience. In some embodiments, the image capture data may include at least one of time of day, global positioning system location, and aperture settings. In some embodiments, determining may occur at a date later than a date the photograph was generated. In some embodiments, determining may occur in a geographical location that differs from the geographical location of the one or more places. Operations may also include suggesting one or more additional proposed experiences based upon, at least in part, the image capture data associated with the photograph.

In another implementation, a computing system includes at least one processor and at least one memory architecture coupled with the at least one processor. One or more software modules are executed on the at least one processor and the at least one memory architecture and perform operation including receiving a photograph having image capture data associated therewith and determining one or more places of a plurality of places with which to associate the photograph, wherein the plurality of places each have one or more locations associated therewith, and wherein determining which one or more places of the plurality of places to which to associate the photograph comprises comparing the image capture data associated with the photograph to the locations associated with the plurality of places. Operations may further include generating an experience data card based upon, at least in part, the photograph and storing in a data store an association between the experience data card and the determined one or more places, wherein the data store is communicatively coupled to the one or more computing devices.

One of more of the following features may be included. In some embodiments, the generated experience data card may include a proposed experience associated with the photograph. Operations may include sharing the proposed experience with one or more participants of a social network. Operations may further include allowing a user to either modify or accept the proposed experience. In some embodiments, the image capture data may include at least one of time of day, global positioning system location, and aperture settings. In some embodiments, determining may occur at a date later than a date the photograph was generated. In some embodiments, determining may occur in a geographical location that differs from the geographical location of the one or more places. Operations may also include suggesting one or more additional proposed experiences based upon, at least in part, the image capture data associated with the photograph.

In a first implementation, a method for the sharing of experiences is provided. The method may include receiving content associated with a uniform resource locator and determining two or more content items based on the content associated with the uniform resource locator. The method may further include generating, based on the two or more content items, an experience data card and storing the generated experience data card in an experience data store, the experience data store being communicatively coupled to the one or more computing devices. The method may further include receiving a request to view the experience data card and providing for display, using the one or more computing devices, a view of the experience data card based at least in part on the request to view the experience data card.

One of more of the following features may be included. The method may further include receiving a user indication to generate an experience data card for the uniform resource locator. The method may also include requesting the content for the uniform resource locator. The method may additionally include enabling a user to provide user commentary regarding the experience data card. The method may further include receiving an indication from a user that they would like to associate the experience data card with a personalized data store. In some embodiments, receiving content may include receiving a response to a hypertext transfer protocol request. In some embodiments, determining the two or more content items may include parsing the content associated with the uniform resource locator. In some embodiments, the experience data store may include a database. In some embodiments, the experience data card may include at least one of a title, description, photo, expiration date, author, address, comments, and rating information.

In another implementation, a computer program product resides on a computer readable medium and has a plurality of instructions stored on it. When executed by a processor, the instructions cause the processor to perform operations including receiving content associated with a uniform resource locator and determining two or more content items based on the content associated with the uniform resource locator. Operations may further include generating, based on the two or more content items, an experience data card and storing the generated experience data card in an experience data store, the experience data store being communicatively coupled to the one or more computing devices. Operations may further include receiving a request to view the experience data card and providing for display, using the one or more computing devices, a view of the experience data card based at least in part on the request to view the experience data card.

One of more of the following features may be included. Operations may further include receiving a user indication to generate an experience data card for the uniform resource locator. Operations may also include requesting the content for the uniform resource locator. Operations may additionally include enabling a user to provide user commentary regarding the experience data card. Operations may further include receiving an indication from a user that they would like to associate the experience data card with a personalized data store. In some embodiments, receiving content may include receiving a response to a hypertext transfer protocol request. In some embodiments, determining the two or more content items may include parsing the content associated with the uniform resource locator. In some embodiments, the experience data store may include a database. In some embodiments, the experience data card may include at least one of a title, description, photo, expiration date, author, address, comments, and rating information.

In another implementation, a computing system includes at least one processor and at least one memory architecture coupled with the at least one processor. One or more software modules are executed on the at least one processor and the at least one memory architecture and perform operation including receiving content associated with a uniform resource locator and determining two or more content items based on the content associated with the uniform resource locator. Operations may further include generating, based on the two or more content items, an experience data card and storing the generated experience data card in an experience data store, the experience data store being communicatively coupled to the one or more computing devices. Operations may further include receiving a request to view the experience data card and providing for display, using the one or more computing devices, a view of the experience data card based at least in part on the request to view the experience data card.

One of more of the following features may be included. Operations may further include receiving a user indication to generate an experience data card for the uniform resource locator. Operations may also include requesting the content for the uniform resource locator. Operations may additionally include enabling a user to provide user commentary regarding the experience data card. Operations may further include receiving an indication from a user that they would like to associate the experience data card with a personalized data store. In some embodiments, receiving content may include receiving a response to a hypertext transfer protocol request. In some embodiments, determining the two or more content items may include parsing the content associated with the uniform resource locator. In some embodiments, the experience data store may include a database. In some embodiments, the experience data card may include at least one of a title, description, photo, expiration date, author, address, comments, and rating information.

In a first implementation, a method for populating an experience database executes on one or more computing devices. The method includes receiving from a user, on the one or more computing devices, an indication to create an experience data card for inclusion within an experience database. The indication provides one or more details concerning an experience of the user. The one or more details associated with the indication are compared, on the one or more computing devices, to details associated with one or more experience data cards included within the experience database to determine if matching details exist. If matching details exist on a related experience data card, the user is provided with one or more options for associating the experience of the user with the related experience data card.

One or more of the following features may be included. Providing the user with one or more options may include identifying the related experience data card to the user and enabling the user to add the one or more details concerning the experience of the user to the related experience data card. Providing the user with one or more options may include identifying the related experience data card to the user and enabling the user to associate the experience of the user with the related experience data card.

The one or more details may include one or more of text-based details, photographic details, video-based details, audio-based details, and location-based details. The location-based details may include GPS coordinates. Comparing the one or more details may include comparing GPS coordinates associated with the experience of the user with GPS coordinates associated with the one or more experience data cards to determine if matching details exist.

The text-based details may include a business name. Comparing the one or more details may include comparing a business name associated with the experience of the user with a business name associated with the one or more experience data cards to determine if matching details exist.

The text-based details may include an experience title. Comparing the one or more details may include comparing an experience title associated with the experience of the user with an experience title associated with the one or more experience data cards to determine if matching details exist.

In another implementation, a computer program product resides on a computer readable medium and has a plurality of instructions stored on it. When executed by a processor, the instructions cause the processor to perform operations including receiving from a user, on the one or more computing devices, an indication to create an experience data card for inclusion within an experience database. The indication provides one or more details concerning an experience of the user. The one or more details associated with the indication are compared, on the one or more computing devices, to details associated with one or more experience data cards included within the experience database to determine if matching details exist. If matching details exist on a related experience data card, the user is provided with one or more options for associating the experience of the user with the related experience data card.

One or more of the following features may be included. Providing the user with one or more options may include identifying the related experience data card to the user and enabling the user to add the one or more details concerning the experience of the user to the related experience data card. Providing the user with one or more options may include identifying the related experience data card to the user and enabling the user to associate the experience of the user with the related experience data card.

The one or more details may include one or more of text-based details, photographic details, video-based details, audio-based details, and location-based details. The location-based details may include GPS coordinates. Comparing the one or more details may include comparing GPS coordinates associated with the experience of the user with GPS coordinates associated with the one or more experience data cards to determine if matching details exist.

The text-based details may include a business name. Comparing the one or more details may include comparing a business name associated with the experience of the user with a business name associated with the one or more experience data cards to determine if matching details exist.

The text-based details may include an experience title. Comparing the one or more details may include comparing an experience title associated with the experience of the user with an experience title associated with the one or more experience data cards to determine if matching details exist.

In another implementation, a computing system includes at least one processor and at least one memory architecture coupled with the at least one processor. One or more software modules are executed on the at least one processor and the at least one memory architecture and perform operation including receiving from a user, on the one or more computing devices, an indication to create an experience data card for inclusion within an experience database. The indication provides one or more details concerning an experience of the user. The one or more details associated with the indication are compared, on the one or more computing devices, to details associated with one or more experience data cards included within the experience database to determine if matching details exist. If matching details exist on a related experience data card, the user is provided with one or more options for associating the experience of the user with the related experience data card.

One or more of the following features may be included. Providing the user with one or more options may include identifying the related experience data card to the user and enabling the user to add the one or more details concerning the experience of the user to the related experience data card. Providing the user with one or more options may include identifying the related experience data card to the user and enabling the user to associate the experience of the user with the related experience data card.

The one or more details may include one or more of text-based details, photographic details, video-based details, audio-based details, and location-based details. The location-based details may include GPS coordinates. Comparing the one or more details may include comparing GPS coordinates associated with the experience of the user with GPS coordinates associated with the one or more experience data cards to determine if matching details exist.

The text-based details may include a business name. Comparing the one or more details may include comparing a business name associated with the experience of the user with a business name associated with the one or more experience data cards to determine if matching details exist.

The text-based details may include an experience title. Comparing the one or more details may include comparing an experience title associated with the experience of the user with an experience title associated with the one or more experience data cards to determine if matching details exist.

In a first implementation, a method of managing a future experience executes on one or more computing devices. The method includes receiving, on the one or more computing devices, a card creation indication from a first user concerning a request to create a future experience data card, wherein the future experience data card corresponds to a future experience. Two or more data items related to the future experience are received on the one or more computing devices. The two or more data items include at least one temporal indication. The future experience data card is generated on the one or more computing devices for the future experience based at least in part on the two or more data items related to the future experience. The future experience data card is stored, using the one or more computing devices, in an experience database. The experience database includes a plurality of experience data cards that are each associated with an experience and are each accessible by users of an interface to the experience database.

One or more of the following features may be included. The two or more data items may include location information for the future experience. A search request for a desired time and desired location may be received on the one or more computing devices from a second user of the experience database. Whether the temporal information and location information for the future experience data card correspond to the desired time and desired location may be determined using the one or more computing devices. When the temporal information and location information for the future experience data card correspond to the desired time and desired location, a representation of the future experience data card may be provided to the second user. A view indication from a second user of the experience database may be received on the one or more computing devices concerning the future experience data card within the experience database. A representation of the future experience data card may be provided to the second user based, at least in part, on the received view indication, The second user may be the first user. A check-in indication may be received on the one or more computing devices from the second user concerning checking in to the future experience data card. The check-in indication received from the second user may be processed. Commentary may be received from the second user concerning the future experience associated with the future experience data card and the future experience data card may be amended to include the commentary received from the second user. A related experience data card may be generated that is associated with the future experience data card and the related experience data card may include the commentary received from the second user.

In another implementation, a computer program product resides on a computer readable medium and has a plurality of instructions stored on it. When executed by a processor, the instructions cause the processor to perform operations including receiving, on the one or more computing devices, a card creation indication from a first user concerning a request to create a future experience data card, wherein the future experience data card corresponds to a future experience. Two or more data items related to the future experience are received on the one or more computing devices. The two or more data items include at least one temporal indication. The future experience data card is generated on the one or more computing devices for the future experience based at least in part on the two or more data items related to the future experience. The future experience data card is stored, using the one or more computing devices, in an experience database. The experience database includes a plurality of experience data cards that are each associated with an experience and are each accessible by users of an interface to the experience database.

One or more of the following features may be included. The two or more data items may include location information for the future experience. A search request for a desired time and desired location may be received on the one or more computing devices from a second user of the experience database. Whether the temporal information and location information for the future experience data card correspond to the desired time and desired location may be determined using the one or more computing devices. When the temporal information and location information for the future experience data card correspond to the desired time and desired location, a representation of the future experience data card may be provided to the second user. A view indication from a second user of the experience database may be received on the one or more computing devices concerning the future experience data card within the experience database. A representation of the future experience data card may be provided to the second user based, at least in part, on the received view indication, The second user may be the first user. A check-in indication may be received on the one or more computing devices from the second user concerning checking in to the future experience data card. The check-in indication received from the second user may be processed. Commentary may be received from the second user concerning the future experience associated with the future experience data card and the future experience data card may be amended to include the commentary received from the second user. A related experience data card may be generated that is associated with the future experience data card and the related experience data card may include the commentary received from the second user.

In another implementation, a computing system includes at least one processor and at least one memory architecture coupled with the at least one processor. One or more software modules are executed on the at least one processor and the at least one memory architecture and perform operation including receiving, on the one or more computing devices, a card creation indication from a first user concerning a request to create a future experience data card, wherein the future experience data card corresponds to a future experience. Two or more data items related to the future experience are received on the one or more computing devices. The two or more data items include at least one temporal indication. The future experience data card is generated on the one or more computing devices for the future experience based at least in part on the two or more data items related to the future experience. The future experience data card is stored, using the one or more computing devices, in an experience database. The experience database includes a plurality of experience data cards that are each associated with an experience and are each accessible by users of an interface to the experience database.

One or more of the following features may be included. The two or more data items may include location information for the future experience. A search request for a desired time and desired location may be received on the one or more computing devices from a second user of the experience database. Whether the temporal information and location information for the future experience data card correspond to the desired time and desired location may be determined using the one or more computing devices. When the temporal information and location information for the future experience data card correspond to the desired time and desired location, a representation of the future experience data card may be provided to the second user. A view indication from a second user of the experience database may be received on the one or more computing devices concerning the future experience data card within the experience database. A representation of the future experience data card may be provided to the second user based, at least in part, on the received view indication, The second user may be the first user. A check-in indication may be received on the one or more computing devices from the second user concerning checking in to the future experience data card. The check-in indication received from the second user may be processed. Commentary may be received from the second user concerning the future experience associated with the future experience data card and the future experience data card may be amended to include the commentary received from the second user. A related experience data card may be generated that is associated with the future experience data card and the related experience data card may include the commentary received from the second user.

In a first implementation, a method of graphically categorizing an experience data card executes on one or more computing devices. The method includes defining, on the one or more computing devices, a plurality of graphical experience identifiers for use within an experience database. The experience database includes a plurality of experience data cards that are each associated with an experience. An indication from a user of the experience database of an intent to associate one or more related graphical experience identifiers, chosen from the plurality of graphical experience identifiers, with a selected experience data card chosen from the plurality of experience data cards included within the experience database is received on the one or more computing devices. The selected experience data card is modified, on the one or more computing devices, to associate the selected experience data card with the one or more related graphical experience identifiers.

One or more of the following features may be included. A query including one or more queried graphical experience identifiers may be received on the one or more computing devices. Whether any of the one or more related graphical experience identifiers match any of the one or more queried graphical experience identifiers may be determined using the one or more computing devices. When at least one of the one or more related graphical experience identifiers matches at least one of the one or more queried graphical experience identifier, a result set may be presented to a provider of the query that defines at least the selected experience data card. Each of the plurality of graphical experience identifiers may be configured to connote an experience category. The selected experience data card may be an experience data card generated by a third party. The selected experience data card may be an experience data card generated by the user.

In another implementation, a computer program product resides on a computer readable medium and has a plurality of instructions stored on it. When executed by a processor, the instructions cause the processor to perform operations including defining, on the one or more computing devices, a plurality of graphical experience identifiers for use within an experience database. The experience database includes a plurality of experience data cards that are each associated with an experience. An indication from a user of the experience database of an intent to associate one or more related graphical experience identifiers, chosen from the plurality of graphical experience identifiers, with a selected experience data card chosen from the plurality of experience data cards included within the experience database is received on the one or more computing devices. The selected experience data card is modified, on the one or more computing devices, to associate the selected experience data card with the one or more related graphical experience identifiers.

One or more of the following features may be included. A query including one or more queried graphical experience identifiers may be received on the one or more computing devices. Whether any of the one or more related graphical experience identifiers match any of the one or more queried graphical experience identifiers may be determined using the one or more computing devices. When at least one of the one or more related graphical experience identifiers matches at least one of the one or more queried graphical experience identifier, a result set may be presented to a provider of the query that defines at least the selected experience data card. Each of the plurality of graphical experience identifiers may be configured to connote an experience category. The selected experience data card may be an experience data card generated by a third party. The selected experience data card may be an experience data card generated by the user.

In another implementation, a computing system includes at least one processor and at least one memory architecture coupled with the at least one processor. One or more software modules are executed on the at least one processor and the at least one memory architecture and perform operation including defining, on the one or more computing devices, a plurality of graphical experience identifiers for use within an experience database. The experience database includes a plurality of experience data cards that are each associated with an experience. An indication from a user of the experience database of an intent to associate one or more related graphical experience identifiers, chosen from the plurality of graphical experience identifiers, with a selected experience data card chosen from the plurality of experience data cards included within the experience database is received on the one or more computing devices. The selected experience data card is modified, on the one or more computing devices, to associate the selected experience data card with the one or more related graphical experience identifiers.

One or more of the following features may be included. A query including one or more queried graphical experience identifiers may be received on the one or more computing devices. Whether any of the one or more related graphical experience identifiers match any of the one or more queried graphical experience identifiers may be determined using the one or more computing devices. When at least one of the one or more related graphical experience identifiers matches at least one of the one or more queried graphical experience identifier, a result set may be presented to a provider of the query that defines at least the selected experience data card. Each of the plurality of graphical experience identifiers may be configured to connote an experience category. The selected experience data card may be an experience data card generated by a third party. The selected experience data card may be an experience data card generated by the user.

In another implementation, a method of graphically categorizing an experience data card executes on one or more computing devices. The method includes defining, on the one or more computing devices, a plurality of experience data cards within an experience database. Each of the plurality of experience data cards is associated with one or more related graphical experience identifiers, chosen from a plurality of graphical experience identifiers. A query including one or more queried graphical experience identifiers is received on the one or more computing devices.

One or more of the following features may be included. Whether any of the one or more related graphical experience identifiers match any of the one or more queried graphical experience identifiers may be determined using the one or more computing devices. When at least one of the one or more related graphical experience identifiers matches at least one of the one or more queried graphical experience identifier, a result set may be presented to a provider of the query that defines the matches. Each of the plurality of graphical experience identifiers may be configured to connote an experience category. The selected experience data card may be an experience data card generated by a third party. The selected experience data card may be an experience data card generated by the user.

In a first implementation, a method for the sharing of experiences is provided. The method may include receiving a request to generate an experience data card having at least one image from a first user and generating the experience data card, including the at least one image. The method may further include storing the experience data card in an experience data card database. The method may also include receiving a request to augment one or more aspects of the experience data card from a second user and storing the one or more augmented aspects of the experience data card along with an association of the augmented aspects of the experience data card with the second user. The method may further include receiving a request, using the one or more computing devices, from a third user for the experience data card and providing the experience data card with the one or more augmented aspects, at least in part based on an affinity between the second user and the third user and the association of the augmented aspects of the experience data card with the second user.

One of more of the following features may be included. The method may further include ranking a plurality of affinities between the third user and each of the first user and the second user. In some embodiments, providing may be based upon, at least in part, the rankings. The method may further include dynamically updating the rankings, based upon, at least in part, one or more received comments associated with the experience data card. The method may also include determining whether the second user and the third user are linked in a social network, and wherein providing the experience data card with the one or more augmented aspects at least in part based on an affinity between the second user and the third user comprises providing the experience data card with the one or more augmented aspects at least in part based on a determined link in the social network between the first user and the second user and the third user. The method may further include providing access to the experience data card via a social networking stream. In some embodiments, the one or more augmented aspects may include an image.

In another implementation, a computer program product resides on a computer readable medium and has a plurality of instructions stored on it. When executed by a processor, the instructions cause the processor to perform operations including receiving a request to generate an experience data card having at least one image from a first user and generating the experience data card, including the at least one image. Operations may further include storing the experience data card in an experience data card database. Operations may also include receiving a request to augment one or more aspects of the experience data card from a second user and storing the one or more augmented aspects of the experience data card along with an association of the augmented aspects of the experience data card with the second user. Operations may further include receiving a request, using the one or more computing devices, from a third user for the experience data card and providing the experience data card with the one or more augmented aspects, at least in part based on an affinity between the second user and the third user and the association of the augmented aspects of the experience data card with the second user.

One of more of the following features may be included. Operations may further include ranking a plurality of affinities between the third user and each of the first user and the second user. In some embodiments, providing may be based upon, at least in part, the rankings. Operations may further include dynamically updating the rankings, based upon, at least in part, one or more received comments associated with the experience data card. Operations may also include determining whether the second user and the third user are linked in a social network, and wherein providing the experience data card with the one or more augmented aspects at least in part based on an affinity between the second user and the third user comprises providing the experience data card with the one or more augmented aspects at least in part based on a determined link in the social network between the first user and the second user and the third user. Operations may further include providing access to the experience data card via a social networking stream. In some embodiments, the one or more augmented aspects may include an image.

In another implementation, a computing system includes at least one processor and at least one memory architecture coupled with the at least one processor. One or more software modules are executed on the at least one processor and the at least one memory architecture and perform operation including receiving a request to generate an experience data card having at least one image from a first user and generating the experience data card, including the at least one image. Operations may further include storing the experience data card in an experience data card database. Operations may also include receiving a request to augment one or more aspects of the experience data card from a second user and storing the one or more augmented aspects of the experience data card along with an association of the augmented aspects of the experience data card with the second user. Operations may further include receiving a request, using the one or more computing devices, from a third user for the experience data card and providing the experience data card with the one or more augmented aspects, at least in part based on an affinity between the second user and the third user and the association of the augmented aspects of the experience data card with the second user.

One of more of the following features may be included. Operations may further include ranking a plurality of affinities between the third user and each of the first user and the second user. In some embodiments, providing may be based upon, at least in part, the rankings. Operations may further include dynamically updating the rankings, based upon, at least in part, one or more received comments associated with the experience data card. Operations may also include determining whether the second user and the third user are linked in a social network, and wherein providing the experience data card with the one or more augmented aspects at least in part based on an affinity between the second user and the third user comprises providing the experience data card with the one or more augmented aspects at least in part based on a determined link in the social network between the first user and the second user and the third user. Operations may further include providing access to the experience data card via a social networking stream. In some embodiments, the one or more augmented aspects may include an image.

In a first implementation, a method for the sharing of experiences is provided. The method may include receiving an indication of an experience search to be performed on the experience database, wherein the experience search defines one or more search criteria and is associated with one or more extrinsic conditions. The method may also include searching the experience database based, at least in part, upon one or more search criteria to generate a result set including a plurality of experience data cards. The method may further include sequencing, the plurality of experience data cards based at least in part upon the extrinsic conditions. The method may also include generating a sequence result set based at least in part on the sequenced experience data cards and presenting at least a portion of the sequence result set to a user.

One of more of the following features may be included. In some embodiments, the extrinsic conditions may include one or more of a weather condition and a temperature condition. In some embodiments, the extrinsic conditions may include one or more of a mood, a theme, and a time of year. In some embodiments, the extrinsic conditions may include one or more of a geographic location, an expiration date, and a social affinity. In some embodiments, the extrinsic conditions may include one or more of an experience rating and experience partners. The method may further include providing a second user with an option to create a comment associated with an experience of the sequence result set. The method may further include storing the comment from the second user in the experience database in association with the sequence result set. In some embodiments, presenting at least a portion of the sequence result set may be based upon, at least in part, a popularity metric. In some embodiments, the extrinsic conditions may include a time of day. In some embodiments, the popularity metric may be based upon, at least in part, a gross rating from all users of the experience database. In some embodiments, the popularity metric may be based upon, at least in part, a social affinity associated with the user.

In another implementation, a computer program product resides on a computer readable medium and has a plurality of instructions stored on it. When executed by a processor, the instructions cause the processor to perform operations including receiving an indication of an experience search to be performed on the experience database, wherein the experience search defines one or more search criteria and is associated with one or more extrinsic conditions. Operations may also include searching the experience database based, at least in part, upon one or more search criteria to generate a result set including a plurality of experience data cards. Operations may further include sequencing, the plurality of experience data cards based at least in part upon the extrinsic conditions. Operations may also include generating a sequence result set based at least in part on the sequenced experience data cards and presenting at least a portion of the sequence result set to a user.

One of more of the following features may be included. In some embodiments, the extrinsic conditions may include one or more of a weather condition and a temperature condition. In some embodiments, the extrinsic conditions may include one or more of a mood, a theme, and a time of year. In some embodiments, the extrinsic conditions may include one or more of a geographic location, an expiration date, and a social affinity. In some embodiments, the extrinsic conditions may include one or more of an experience rating and experience partners. Operations may further include providing a second user with an option to create a comment associated with an experience of the sequence result set. Operations may further include storing the comment from the second user in the experience database in association with the sequence result set. In some embodiments, presenting at least a portion of the sequence result set may be based upon, at least in part, a popularity metric. In some embodiments, the extrinsic conditions may include a time of day. In some embodiments, the popularity metric may be based upon, at least in part, a gross rating from all users of the experience database. In some embodiments, the popularity metric may be based upon, at least in part, a social affinity associated with the user.

In another implementation, a computing system includes at least one processor and at least one memory architecture coupled with the at least one processor. One or more software modules are executed on the at least one processor and the at least one memory architecture and perform operation including receiving an indication of an experience search to be performed on the experience database, wherein the experience search defines one or more search criteria and is associated with one or more extrinsic conditions. Operations may also include searching the experience database based, at least in part, upon one or more search criteria to generate a result set including a plurality of experience data cards. Operations may further include sequencing, the plurality of experience data cards based at least in part upon the extrinsic conditions. Operations may also include generating a sequence result set based at least in part on the sequenced experience data cards and presenting at least a portion of the sequence result set to a user.

One of more of the following features may be included. In some embodiments, the extrinsic conditions may include one or more of a weather condition and a temperature condition. In some embodiments, the extrinsic conditions may include one or more of a mood, a theme, and a time of year. In some embodiments, the extrinsic conditions may include one or more of a geographic location, an expiration date, and a social affinity. In some embodiments, the extrinsic conditions may include one or more of an experience rating and experience partners. Operations may further include providing a second user with an option to create a comment associated with an experience of the sequence result set. Operations may further include storing the comment from the second user in the experience database in association with the sequence result set. In some embodiments, presenting at least a portion of the sequence result set may be based upon, at least in part, a popularity metric. In some embodiments, the extrinsic conditions may include a time of day. In some embodiments, the popularity metric may be based upon, at least in part, a gross rating from all users of the experience database. In some embodiments, the popularity metric may be based upon, at least in part, a social affinity associated with the user.

In a first implementation, a method of generating an experience itinerary executes on one or more computing devices. The method includes receiving, on the one or more computing devices, a location indication from a user concerning a chosen location for potential experiences. A time indication is received, on the one or more computing devices, from the user concerning a time frame for the potential experiences. An experiences database is queried to identify two or more experiences that may be sequentially performed within the defined time period at the chosen location. An itinerary is generated, on the one or more computing devices, for the user based, at least in part, upon the two or more experiences.

One or more of the following features may be included. The itinerary may be provided to the user from the one or more computing devices. One or more of a theme indication concerning a desired theme for the potential experiences and a budget indication concerning a requested budget for the potential experiences may be received from the user on the one or more computing devices. Querying an experiences database may include considering one or more of: the weather conditions at the chosen location, and the geographic disparity between each of the two or more experiences. The chosen location may be a current location of the user. The chosen location may be a future location selected by the user. Generating an itinerary may include generating directions to each of the two or more experiences.

In another implementation, a computer program product resides on a computer readable medium and has a plurality of instructions stored on it. When executed by a processor, the instructions cause the processor to perform operations including receiving, on the one or more computing devices, a location indication from a user concerning a chosen location for potential experiences. A time indication is received, on the one or more computing devices, from the user concerning a time frame for the potential experiences. An experiences database is queried to identify two or more experiences that may be sequentially performed within the defined time period at the chosen location. An itinerary is generated, on the one or more computing devices, for the user based, at least in part, upon the two or more experiences.

One or more of the following features may be included. The itinerary may be provided to the user from the one or more computing devices. One or more of a theme indication concerning a desired theme for the potential experiences and a budget indication concerning a requested budget for the potential experiences may be received from the user on the one or more computing devices. Querying an experiences database may include considering one or more of: the weather conditions at the chosen location, and the geographic disparity between each of the two or more experiences. The chosen location may be a current location of the user. The chosen location may be a future location selected by the user. Generating an itinerary may include generating directions to each of the two or more experiences.

In another implementation, a computing system includes at least one processor and at least one memory architecture coupled with the at least one processor. One or more software modules are executed on the at least one processor and the at least one memory architecture and perform operation including receiving, on the one or more computing devices, a location indication from a user concerning a chosen location for potential experiences. A time indication is received, on the one or more computing devices, from the user concerning a time frame for the potential experiences. An experiences database is queried to identify two or more experiences that may be sequentially performed within the defined time period at the chosen location. An itinerary is generated, on the one or more computing devices, for the user based, at least in part, upon the two or more experiences.

One or more of the following features may be included. The itinerary may be provided to the user from the one or more computing devices. One or more of a theme indication concerning a desired theme for the potential experiences and a budget indication concerning a requested budget for the potential experiences may be received from the user on the one or more computing devices. Querying an experiences database may include considering one or more of: the weather conditions at the chosen location, and the geographic disparity between each of the two or more experiences. The chosen location may be a current location of the user. The chosen location may be a future location selected by the user. Generating an itinerary may include generating directions to each of the two or more experiences.

In a first implementation, a method of checking in to an experience executes on one or more computing devices. The method includes maintaining, on the one or more computing devices, an experience database. The experience database includes a plurality of experience data cards that are each associated with an experience and are each accessible by users of the experience database. A view indication from a first user of the experience database is received, on the one or more computing devices, concerning a request to view a specific experience data card within the experience database. A representation of the specific experience data card is provided to the first user. A check-in indication is received, on the one or more computing devices, from the first user concerning checking in to the specific experience data card.

One or more of the following features may be included. The specific experience data card may be created by a second user of the experience database. The specific experience data card may be based, at least in part, upon a temporal indicator and a location indicator provided by the second user. The check-in indication received from the first user may be processed. Commentary may be received from the first user concerning the experience associated with the specific experience data card. The commentary received from the first user may include one or more of: text-based commentary, photographic commentary, video-based commentary, and audio-based commentary.

The specific experience data card may be amended to include the commentary received from the first user. A related experience data card may be generated that is associated with the specific experience data card. The related experience data card may include the commentary received from the first user. A business establishment may be associated with the specific experience data card; the experience may be associated with the business establishment; and the commentary received from the first user may be associated with the experience. The view indication may be generated as a result of a query executed on the experience database by the first user. One or more of the experience data cards included within the experience database may include availability criteria. The availability criteria may define one or more prerequisite experience data cards.

In another implementation, a computer program product resides on a computer readable medium and has a plurality of instructions stored on it. When executed by a processor, the instructions cause the processor to perform operations including maintaining, on the one or more computing devices, an experience database. The experience database includes a plurality of experience data cards that are each associated with an experience and are each accessible by users of the experience database. A view indication from a first user of the experience database is received, on the one or more computing devices, concerning a request to view a specific experience data card within the experience database. A representation of the specific experience data card is provided to the first user. A check-in indication is received, on the one or more computing devices, from the first user concerning checking in to the specific experience data card.

One or more of the following features may be included. The specific experience data card may be created by a second user of the experience database. The specific experience data card may be based, at least in part, upon a temporal indicator and a location indicator provided by the second user. The check-in indication received from the first user may be processed. Commentary may be received from the first user concerning the experience associated with the specific experience data card. The commentary received from the first user may include one or more of: text-based commentary, photographic commentary, video-based commentary, and audio-based commentary.

The specific experience data card may be amended to include the commentary received from the first user. A related experience data card may be generated that is associated with the specific experience data card. The related experience data card may include the commentary received from the first user. A business establishment may be associated with the specific experience data card; the experience may be associated with the business establishment; and the commentary received from the first user may be associated with the experience. The view indication may be generated as a result of a query executed on the experience database by the first user. One or more of the experience data cards included within the experience database may include availability criteria. The availability criteria may define one or more prerequisite experience data cards.

In another implementation, a computing system includes at least one processor and at least one memory architecture coupled with the at least one processor. One or more software modules are executed on the at least one processor and the at least one memory architecture and perform operation including maintaining, on the one or more computing devices, an experience database. The experience database includes a plurality of experience data cards that are each associated with an experience and are each accessible by users of the experience database. A view indication from a first user of the experience database is received, on the one or more computing devices, concerning a request to view a specific experience data card within the experience database. A representation of the specific experience data card is provided to the first user. A check-in indication is received, on the one or more computing devices, from the first user concerning checking in to the specific experience data card.

One or more of the following features may be included. The specific experience data card may be created by a second user of the experience database. The specific experience data card may be based, at least in part, upon a temporal indicator and a location indicator provided by the second user. The check-in indication received from the first user may be processed. Commentary may be received from the first user concerning the experience associated with the specific experience data card. The commentary received from the first user may include one or more of: text-based commentary, photographic commentary, video-based commentary, and audio-based commentary.

The specific experience data card may be amended to include the commentary received from the first user. A related experience data card may be generated that is associated with the specific experience data card. The related experience data card may include the commentary received from the first user. A business establishment may be associated with the specific experience data card; the experience may be associated with the business establishment; and the commentary received from the first user may be associated with the experience. The view indication may be generated as a result of a query executed on the experience database by the first user. One or more of the experience data cards included within the experience database may include availability criteria. The availability criteria may define one or more prerequisite experience data cards.

The details of one or more implementations are set forth in the accompanying drawings and the description below. Other features and advantages will become apparent from the description, the drawings, and the claims.

BRIEF DESCRIPTION OF THE DRAWINGS

FIG. 27 is a diagrammatic view of a search engine interface page consistent with an embodiment of the experience social networking process of FIG. 1;

FIG. 38 is a diagrammatic view of a webpage consistent with an embodiment of the experience social networking process of FIG. 1;

Like reference symbols in the various drawings indicate like elements.

DETAILED DESCRIPTION OF THE PREFERRED EMBODIMENTS

System Overview

Figure 1:
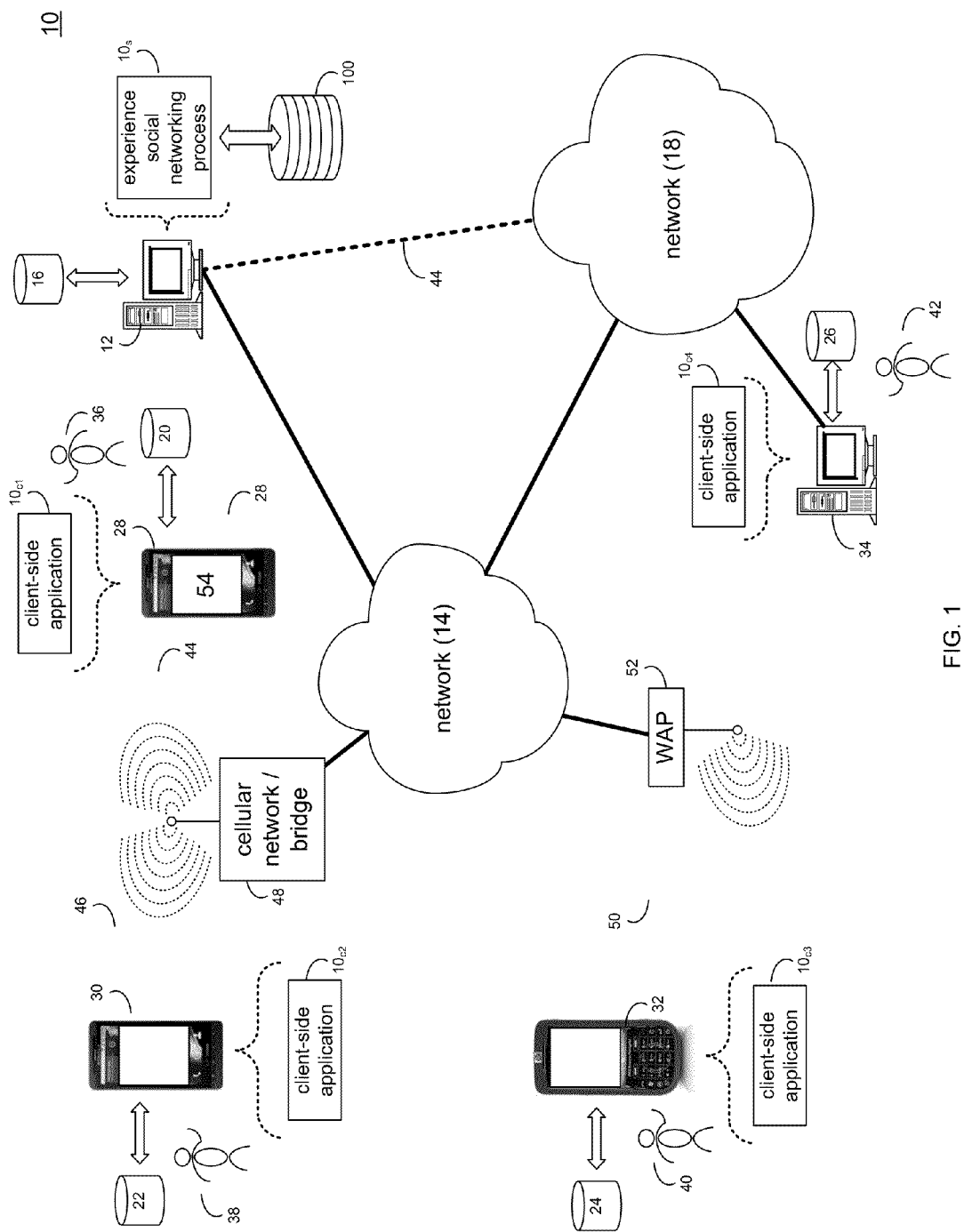
FIG. 1 is a diagrammatic view of a computing network including a computing device that executes an experience social networking process.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

System Overview:

Referring to FIG. 1, there is shown experience social networking process 10. Experience social networking process 10 may be implemented as a server-side process, a client-side process, or a hybrid server-side/client-side process. For example, experience social networking process 10 may be implemented as a purely server-side process via experience social networking process 10s. Alternatively, experience social networking process 10 may be implemented as a purely client-side process via one or more of client-side application 10c1, client-side application 10c2, client-side application 10c3, and client-side application 10c4. Alternatively still, experience social networking process 10 may be implemented as a hybrid server-side/client-side process via experience social networking process 10s and a combination of one or more of client-side application 10c1, client-side application 10c2, client-side application 10c3, and client-side application 10c4. Accordingly, experience social networking process 10 as used in this disclosure may include any combination of experience social networking process 10s, client-side application 10c1, client-side application 10c2, client-side application 10c3, and client-side application 10c4.

Experience social networking process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a server computer, a series of server computers, a mini computer, a mainframe computer, or a dedicated network device.

The instruction sets and subroutines of experience social networking process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, or a specialized application (e.g., a game application running on e.g., the Android™ platform and the iPhone™ platform). The instruction sets and subroutines of client-side application 10c1, 10c2, 10c3, 10c4, which may be stored on storage devices 20, 22, 24, 26 (respectively)

coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephones 28, 30, personal digital assistant 32, personal computer 34, a laptop computer (not shown), a notebook computer (not shown), a server computer (not shown), a gaming console (not shown), and a dedicated network device (not shown).

Users 36, 38, 40, 42 may access experience social networking process 10 directly through network 14 or through secondary network 18. Further, experience social networking process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephones 28, 30 are shown wirelessly coupled to network 14 via wireless communication channels 44, 46 (respectively) established between data-enabled, cellular telephones 28, 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection. WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 28, 30, 32, 34 may each execute an operating system, examples of which may include but are not limited to Microsoft Windows™, Android™, WebOS™, iOS™, Redhat Linux™, or a custom operating system.

The Experience Social Networking Process:

Experience social networking process 10 may control/include and be coupled to experience database 100. Experience social networking process 10 may allow various users to document and catalog various experiences so that others may read about (and possibly enjoy) the same. These various experiences may be stored within experience database 100. An example of experience database 100 may include but is not limited to a centralized, web-based experience database such as those available by Oracle™, Microsoft™ and Google™. Experience database 100 may be accessible via client electronic devices 28, 30, 32, 34 using one or more of client-side application 10c1, client-side application 10c2, client-side application 10c3, and client-side application 10c4. Accordingly, one or more of users 36, 38, 40, 42 (respectively) may review the various experiences catalogued within experience database 100 to determine whether or not they would like to enjoy such an experience.

Figure 2:
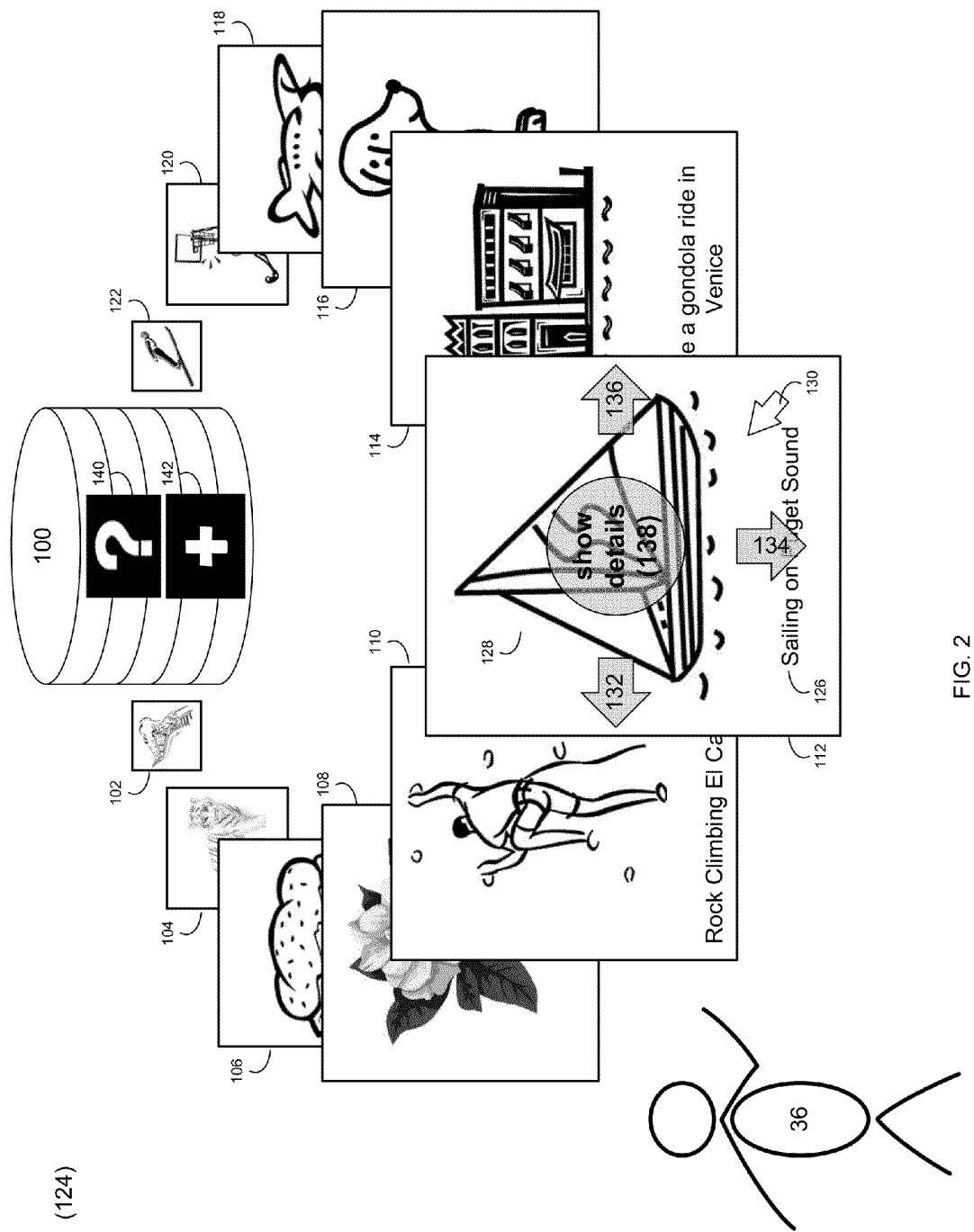
FIG. 2 is a diagrammatic representation of the experience social networking process of FIG. 1.

Referring also to FIG. 2, experience database 100 may be configured so that the various experiences stored within experience database 100 are presented to users (users 36, 38, 40, 42) as experience data cards (e.g. experience data cards 102, 104, 106, 108, 110, 112, 114, 116, 118, 120, 122). Experience social networking process 10 may be configured so that users 36, 38, 40, 42 may review the above-referenced experience data cards so that users 36, 38, 40, 42 may decide whether or not they would like to enjoy the experience described in the card. These experience data cards (e.g. experience data cards 102, 104, 106, 108, 110, 112, 114, 116, 118, 120, 122) may be presented to the various users within graphical user interface 124 rendered by experience social networking process 10.

The phrase "experience data card" as used herein encompasses its plain and ordinary meaning, including, but not limited to, a digital representation of e.g., an index card that may be used by one or more users of experience database 100 to document the experiences of those users. As will be explained below in greater detail, these cards may be "communal" in nature in that they may be modified/updated by multiple users to reflect the details of the individual experiences of the individual users.

Additionally and depending upon the manner in which experience social networking process 10 is configured, access to the experience data cards (e.g. experience data cards 102, 104, 106, 108, 110, 112, 114, 116, 118, 120, 122) included within experience database 100 may be restricted. For example, the various experience data cards may be made publically available to all users, may only be shared with users within a circle of the card's creator, may only be shared with users that are friends with the card's creator, or may only be accessible to users that are proximate a certain location (within a geo-fence or a predefined distance of the experience defined within the card).

For example and referring specifically to experience data card 112, experience data card 112 is shown to include title 126 (e.g. "Sailing on Puget Sound") and photograph 128 (e.g. a sailboat on Puget Sound). While experience data card 112 is shown to include title 126 and photograph 128, this is for illustrative purposes only and is not intended to be a limitation of this disclosure as the various experience data cards included within experience database 100 may be configured in accordance with the objectives of an administrator (not shown) of experience social networking process 10.

Assume for illustrative purposes that user 36 (via client-side application 10c1 and client electronic devices 28) is reviewing the various experience data cards included within experience database 100. As will be discussed below in greater detail, the manner in which e.g. user 36 cycles through and reviews the various experience data cards included within experience database 100 may vary in accordance with the type of client electronic device used by the user. For example, in the event that the client electronic device used by the user is a more traditional client electronic device (e.g. personal computer 34 or a laptop computer (not shown)), the user may cycle through the various experience data cards via an on-screen pointer (e.g., on-screen pointer 130) control by a pointing device (e.g. a mouse, not shown). Conversely, in the event that the client electronic device used by the user is a touch screen client electronic device (e.g. data-enabled, cellular telephones 28, 30, personal digital assistant 32, a tablet computer (not shown) or a touch screen computer (not shown)), the user may cycle through the various experience data cards via hand gestures (as will discussed below in greater detail).

For example and referring specifically to experience data card 112, experience social networking process 10 may render (e.g. as an overlay) one or more control indicia (e.g. left arrow 132, down arrow 134, right arrow 136, and "show details" button 138) that may allow (in this example) user 36 to manipulate the various experience data cards rendered within graphical user interface 124 by experience social networking process 10.

For example, if user 36 selects (via on-screen pointer 130 or a hand gesture) left arrow 132, experience social networking process 10 may move the above-described group of experience data cards rendered within graphical user interface 124 to the left. Therefore, experience social networking process 10 may move experience data card 114 (e.g., "Take a gondola ride in Venice") to the left and into the viewing position (previously held by experience data card 112) and may move experience data card 112 to the left from the viewing position into the position previously held by experience data card 110 (e.g., "Rock climbing El Capitan").

Further, if user 36 selects (via on-screen pointer 130 or a hand gesture) right arrow 136, experience social networking process 10 may move the above-described group of experience data cards rendered within graphical user interface 124 to the right. Therefore, experience social networking process 10 may move experience data card 110 (e.g., "Rock climbing El Capitan") to the right and into the viewing position (previously held by experience data card 112) and may move experience data card 112 to the right from the viewing position into the position previously held by experience data card 114 (e.g., "Take a gondola ride in Venice").

Assume for illustrative purposes that user 36, upon reviewing experience data card 112, is interested in learning more information concerning the same, user 36 may select (via on-screen pointer 130 or a hand gesture) "show details" button 138. Accordingly, experience social networking process 10 may obtain the appropriate information from experience database 100 and may render the same within graphical user interface 124.

Figure 3:
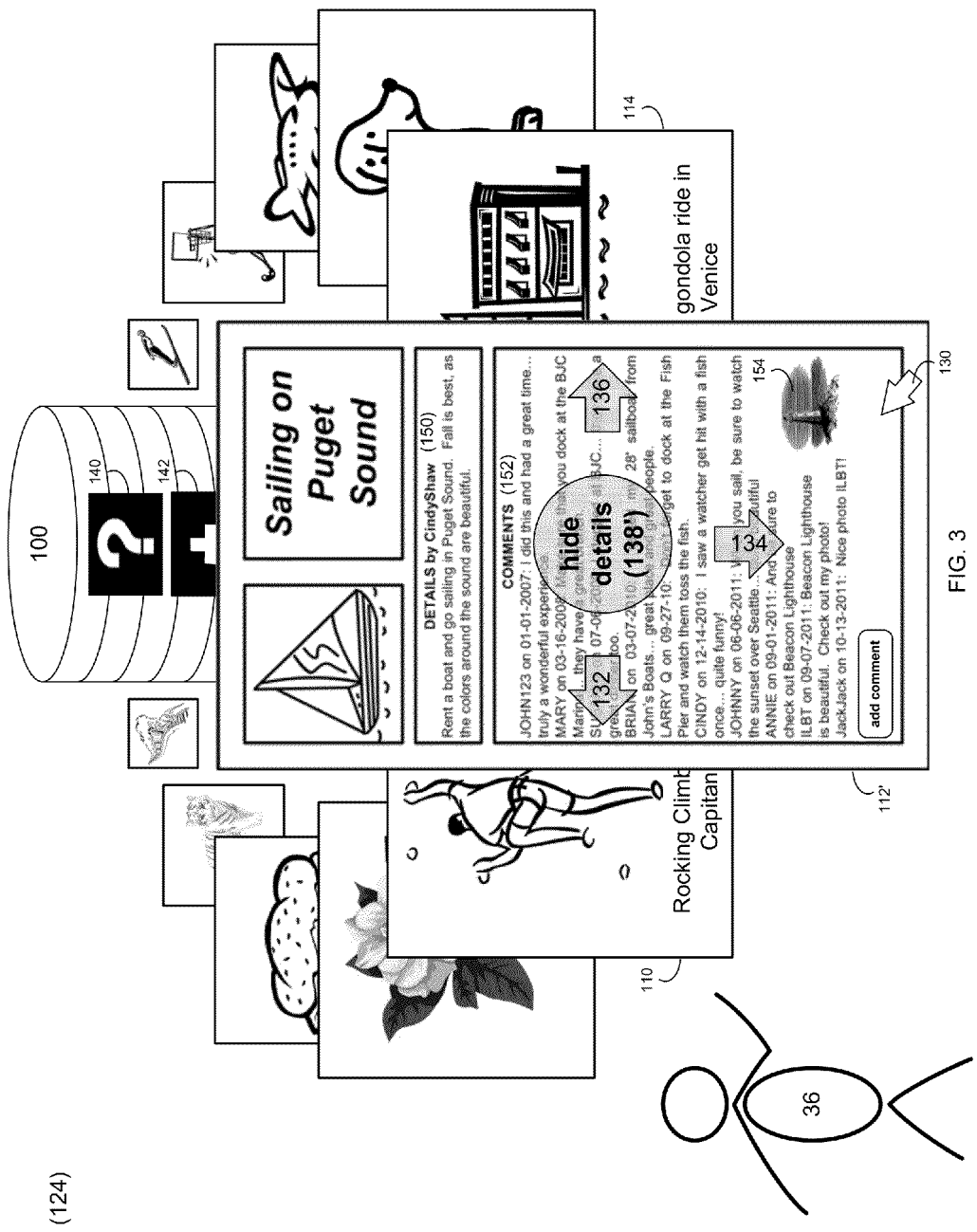
FIG. 3 is another diagrammatic representation of the experience social networking process of FIG. 1.

Referring also to FIG. 3, experience social networking process 10 may render a more detailed version of experience data card 112 (e.g., experience data card 112'). The following discussion of experience data card 112' is for illustrative purposes only and is not intended to be a limitation of this disclosure, as other configurations are possible. For example, the layout of experience data card 112' and the particular features included within experience data card 112' may be varied in accordance with the objectives of an administrator (not shown) of experience social networking process 10. Accordingly and for this example, experience data card 112' is shown to include additional information not included within experience data card 112, such as experience details 150 and user commentary 152.

When transitioning from experience data card 112 to experience data card 112', one or more animation techniques (e.g. a "flipping" animation technique, a "spinning" animation technique, or an "unfolding/origami" animation technique) may be utilized by experience social networking process 10 and rendered within graphical user interface 124.

Experience details 150 may include additional details provided by the creator of experience data card 112', namely "CindyShaw". Accordingly, the experience details 150 that are provided by "CindyShaw" (namely "Rent a boat and go sailing around Puget Sound. The fall is best, as the colors around the sound are beautiful.") are related to a particular experience of "CindyShaw", as opposed to a particular place of business visited by "CindyShaw".

User commentary 152 may include commentary provided by various users who could provide additional information concerning the experience described in experience data card 112'. For this particular disclosure, "commentary" as included within user commentary 152 is intended to include any information provided by a user, be it text-based information (e.g. text comments/feedback), photo-based information (e.g., photographs related to the experience), video-based information (e.g. videos related to the experience), audio-based information (e.g. audio recordings related to the experience), ratings (e.g., 0-10), symbols (e.g., thumbs up/thumbs down), colors (e.g., red, green, blue), and mood indicators (e.g. happy, sad, fun, boring). While the above-described list of commentary is intended to be illustrative, is not intended to be exhaustive. Accordingly, other types of commentary may be included within user commentary 152.

In the event that user 36 is no longer interested in reviewing experience data card 112', user 36 may select (via on-screen pointer 130 or a hand gesture) "hide details" button 138'. Accordingly, experience social networking process 10 may once again render the "less-detailed" version of experience data card 112' (namely experience data card 112) within graphical user interface 124.

When transitioning from experience data card 112' to experience data card 112, one or more animation techniques (e.g. a "flipping" animation technique, a "spinning" animation technique, or an "unfolding/origami" animation technique) may be utilized by experience social networking process 10 and rendered within graphical user interface 124.

Figure 4:
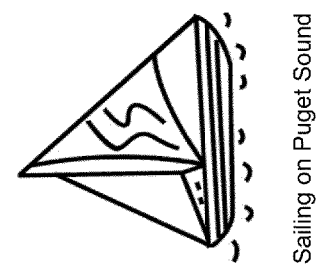
FIG. 4 is a diagrammatic view of an experience data card rendered by the experience social networking process of FIG. 1.

Referring also to FIG. 4 and as will be discussed below in greater detail, experience social networking process 10 may be configured to allow various users (e.g. user 36) to provide commentary concerning the experience described within e.g., experience data card 112'. As discussed above and for this disclosure, user commentary 152 may include any commentary that may be provided by users (e.g., text-based information; photo-based information; video-based information; audio-based information; ratings; symbols; colors; and mood indicators).

In the event that a user (e.g. user 36) wishes to provide commentary concerning the experience (e.g. the experience defined within experience data card 112'), user 36 may select "add comment" button 200. As discussed above, the manner in which e.g. user 36 select "add comment" button 200 may vary depending upon the type of client electronic device used by the user. For example, certain client electronic devices (e.g. personal computer 34 or a laptop computer (not shown)) may require the user to use an on-screen pointer (e.g., on-screen pointer 130) controllable by a pointing device (e.g. a mouse, not shown) while other touch-screen client electronic devices (e.g. data-enabled, cellular telephones 28, 30, personal digital assistant 32, a tablet computer (not shown) or a touch screen computer (not shown)) may allow the user to use hand gestures.

Figure 5:
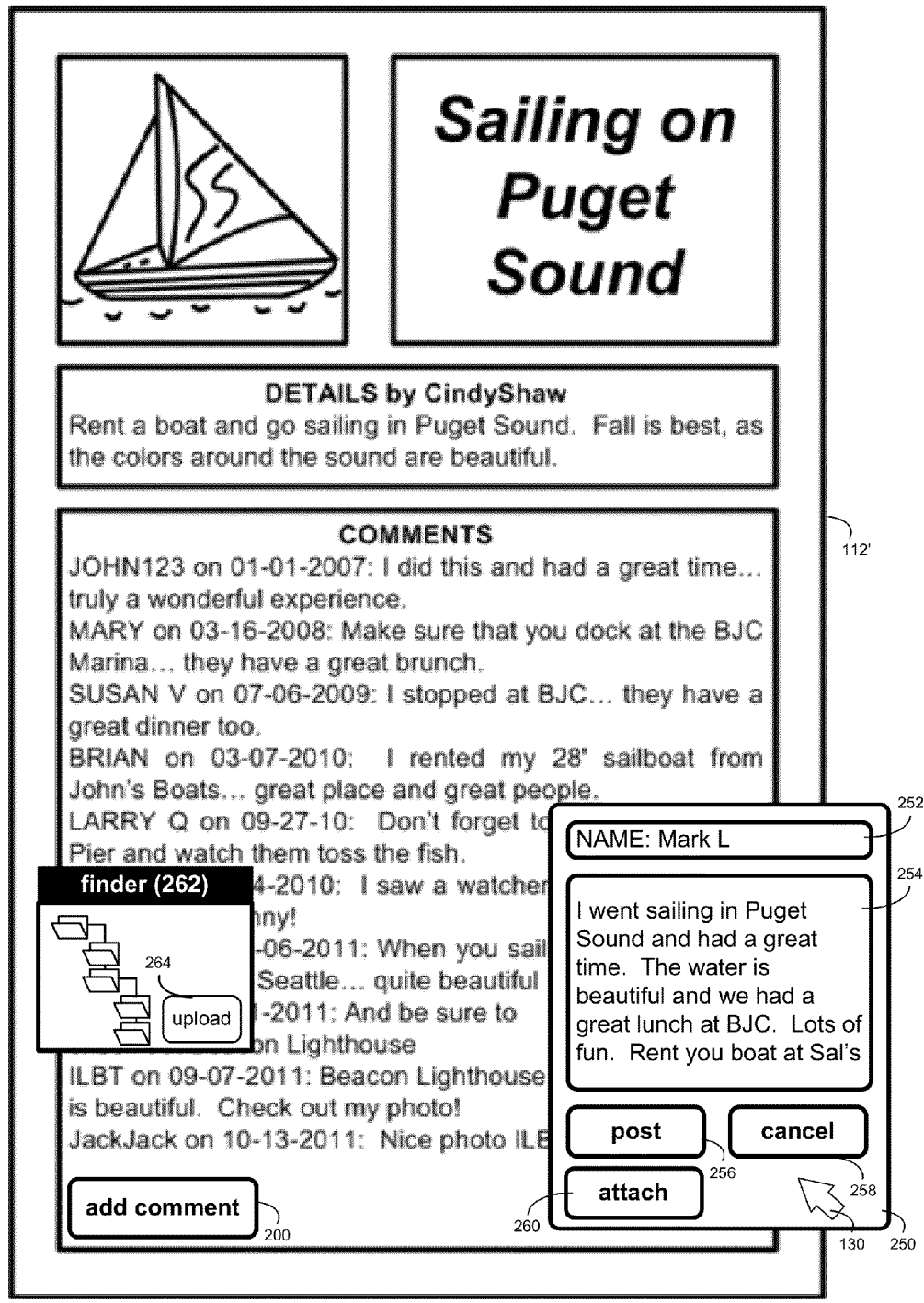
FIG. 5 is a diagrammatic view of a commentary window rendered by the experience social networking process of FIG. 1.

Accordingly and referring also to FIG. 5, once "add comment" button 200 is selected, experience social networking process 10 may render commentary window 250 within graphical user interface 124. Commentary window 250 may include name field 252 (which user 36 may populate with their screen name) and comment field 254 (which user 36 may populate with text-based commentary). Once fields 252, 254 are populated by user 36, user 36 may select "post" button 256 (via e.g. on-screen pointer 130 or a hand gesture) to post the text-based commentary to (in this example) experience data card 112'. Alternatively, user 36 may select "cancel" button 258 to abandon the posting operation. In the event that user 36 wants to provide some form of file-based commentary (e.g.

photo-based information; video-based information; audio-based information), user 36 may select "attach" button 260, wherein experience social networking process 10 may render finder window 262, which may allow user 36 to select the appropriate file for upload. Once the appropriate file is selected, user 36 may select "upload" button 264, resulting in the selected file being uploaded by experience social networking process 10 and made available within experience data card 112'. In the event that experience social networking process 10 is configured to allow other types of commentary (e.g. ratings; symbols; colors; and mood indicators), commentary window 250 may be configured to allow for the same. For example, commentary window 250 may include a thumbs-up button (not shown), a thumbs down button (not shown), one or more rating buttons/selectors (not shown), one or more color selectors (not shown) and/or one or more mood selectors (not shown).

In order to allow user 36 to more efficiently search the various experience data cards (e.g. experience data cards 102, 104, 106, 108, 110, 112, 114, 116, 118, 120, 122) included within experience database 100, experience social networking process 10 may be configured to allow user 36 to search experience database 100. For example and referring also to FIG. 6, user 36 may select (via e.g. on-screen pointer 130 or a hand gesture) search button 140 (see FIG. 2) and experience social network process 10 may render search window 300 that may allow user 36 to efficiently search experience database 100.

Specifically, when searching experience database 100, user 36 may take into consideration several factors. For the following discussion, the factors discussed are for illustrative purposes only and are not intended to be a limitation of this disclosure. For example, the factors searchable within experience database 100 may be configured in accordance with the objectives of an administrator (not shown) of experience social networking process 10.

One such factor that may be considered is cost 302. For example, in the event that user 36 does not wish to/cannot spend a lot of money, user 36 may wish to only consider experiences that are low-cost (e.g. a walk through Central Park in the spring). Alternatively, in the event that cost is a lesser concern, user 36 may wish to consider experiences that are higher cost (e.g. a private helicopter tour of Manhattan). Accordingly, experience social networking process 10 may be configured to allow user 36 to select a preferred cost within cost field 304 of search window 300.

Another factor that may be considered is age 306. For example, in the event that user 36 is alone or with a spouse/adult friend, user 36 may wish to consider adult experiences (e.g. visiting various bars/clubs in SoHo). Alternatively, in the event that user 36 is with family (which includes minor children), user 36 may wish to only consider experiences that do not have age restrictions (e.g. visiting the fair in Central Park). Accordingly, experience social networking process 10 may be configured to allow user 36 to select a preferred age within age field 308 of search window 300.

Another factor that may be considered is duration 310. For example, how long an experience is user 36 considering. Are they looking for an experience that may last all day (e.g. a tour of Napa Valley) or they looking for an experience that may be considerably shorter (e.g. a tour of Alcatraz Island). Accordingly, experience social networking process 10 may be configured to allow user 36 to select a preferred duration within duration field 312 of search window 300.

Another factor that may be considered is mood 314. For example, is user 36 interested in an energetic adventure (climbing the stairs to the observation deck of the Empire State Building) or a more relaxed experience (e.g., riding the Circle Line around Manhattan). Accordingly, experience social networking process 10 may be configured to allow user 36 to select a preferred mood within mood field 316 of search window 300.

Another factor that may be considered is location 318. For example, is user 36 interested in an experience at their current location (e.g., New York City) or an experience in a location that they will be visiting in the future (e.g., Paris, France). Accordingly, experience social networking process 10 may be configured to allow user 36 to select a preferred location within location field 320 of search window 300. Search windows 300 may also include "my current location" button 322 that may allow user 36 to quickly define their current location (as determined by e.g., triangulation or GPS technology) as their preferred location.

Additionally, through one or more configuration menus (not shown), user 36 may be able to define a radius/tolerance for location field 320. For example, experience social networking process 10 may be configured to allow user 36 to define an experience as being at a certain location if it is within e.g., a 5 mile, a 10 mile, or a 25 mile radius of the preferred location.

Another factor that may be considered is season 324. For example, user 36 may only be able to go skiing at Hunter Mountain during the winter, while user 36 may only be able to go hang-gliding in the Adirondacks during the summer. Accordingly, experience social networking process 10 may be configured to allow user 36 to select a preferred season within season field 326 of search window 300. Search windows 300 may also include "my current season" button 328 that may allow user 36 to quickly define the current season (as determined by an available calendar) as their preferred season.

Another factor that may be considered is weather 330. For example, user 36 may only desire to go to the Jersey Shore when it is sunny, while user 36 may only be interested to performing an indoor activity (e.g., going to the Museum of Natural History) when it is rainy/cold outside. Accordingly, experience social networking process 10 may be configured to allow user 36 to select preferred weather within weather field 332 of search window 300. Search windows 300 may also include "my current weather" button 334 that may allow user 36 to quickly define the current weather for their current location (as determined by e.g., triangulation or GPS technology and an accessible weather service) as their preferred weather.

Another factor that may be considered is time/date 336. For example, user 36 can only watch a sunrise in the morning and can only watch a sunset in the evening. Further, user 36 may only be able to attend a Friday Night Harbor Cruise on a Friday night (as opposed to a Thursday Night). Accordingly, experience social networking process 10 may be configured to allow user 36 to select a preferred time/date within time/date field 338 of search window 300. Search windows 300 may also include "my current time/date" button 340 that may allow user 36 to quickly define the current time/date (as determined by an available clock/calendar) as their preferred time/date.

Figure 7:
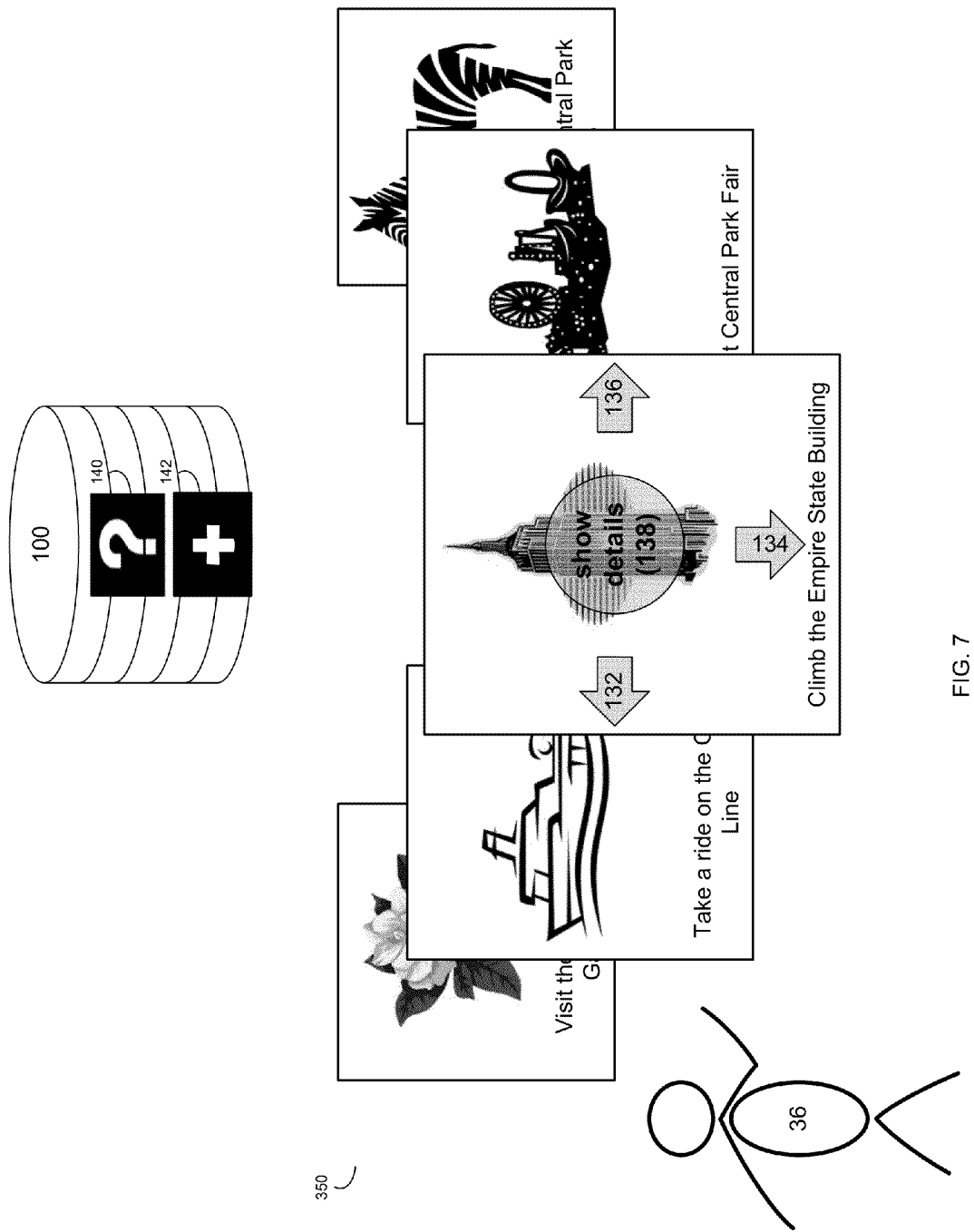
FIG. 7 is a diagrammatic view of a result set generated by the experience social networking process of FIG. 1.

Once search window 300 is wholly or partially populated by user 36, user 36 may select (via on-screen pointer 130 or a hand gesture) "search" button 342 within search window 300. Referring also to FIG. 7, upon selecting "search" button 342, result set 350 may be generated by experience social networking process 10 that includes a plurality of experience data cards that satisfy the above-described search criteria. User 26 may cycle through and review the individual experience data cards (namely experience data cards 352, 354, 356, 358, 360 included within result set 350) in the manner described above. While only five experience data cards are shown to be included within result set 350, this is for illustrative purposes only and is not intended to be a limitation of this disclosure.

Example System 1

It may be desirable for the above-described system to allow a user to easily browse through the available experience data cards and select those experience data cards that are of interest. For example, as the above-described system concerns an experience database, the system will oftentimes be accessed via handheld devices. Therefore, the system may be configured to allow the user to browse through the available experience data cards and select those that they are interested in via screen gestures. For example and while holding their handheld device, the user may swipe their finger across the screen (e.g. to the left or to the right) to browse through the experience data cards (e.g., those experience data cards related to a location of the handheld device or a location that the user has chosen) available on the experience database and may drag their finger downward to place a copy of that experience data card into their "tray" for subsequent review. Alternatively, the system may be configured so that a downward dragging motion of their finger automatically adds the selected experience data card to the experience to-do list of the user.

Figure 8:
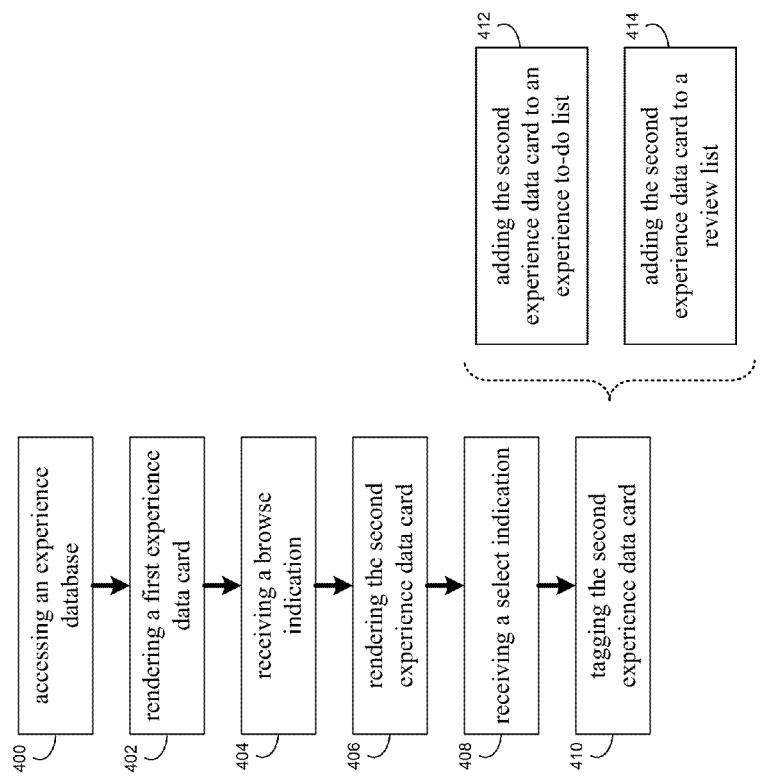
FIG. 8 is a diagrammatic view of a flowchart depicting operations consistent with an embodiment of the experience social networking process of FIG. 1.
Figure 9:
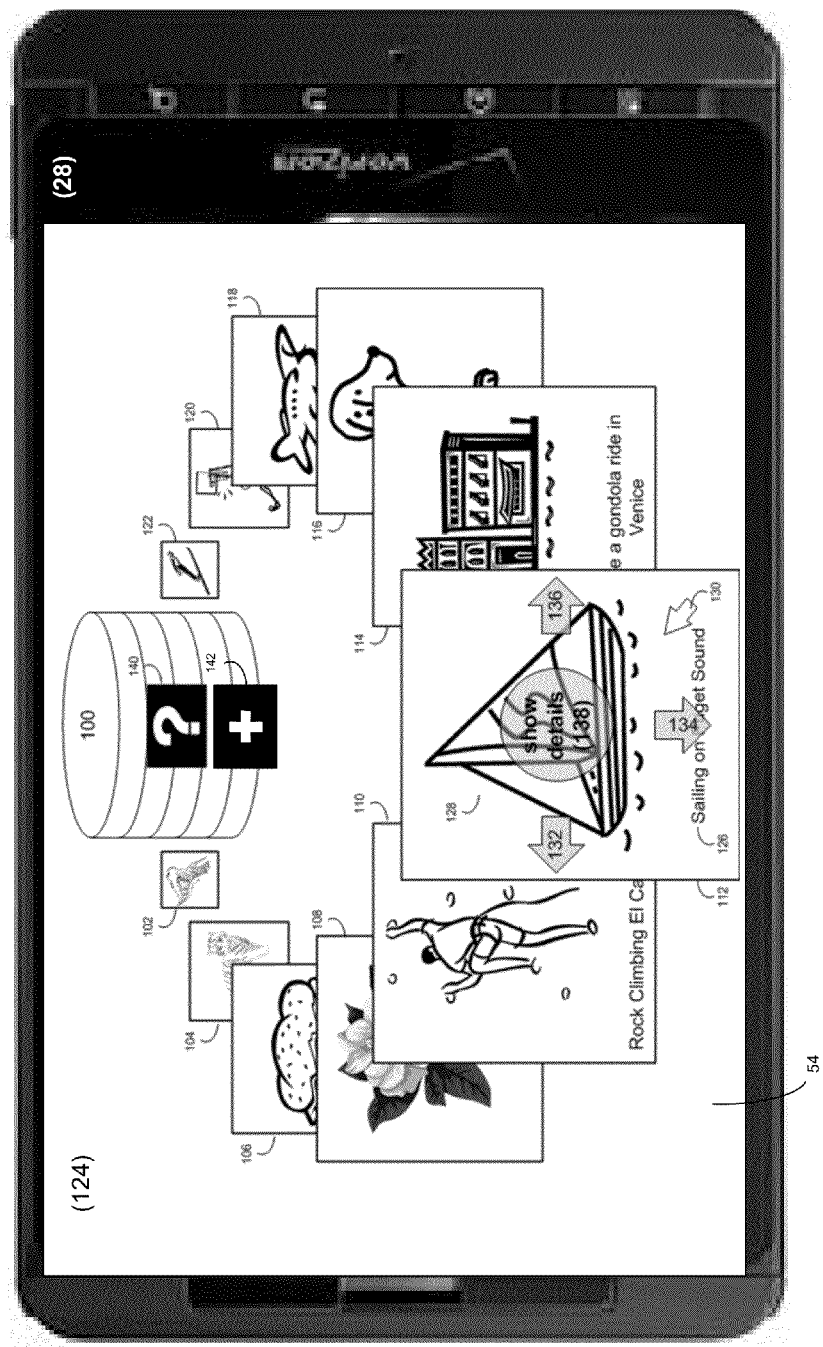
FIG. 9 is a diagrammatic view of graphical user interface rendered by the experience social networking process of FIG. 1.

Referring also to FIGS. 8 & 9 and as discussed above, experience social networking process 10 may be configured to access 400 experience database 100 via client electronic devices (e.g. data-enabled, cellular telephones 28, 30, personal digital assistant 32, personal computer 34, a laptop computer (not shown), a tablet computer (not shown) or a touch screen computer (not shown)).

Further and as discussed above, experience database 100 may include a plurality of experience data cards (e.g. experience data cards 102, 104, 106, 108, 110, 112, 114, 116, 118, 120, 122) that are each associated with an experience and are each accessible by users (e.g., users 36, 38, 40, 42) of experience database 100. Additionally and as discussed above, the various users (e.g., users 36, 38, 40, 42) may cycle through and review the various experience data cards included within experience database 100.

Accordingly, assume for illustrative purposes that user 36 is using client electronic device 28 and that a first experience data card (e.g., experience data card 112), chosen from the plurality of experience data cards (e.g. experience data cards 102, 104, 106, 108, 110, 112, 114, 116, 118, 120, 122), is rendered 402 by experience social networking process 10 on a display (e.g., display 54) associated with the client electronic device 28. Assume for this example that display 54 associated with client electronic device 28 is a touch screen display.

As is known in the art, a touch screen display is an electronic visual display that is configured to detect the presence and location of a "touch" within the display area. Typically, the "touch" generally refers to the touching of the touch screen display with a finger/hand. Alternatively, touch screen displays may be configured to sense passive objects (e.g., a stylus).

As discussed above, the manner in which e.g. user 36 cycles through and reviews the various experience data cards included within experience database 100 may vary depending upon the type of client electronic device used by the user. For example, in the event that the client electronic device used by the user is a more traditional client electronic device (e.g. personal computer 34 or a laptop computer (not shown)), the user may cycle through the various experience data cards via an on-screen pointer controllable by a pointing device (e.g. a mouse, not shown). Conversely, if the event that the client electronic device used by the user is a touch screen client electronic device (e.g. data-enabled, cellular telephones 28, 30, personal digital assistant 32, a tablet computer (not shown) or a touch screen computer (not shown)), the user may cycle through the various experience data cards via hand gestures.

As discussed above, display 54 associated with client electronic device 28 is a touch screen display. Accordingly, the various experience data cards may be manipulated via hand gestures. Assume that user 36 makes a hand gesture on display 54 of client electronic device 28. Accordingly, experience social networking process 10 may receive 404 a browse indication on a physical interface associated with client electronic device 28, requesting that client electronic device 28 render a second experience data card (e.g., experience data card 110), chosen from the plurality of experience data cards (e.g. experience data cards 102, 104, 106, 108, 110, 112, 114, 116, 118, 120, 122). For this example, the above-described physical interface associated with client electronic device 28 is display 54, as display 54 is a touch screen display. In the event that display 54 was not a touch screen display, the above-described physical interface associated with client electronic device 28 may include e.g., a joy stick or a touch pad.

The above-described browse indication may be generated in response to user 36 sweeping their finger in an essentially linear fashion across the above-described physical interface (e.g., display 54) included within client electronic device 28. For example, when sweeping their finger in an essentially linear fashion, user 36 may sweep their finger in an essentially horizontal fashion across the above-described physical interface included within client electronic device 28.

When determining whether user 36 is sweeping their finger in an essentially horizontal fashion, experience social networking process 10 may determine the tangent of the angle of the sweep and look for a tangent that is e.g., between 0.20 and −0.20 (within approximately 11 degrees of horizontal). In the event that the calculated tangent falls within this range, experience social networking process 10 may consider this to be a valid request that client electronic device 28 render a second experience data card. In the event that the calculated tangent falls outside of this range, experience social networking process 10 may consider the request invalid and may discard the same.

Assume that experience social networking process 10 considered the above-described hand gesture made by user 36 to be a valid request that client electronic device 28 render a second experience data card. Accordingly, experience social networking process 10 may render 406 second experience data card (e.g., experience data card 110) on display 54 associated with client electronic device 28 based, at least in part, upon the above-described browse indication.

When user 36 sweeps their finger in an essentially horizontal fashion across display 54 included within client electronic device 28, user 36 may sweep their finger in a left-to-right, essentially horizontal fashion across display 54 included within client electronic device 28 to iteratively cycle through the plurality of experience data cards (e.g. experience data cards 102, 104, 106, 108, 110, 112, 114, 116, 118, 120, 122) included within experience database 100 in a first direction (e.g., left to right).

For example, experience social networking process 10 may move experience data card 110 (e.g., "Rock climbing El Capitan") to the right and into the viewing position (previously held by experience data card 112) and may move experience data card 112 to the right from the viewing position into the position previously held by experience data card 114 (e.g., "Take a gondola ride in Venice").

Alternatively, when user 36 sweeps their finger in an essentially horizontal fashion across display 54 included within client electronic device 28, user 36 may sweep their finger in a right-to-left, essentially horizontal fashion across display 54 included within client electronic device 28 to iteratively cycle through the plurality of experience data cards (e.g. experience data cards 102, 104, 106, 108, 110, 112, 114, 116, 118, 120, 122) included within experience database 100 in a second direction (e.g., right to left).

For example, experience social networking process 10 may move experience data card 114 (e.g., "Take a gondola ride in Venice") to the left and into the viewing position (previously held by experience data card 112) and may move experience data card 112 to the left from the viewing position into the position previously held by experience data card 110 (e.g., "Rock climbing El Capitan").

Continuing with the above-stated example, assume for illustrative purposes that user 36 is interested in experience data card 110 and would like to enjoy such an experience (e.g., "Rock climbing El Capitan") sometime in the future. Accordingly, user 36 may select experience data card 110 for subsequent use.

As display 54 associated with client electronic device 28 is a touch screen display, user 36 may make a hand gesture on display 54 of client electronic device 28 to select experience data card 110 for subsequent use. In response to this hand gesture, experience social networking process 10 may receive 408 a select indication on client electronic device 28, requesting that client electronic device 28 tag e.g., experience data card 110.

Figure 10:
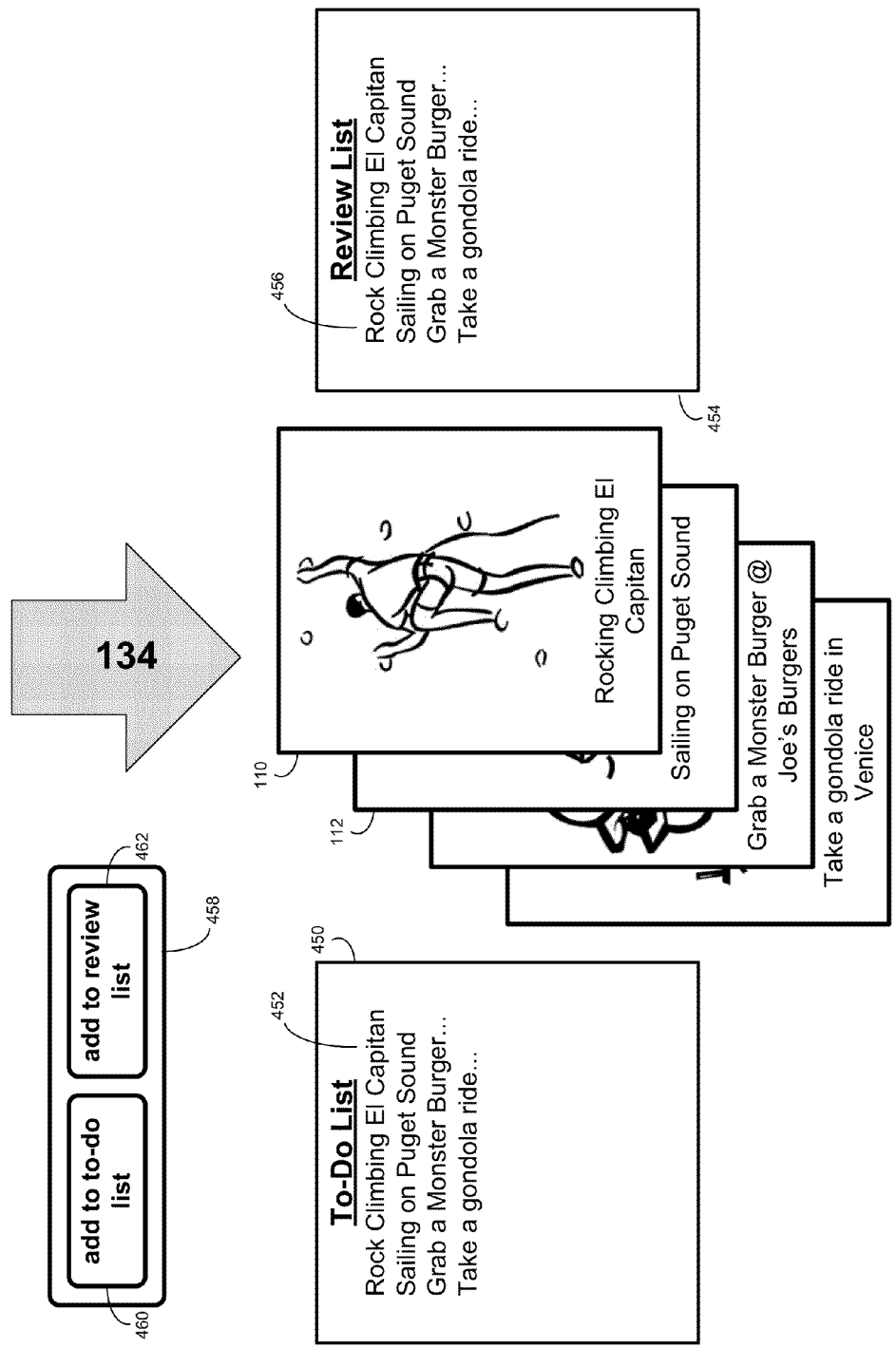
FIG. 10 is a diagrammatic view of an experience to-do-list and a review list rendered by the experience social networking process of FIG. 1.

Referring also to FIG. 10, the above-described select indication may be generated in response to user 36 sweeping their finger in an essentially vertical fashion (in the direction of arrow 134) across the physical interface included within client electronic device 28. As discussed above, the physical interface included within client electronic device 28 may be display 54, as display 54 is a touch screen display in this example.

When determining whether user 36 is sweeping their finger in an essentially vertical fashion, experience social networking process 10 may determine the tangent of the angle of the sweep and look for a tangent that is e.g., greater than 5.0 or less than −5.0 (within approximately 11 degrees of vertical). In the event that the calculated tangent falls within this range, experience social networking process 10 may consider this to be a valid request that client electronic device 28 tag experience data card 110. In the event that the calculated tangent falls outside of this range, experience social networking process 10 may consider the request invalid and may discard the same.

Assume that experience social networking process 10 considered the above-described hand gesture made by user 36 to be a valid request that client electronic device 28 tag experience data card 110. Accordingly, experience social networking process 10 may tag 410 experience data card 110.

When tagging 410 experience data card 110, experience social networking process 10 may add 412 experience data card 110 to experience to-do list 450 associated with user 36 on experience database 100. For example, when adding 412 experience data card 110 to experience to-do list 450, experience to-do list 450 may be modified to add a pointer (e.g., pointer 452) that points to experience data card 110. Accordingly, experience to-do list 450 may function as a running list of experiences that user 36 wishes to enjoy sometime in the future. If/when user 36 enjoys e.g., the experience defined within experience data card 110 and identified within experience to-do list 450, the pointer (e.g., pointer 452) associated with experience data card 110 and defined within experience to-do list 450 may be removed from experience to-do list 450.

When tagging 410 experience data card 110, experience social networking process 10 may add 414 experience data card 110 to review list 454 associated with user 36 on experience database 100. For example, when adding 414 experience data card 110 to review list 454, review list 454 may be modified to add a pointer (e.g., pointer 456) that points to experience data card 110. Accordingly, review list 454 may function as a running list of experiences that user 36 wishes to review sometime in the future. Accordingly, assume that when initially reviewing experience data card 110, user 36 is intrigued by experience data card 110 but is unsure as to if user 36 wants to add experience data card 110 to experience to-do list 450. Accordingly, user 36 may add experience data card 110 to review list 454 for subsequent review and consideration. In the event that user 36 subsequently determines that user 36 wants to add experience data card 110 to experience to-do list 450, user 26 may add the same to experience to-do list 450 (e.g., by adding pointer 452 to experience to-do list 450 that points to experience data card 110). Alternatively, user 36 may remove pointer 456 associated with experience data card 110 from review list 454 if user 36 is no longer interested in experience data card 110.

When initially tagging 410 e.g., experience data card 110, experience social networking process 10 may render tagging window 458 that allows user 36 to select e.g., "add to to-do list" button 460 (resulting in experience social networking process 10 adding pointer 452 to experience to-do list 450) or "add to review list" button 462 (resulting in experience social networking process 10 adding pointer 456 to review list 454).

Card Generation/Database Population:

As discussed above, experience database 100 may include a plurality of experience data cards (e.g. experience data cards 102, 104, 106, 108, 110, 112, 114, 116, 118, 120, 122). These experience data cards may be added to experience database 100 in a variety of different ways (e.g., manually from scratch, automatically based upon social media streams, manually based upon photographs, and/or manually based upon human processing of data), each of which will be discussed below in greater detail.

Figure 11:
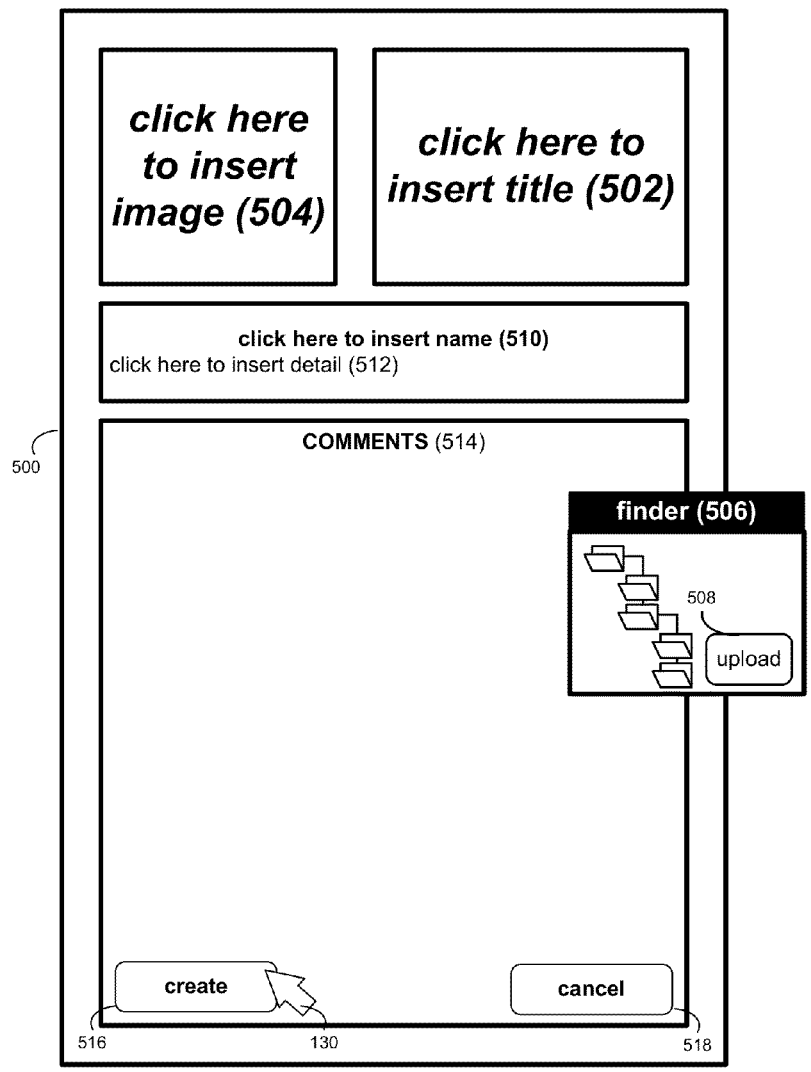
FIG. 11 is a diagrammatic view of a card creation window rendered by the experience social networking process of FIG. 1.

Referring also to FIG. 11, experience social networking process 10 may be configured to allow a user (e.g. user 36) to manually generate an experience data card from scratch. For example, user 36 may select "+" button 142 (see FIGS. 2, 3, 7, 10) via on-screen pointer 130 or a hand gesture, which may result in experience social networking process 10 rendering card creation window 500. Card creation window 500 may be configured to allow user 36 to generate one of the above-described experience data cards.

For example, card creation window 500 may include title entry field 502 that user 36 may select (via on-screen pointer 130 or a hand gesture) so that they may enter a title for the experience data card being generated. Further, card creation window 500 may include image entry field 504 that user 36 may select (via on-screen pointer 130 or a hand gesture) so that an image may be associated with the experience data card being generated. For example, upon selecting image entry field 504, finder window 506 may be rendered by experience social networking process 10 so that user 36 may locate an image file for inclusion within the experience data card being generated. Once the appropriate image file is located, user 36 may select "upload" button 508 so that experience social networking process 10 may upload the located image file to experience database 100 for use within the experience data card being generated.

Card creation window 500 may also include naming field 510, which user 36 may select (via on-screen pointer 130 or a hand gesture) so that the experience data card being generated can be associated with e.g. user 36. Further, card creation window 500 may include detail field 512, which (when selected via on-screen pointer 130 or a hand gesture) may allow user 36 to provide details concerning the experience defined within the experience data card being generated. As with the above-described experience data cards, the experience data card being generated may include comments field 514 that may be populated by subsequent viewers with comments concerning the experience defined within the experience data card being generated.

Once the various fields within card creation window 500 are populated by user 36, user 36 may select "create" button 516 (via on-screen pointer 130 or a hand gesture), thus resulting in experience social networking process 10 generating the experience data card defined within card creation window 500. Alternatively, user 36 may select "cancel" button 518 (via on-screen pointer 130 or a hand gesture) to abort the experience data card creation process.

Example System 2

Further and as discussed above, experience database 100 may include a plurality of experience data cards (e.g. experience data cards 102, 104, 106, 108, 110, 112, 114, 116, 118, 120, 122) that are each associated with an experience and are each accessible by users (e.g., users 36, 38, 40, 42) of experience database 100. Additionally and as discussed above, the various users (e.g., users 36, 38, 40, 42) may cycle through and review the various experience data cards included within experience database 100. The generation of an experience data card is discussed in further detail hereinbelow.

Figure 12:
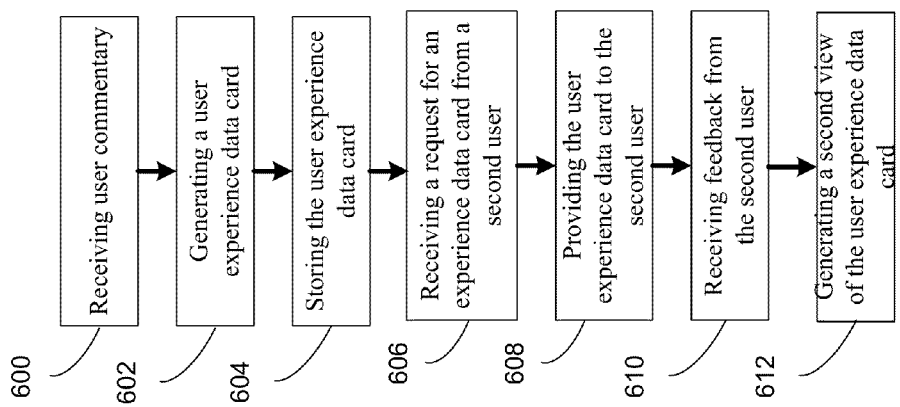
FIG. 12 is a diagrammatic view of a flowchart depicting operations consistent with an embodiment of the experience social networking process of FIG. 1.
Figure 13:
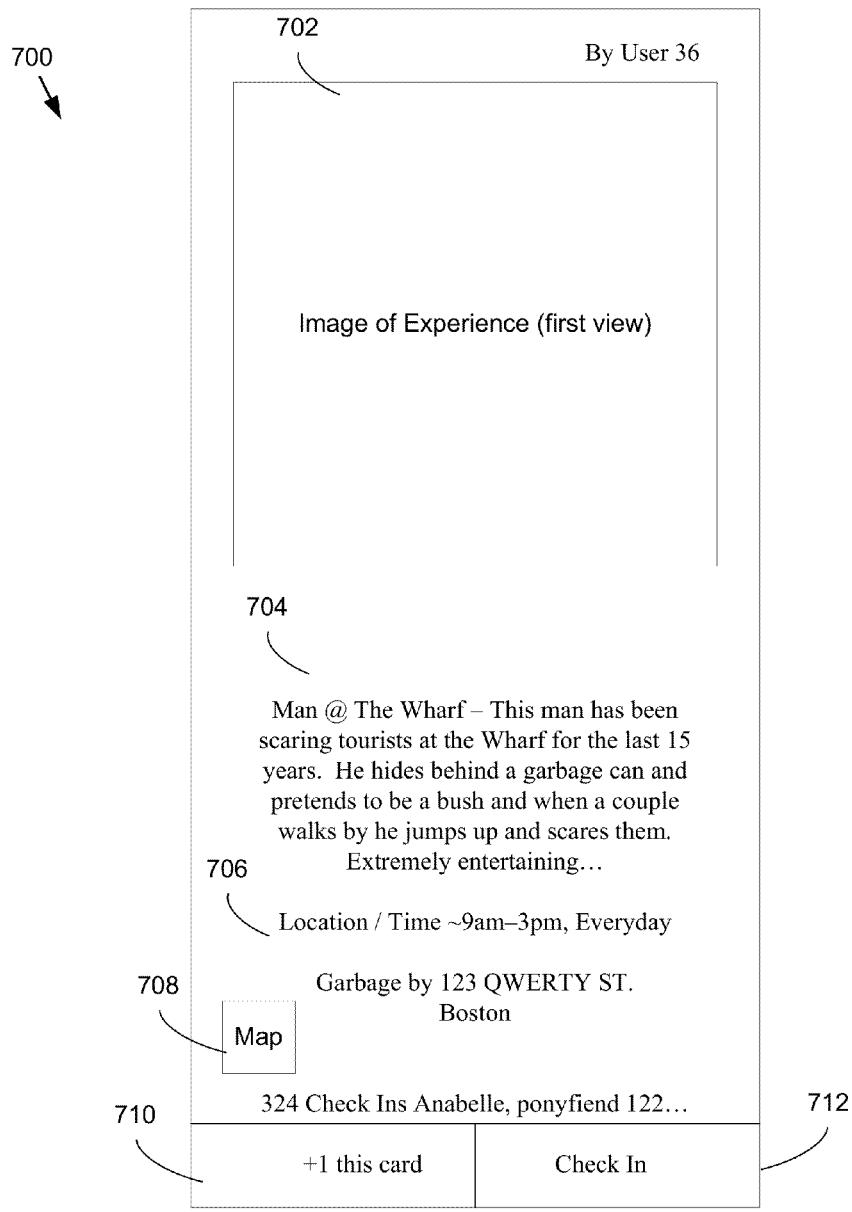
FIG. 13 is a diagrammatic view of an experience data card rendered by the experience social networking process of FIG. 1.

Referring also to FIGS. 12 & 13 and as discussed above, experience social networking process 10 may be configured to receive 600 user commentary concerning a user experience via client electronic devices (e.g., data-enabled, cellular telephones 28, 30, personal digital assistant 32, personal computer 34, laptop computer (not shown), a tablet computer (not shown) or a touch screen computer (not shown). As discussed above, a particular user (e.g. user 36) may wish to create an experience data card for any conceivable experience as is discussed in further detail hereinbelow.

Accordingly, experience social networking process 10 may be configured to generate 602 a user experience data card for the user experience based, at least in part, upon the user commentary. For example, a first user (e.g., one or more of users 36, 38, 40, 42) may witness an experience at a particular venue (e.g., the odd behavior of the man@the wharf shown in FIG. 13). The first user (e.g. user 36) may then generate user commentary, e.g., description of the man at the wharf, and store it as an experience data card (e.g., experience data card 700) in experience database 100. The user commentary need not be limited to descriptions as it may also include pictures, a location, a description, etc. A second user (e.g., user 38) may then go and witness the man at the wharf as set forth in the experience data card. The second user (e.g., user 38) may then update the experience described in the experience data card to reflect his or her own experience. Additionally and/or alternatively, the second user (e.g., user 38) may decide that the experience described in the experience data card is one that they wish to enjoy at some future time. In this example, the second user (e.g., user 38) may save the experience data card to a future experience list. As such, experience social networking process 10 may allow for individual users (e.g. user 38) to generate future experience lists that may be stored for their review and completion at a later date.

As discussed above, experience social networking process 10 may be configured to store 604 the user experience data card (e.g. experience data card 700) in experience database 100. In some embodiments, the stored user experience data card (e.g. experience data card 700) may correspond to a first view of the user experience data card. For example, experience data card 700 may include an image 702, which relates in some way to the experience. In this particular example, a photo showing the Man at the Wharf may be associated with experience data card 700.

As discussed above, experience data card may include numerous types of information, including, but not limited to, image 702, description 704, location/timing information 706, geographical information 708, and user commentary features 710 and 712. This information may be stored in experience database 100 and associated with experience data card 700. It should be noted that the type and manner of information set forth on experience data card 700 is merely provided by way of example, as any type of information may be included and may be displayed in any suitable manner.

In some embodiments, experience social networking process 10 may be configured to receive 706 a request for an experience data card from a second user (e.g., user 38). For example, user 38 may cycle through and review the various experience data cards located within experience database 100 using a client electronic device (e.g. data-enabled, cellular telephones 28, 30, personal digital assistant 32, personal computer 34, laptop computer (not shown), a tablet computer (not shown) or a touch screen computer (not shown), etc.). In this particular example, assume that user 38 would like to learn more about experience data card 700, i.e., the Man at the Wharf experience, which was created by user 36. Upon receiving the request from user 38, experience social networking process 10 may be configured to provide 708 user experience data card 700 to user 38.

In some embodiments, once user 38 has received user experience data card 700, he or she may wish to participate in the experience themselves. For example, user 38 may participate in the Man at the Wharf experience, possibly getting their picture taken with the man, etc. User 38 may then provide commentary regarding the experience via a client electronic device (e.g. data-enabled, cellular telephones 28, 30, personal digital assistant 32, personal computer 34, laptop computer (not shown), a tablet computer (not shown) or a touch screen computer (not shown), etc.). Additionally and/or alternatively, experience social networking process 10 may allow user 38 to save the user experience data card to his or her future experience list.

In the event that user 38 does participate in the experience, experience social networking process 10 may be configured to receive 610 feedback from user 38 concerning user experience data card 700. The feedback may include user commentary such as the pictures and descriptions described above. For example, the user commentary may include the picture taken of user 38 and the Man at the Wharf.

Figure 14:
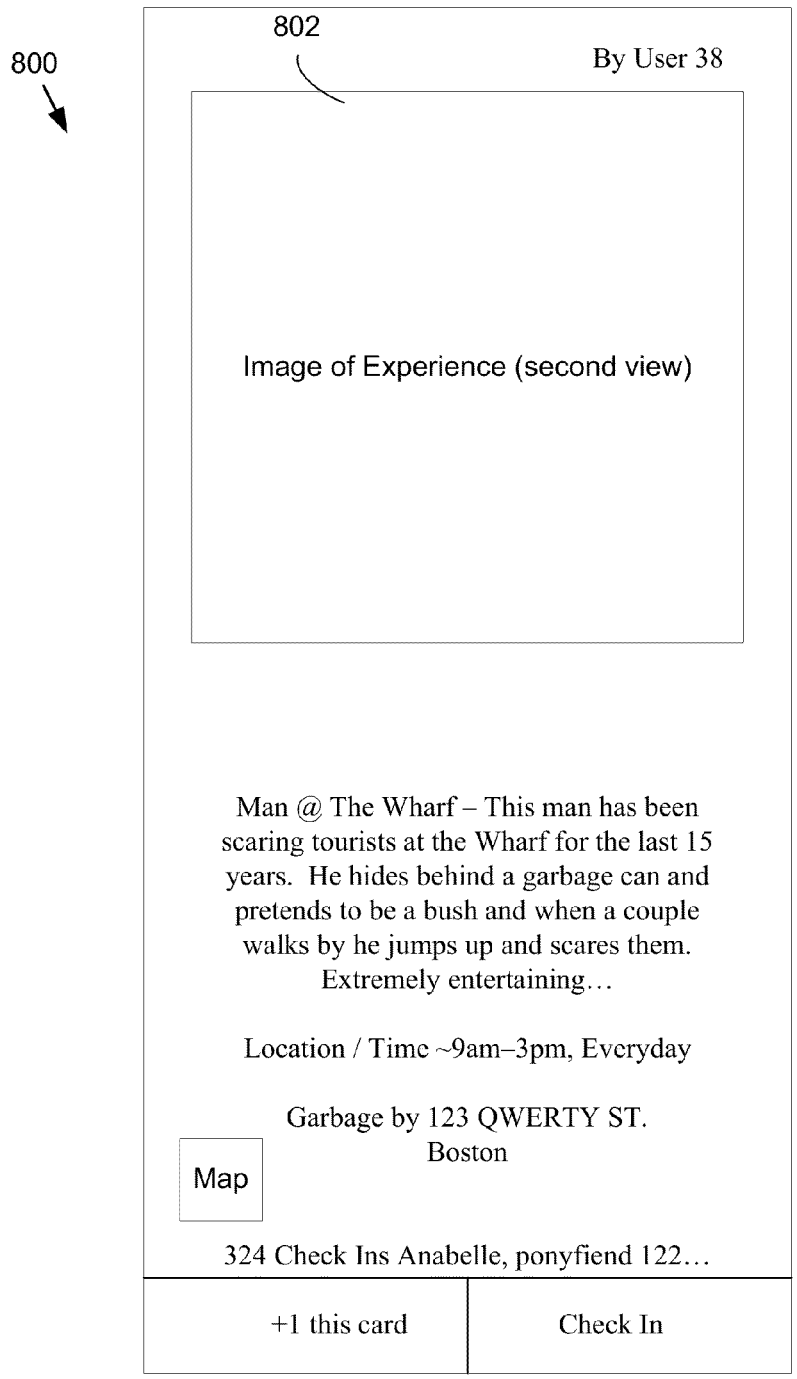
FIG. 14 is a diagrammatic view of an experience data card rendered by the experience social networking process of FIG. 1.

In this way, experience social networking process 10 may be configured to generate 612 a second view of the user experience data card 800. The second view may be based at least partially upon the feedback/user commentary from user 38. For example, the second view of user experience data card 800 may include image 802, which may include the photo of user 38 and the man at the wharf. In other words, the second view (e.g. FIG. 14) may provide a user experience data card that is distinct from the first view of the experience data card shown in FIG. 13. It should be noted that the distinct aspects of user experience data card 2.3.00 shown in FIG. 14 are not limited merely to altering images, as the second user (e.g. user 38) may alter any or all aspects of user experience data card 700 (e.g., description, time, layout of the card, etc.).

In some embodiments, experience social networking process 10 may be configured to receive a second request for a second request experience data card from a third user (e.g. user 40). For example, user 40 may cycle through and review the various experience data cards located within experience database 100 using a client electronic device (e.g. data-enabled, cellular telephones 28, 30, personal digital assistant 32, personal computer 34, laptop computer (not shown), a tablet computer (not shown) or a touch screen computer (not shown), etc.). In this particular example, assume that user 40 would like to learn more about the Man at the Wharf experience. Accordingly, experience social networking process 10 may be configured to determine whether to present the experience data card to user 40 in response to the second request. When experience social networking process 10 decides to present the experience data card to user 40 based on the second request, experience social networking process 10 may be configured to determine whether to present user 40 with the first view of the experience data card (e.g. shown in FIG. 13) or the second view of the experience data card (e.g. shown in FIG. 14). This determination may be based on any number of factors as described in further detail hereinbelow.

As discussed above, experience social networking process 10 may present either the first view of the experience data card (e.g. FIG. 13) or the second view of the experience data card (e.g. FIG. 14) to the third user (e.g. user 40). In some embodiments, determining whether to present the third user with the first view or the second view of the experience data card may be based on any number of factors. For example, in some embodiments, experience social networking process 10 may determine a first social affinity of the third user with the first user (e.g. between user 36 and user 40. Similarly, experience social networking process 10 may determine a second social affinity (e.g. between user 38 and user 40). In this way, experience social networking process 10 may determine whether to present user 40 with the first view or the second view of the experience data card based, at least partially upon who user 40 has a more relevant social affinity. For example, if user 40 is a friend of user 38 but not of user 36, then experience social networking process 10 may determine that the second view of the experience data card (FIG. 14) is more appropriate, as user 40 would likely prefer to see the image of user 40 with the Man at the Wharf.

As discussed above, experience social networking process 10 may provide one or more users (e.g. users 36, 38, 40, 42) with the ability to provide user commentary and/or feedback associated with the experience data card (e.g. experience data card 102). For the purposes of this disclosure, user commentary may include, but is not limited to, text-based commentary, video-based commentary, audio-based commentary, and/or photographic commentary, etc. These types of commentary are provided merely by way of example as any type of commentary and/or user feedback may be associated with the experience data cards described herein.

Example System 3

As discussed above, experience database 100 may include a plurality of experience data cards (e.g. experience data cards 102, 104, 106, 108, 110, 112, 114, 116, 118, 120, 122) that are each associated with an experience and are each accessible by users (e.g., users 36, 38, 40, 42) of experience database 100. Additionally and as discussed above, the various users (e.g., users 36, 38, 40, 42) may cycle through and review the various experience data cards included within experience database 100. The creation and/or use of an experience data card from a social networking stream is discussed in further detail hereinbelow.

Figure 16:
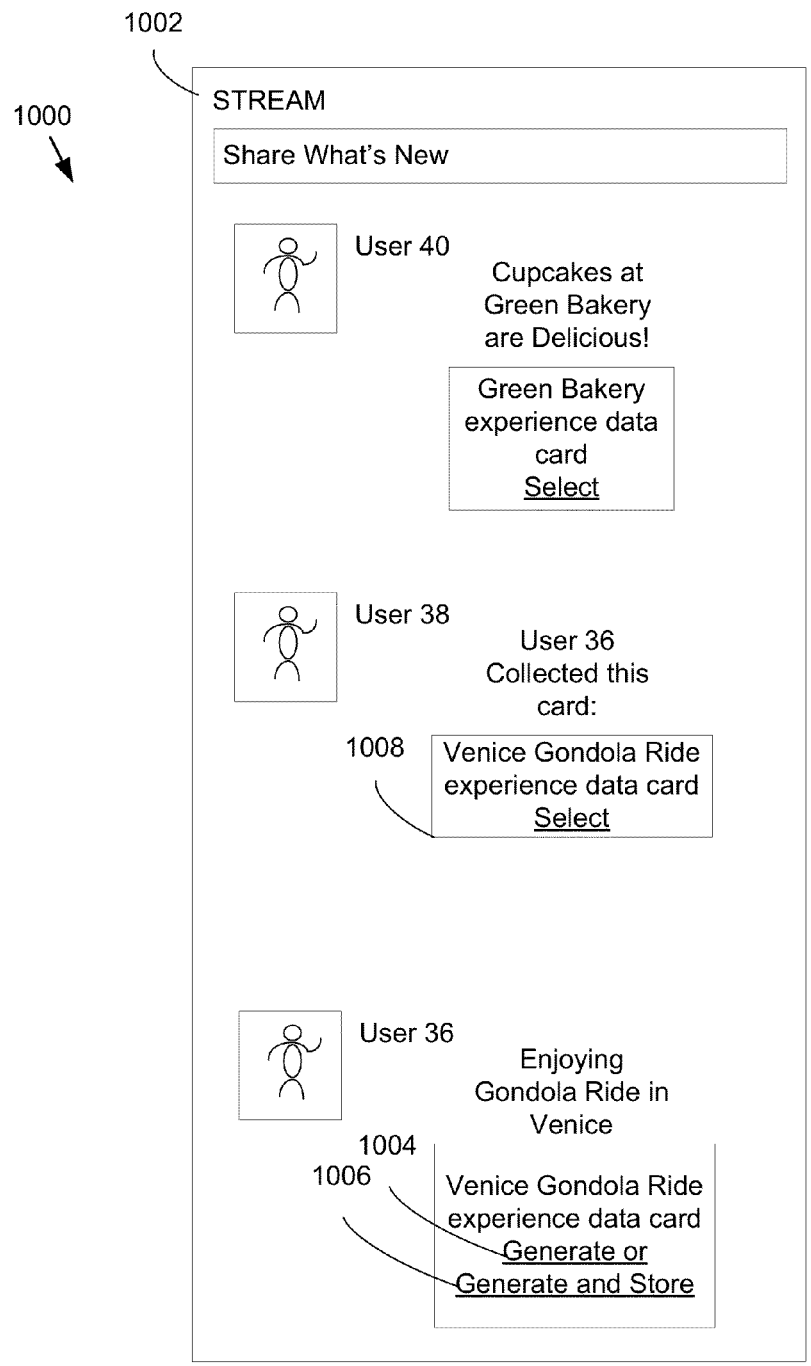
FIG. 16 is a diagrammatic view of a social networking stream having experience data card generation capabilities consistent with an embodiment of the experience social networking process of FIG. 1.

Embodiments described herein provide a user interface, which may enable a collection of an experience data card (e.g. experience data cards 102, 104, 106, 108, 110, 112, 114, 116, 118, 120, 122) in the form of a persistent object from within a social networking stream. The persistent objects may go along with certain posts to a social network. For example, representations of experience data cards could show up whenever they are valuable and enhance a post or commentary. For example, a post which says that the "Cupcakes at Green Bakery are delicious" (as shown in FIG. 16) could have a card which represents the cupcakes at Green Bakery. In this way, that card could go along with the post and if a reader of the post wanted to save that information for later, they could collect the card from the post and keep it where they could access it later. In some embodiments, the cards may be global, e.g., if a user (e.g., user 36, 38, 40, 42) commented on the Green Bakery cupcake card, that comment would show up on the card itself that the reader has collected. In some embodiments, the card may be automatically generated based upon the post. Alternatively, a user (e.g., user 36, 38, 40, 42) may post an experience data card along with a post. Additionally and/or alternatively, the card may be have been generated previously and may be included within the post because of matching text.

Figure 15:
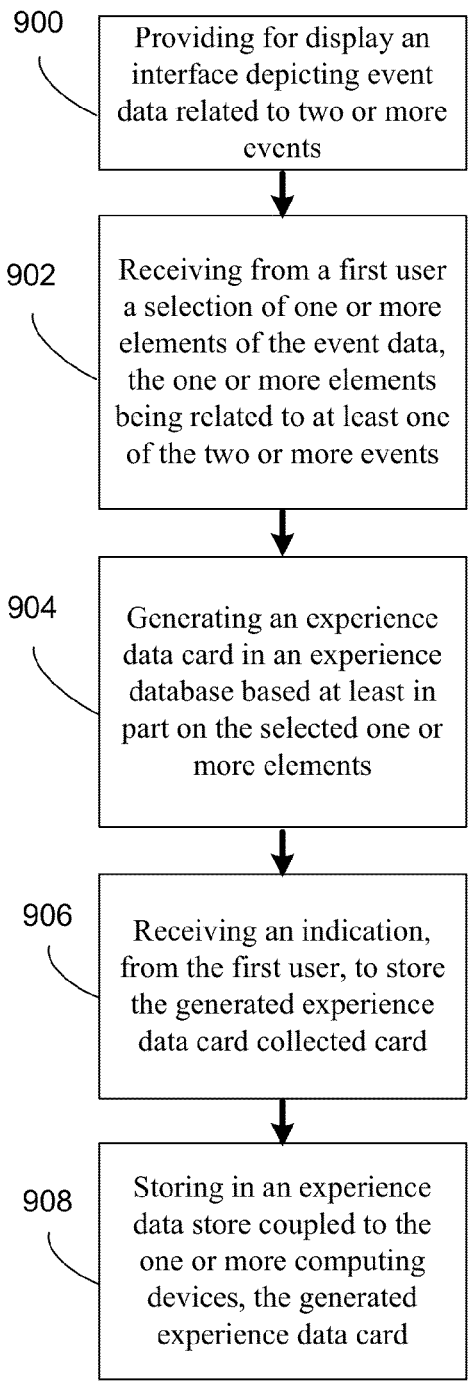
FIG. 15 is a diagrammatic view of a flowchart depicting operations consistent with an embodiment of the experience social networking process of FIG. 1.

Referring also to FIGS. 15 & 16, and as discussed above, experience social networking process 10 may be configured to provide 900 for display an interface 1000 depicting event data related to two or more events. The phrase "event data", as used herein, may refer to any publicly or privately posted material (e.g. one or more elements of a social networking stream, webpage, text, figures, video, audio, etc.).

As shown, in FIG. 3.2.00 an embodiment depicting an interface 1000 including a social networking stream 1002 is provided. As is known in the art, social networking stream 1002 may allow for various users to post information (e.g. textual posts, images, videos, etc.) either publicly or privately for review by other users associated with the social network.

Accordingly, experience social networking process 10 may be configured to receive from a first user (e.g. user 36) a selection of one or more elements of the event data. For example, in FIG. 3.2, user 36 may wish to create an experience data card describing his or her participation in a Gondola Ride in Venice. In this way, experience social networking process 10 may identify potential experiences for card generation manually (e.g. upon receiving user input such placing the cursor over "Gondola Ride in Venice", right-clicking, etc.), automatically upon identifying certain words or phrases within the event data, or using any other suitable method. As shown in FIG. 16, the particular elements selected may be related to the event data present within social networking stream 1002.

Accordingly, once the experience has been selected and/or identified, experience social networking process 10 may be configured to generate 904 an experience data card (e.g. experience data cards 102, 104, 106, 108, 110, 112, 114, 116, 118, 120, 122). As discussed herein, the generated experience data card may be stored in experience database 100 and may be based at least partially upon the elements selected from social networking stream 1002.

In this way, user 36 may select "Generate" button 1004, which may allow for the generation of an experience data card (e.g. experience data cards 102, 104, 106, 108, 110, 112, 114, 116, 118, 120, 122) outlining the details of his/her experience. Generate button 1004 may appear, for example, upon user 36 selecting and/or identifying "Gondola Ride in Venice" as something that he or she is interested in creating an experience data card around. It should be noted that Generate button 1004 is provided merely by way of example, as numerous additional techniques may be employed in order to allow the user to generate an experience data card. The generated experience data card may include, but is not limited to, a written description, a photograph, and a geographical location as discussed above.

Additionally and/or alternatively, in some embodiments, experience social networking process 10 may be configured to receive 1006 an indication, from the first user, to store the generated experience data card collected card. For example, and as shown in FIG. 1000, user 36 may select Generate and Store option 1106 associated with the "Gondola Ride in Venice" experience. Once selected, experience social networking process 10 may be configured to generate an experience data card as outlined above and may further allow user 36 to store the generated experience data card in an experience data store (e.g. experience database 100).

In some embodiments, experience social networking process 10 may be configured to provide a representation of the experience data card for display to a second user. For example, and as shown in FIG. 16, once user 36 has decided to generate an experience data card (e.g. the Venice Gondola Ride Experience data card), that card may be provided to a second user (e.g. user 38) via any suitable method, including, but not limited to, social networking stream 1002. In this way, user 38 may receive an option to review the Venice Gondola Ride experience data card using any suitable method. In this particular example, user 38 may identify and/or choose Select Button 1008 in order to render the Venice Gondola Ride experience data card. Experience social networking process 10 may be configured to provide each user (e.g., user 36, 38, 40, 42) with the opportunity to store an experience data card at any time.

Additionally and/or alternatively, experience social networking process 10 may be configured to receive a comment from the second user, which may be associated with the experience data card. For example, user 38 may select the Venice Gondola Ride Experience data card via Select Button 1008. Once user 38 has accessed the card, he or she may provide comments in any suitable manner, such as those described herein. The comments provided by user 38 may be stored in an experience data store (e.g. experience database 100).

Figure 17:
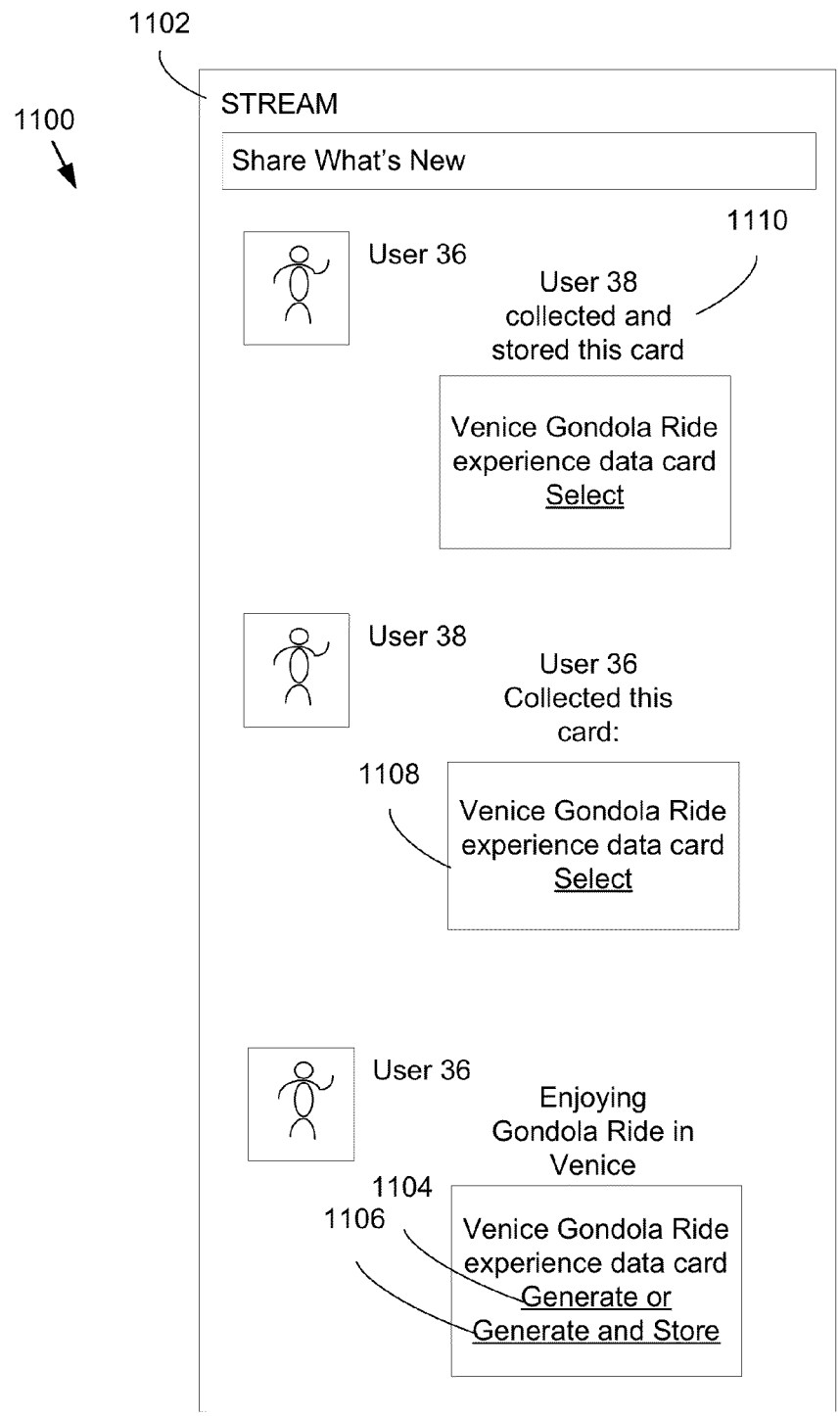
FIG. 17 is a diagrammatic view of a social networking stream having experience data card generation capabilities consistent with an embodiment of the experience social networking process of FIG. 1.

Referring now to FIG. 17, experience social networking process 10 may be configured to provide a notification to the first user that a member of the first user's social networking stream collected the generated experience data card. For example, and as shown in FIG. 17, user 36 may receive a notification 1010 that user 38 collected the Venice Gondola Ride Experience data card. Additionally and/or alternatively, experience social networking process 10 may be configured to generate an indication 1010 that one or more of the users (e.g., user 36, 38, 40, 42) stored the collected card. As shown in FIG. 17, indication 1010 may be provided at the stream 1102 of event data.

Additionally and/or alternatively, experience social networking process 10 may be configured to receive comments associated with the experience data card from a plurality of users (e.g., some or all of users 36, 38, 40, 42). In some cases, the comments received may be provided by users other than the user who created the experience data card.

Example System 4

As discussed above with reference to FIG. 6, a user of a social network may be provided with a suggested experience. This suggested experience may take into account a number of factors. As is discussed in further detail hereinbelow, some factors may include, but are not limited to the member's current location, the member's interests, the time of day, the time of the experience, etc.

For example, a user (e.g. user 36) may be located in a particular city (e.g. Boston). Experience social networking process 10 may be used to determine the location of user 36 using GPS coordinates or any other suitable technique. Additionally and/or alternatively, experience social networking process 10 may also be used to determine the interests of user 36, for example, by parsing publicly available profile data pertaining to user 36 (e.g. user 36's social networking page, etc.). Using the location of user 36 and his/her interests, experience social networking process 10 may be configured to provide a suggested experience for user 36. In this particular example, if user 36 were located in Boston and it was determined that she enjoyed marine biology a suggested experience might be a whalewatching excursion out of Boston Harbor.

Figure 18:
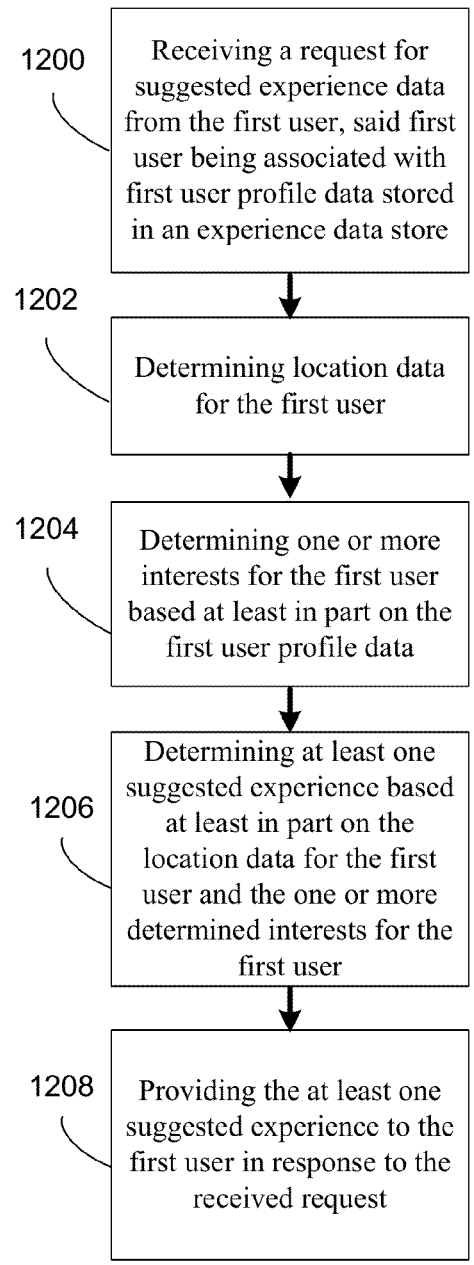
FIG. 18 is a diagrammatic view of a flowchart depicting operations consistent with an embodiment of the experience social networking process of FIG. 1.
Figure 19:
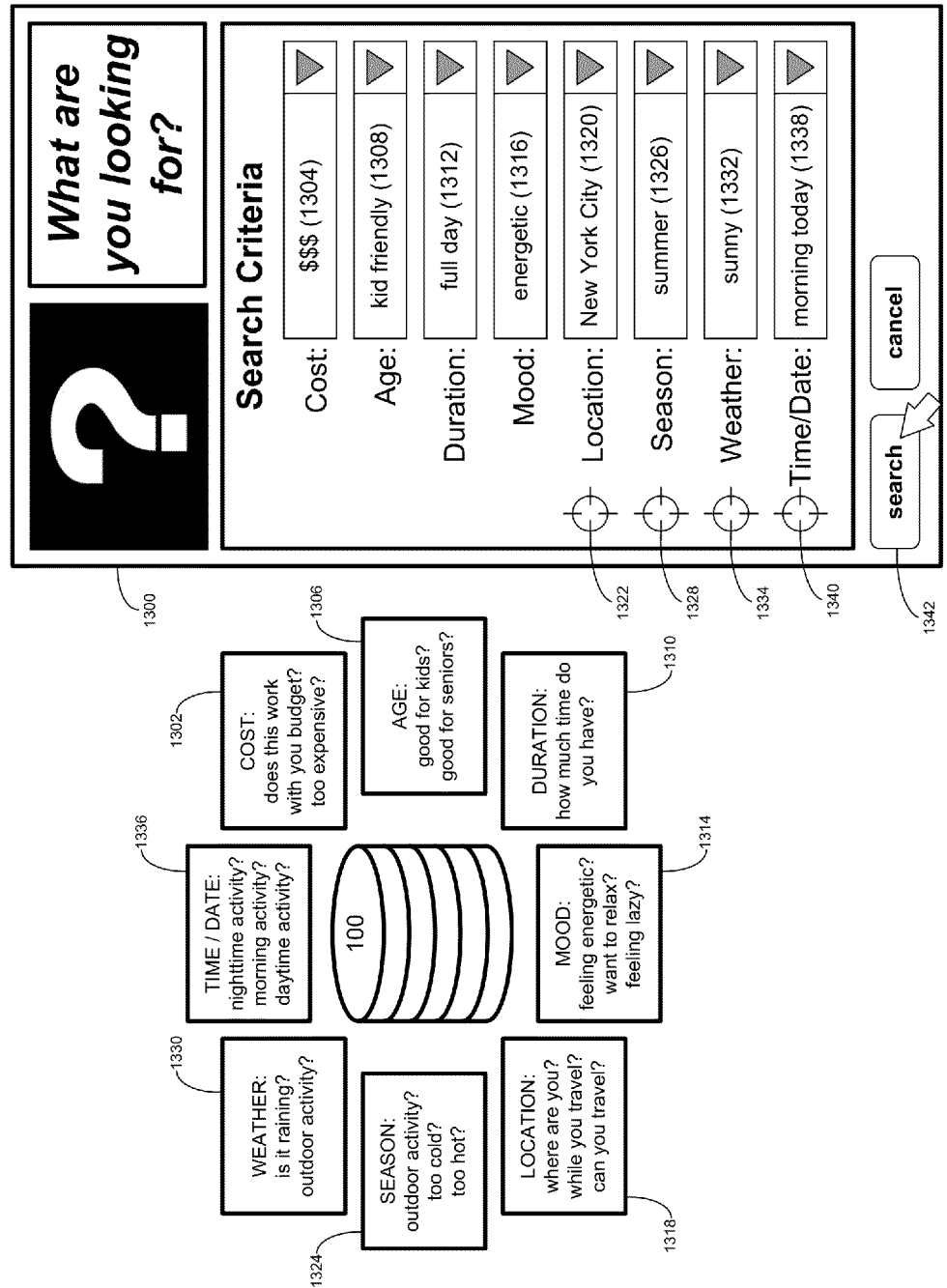
FIG. 19 is a diagrammatic view of a search window rendered by the experience social networking process of FIG. 1.
Figure 20:
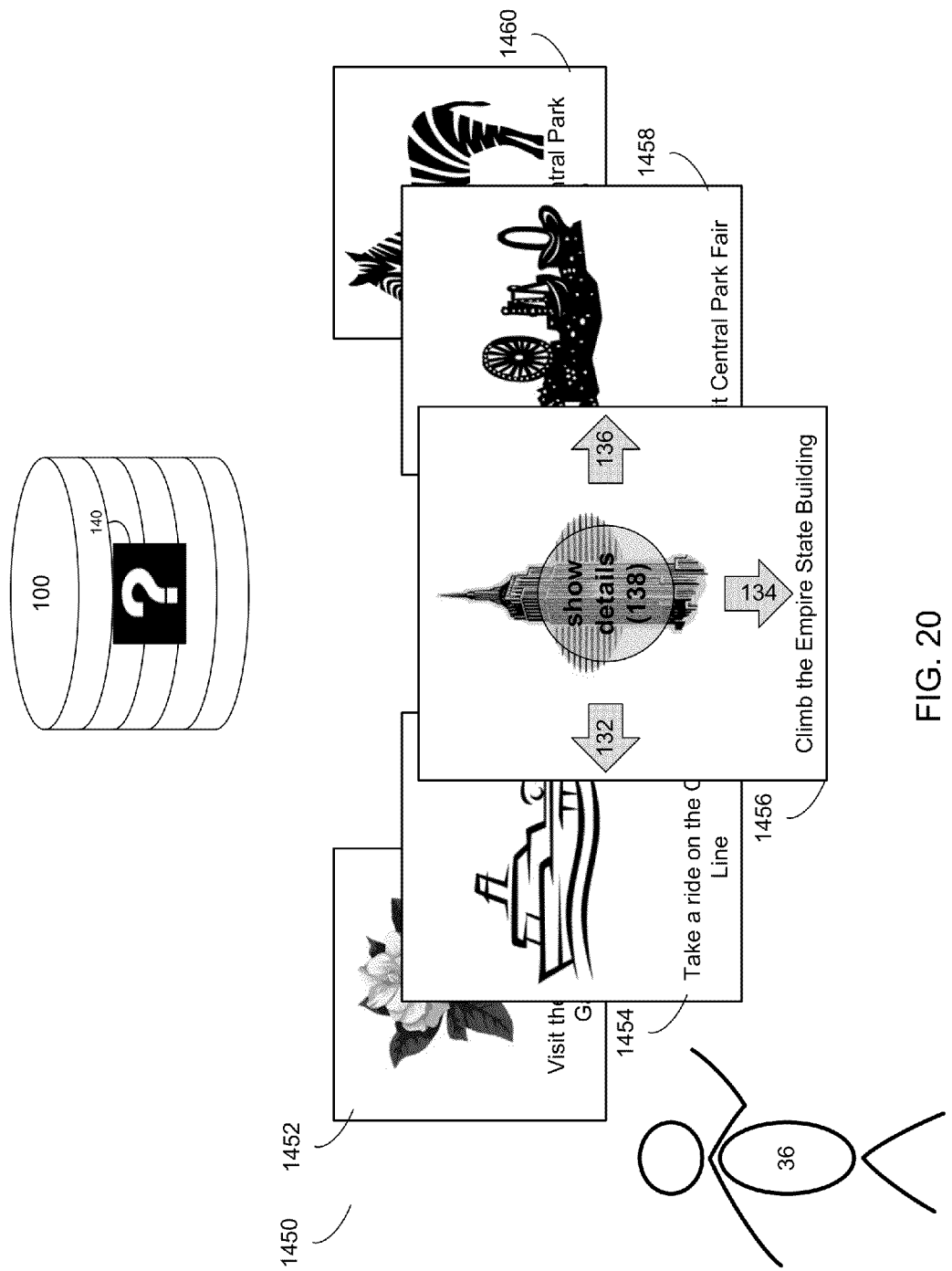
FIG. 20 is a diagrammatic view of a result set generated by the experience social networking process of FIG. 1.

Referring now to FIGS. 18-20, in order to allow user 36 to more efficiently search the various experience data cards (e.g. experience data cards 102, 104, 106, 108, 110, 112, 114, 116, 118, 120, 122) included within experience database 100, experience social networking process 10 may be configured to allow user 36 to search experience database 100. For example and referring also to FIG. 19, user 36 may select (via e.g. on-screen pointer 132 or a hand gesture) search button 140 (see FIG. 2) and experience social network process 10 may render search window 1300 that may allow user 36 to efficiently search experience database 100.

Specifically, when searching experience database 100, user 36 may take into consideration several factors. For the following discussion, the factors discussed are for illustrative purposes only and are not intended to be a limitation of this disclosure. For example, the factors searchable within experience database 100 may be configured in accordance with the objectives of an administrator (not shown) of experience social networking process 10. Additionally and/or alternatively, experience social network process 10 may take into account user profile data when searching experience database 100.

One such factor that may be considered is cost 1304. For example, in the event that user 36 does not wish to/cannot spend a lot of money, user 36 may wish to only consider experiences that are low-cost (e.g. a walk through Central Park in the spring). Alternatively, in the event that cost is a lesser concern, user 36 may wish to consider experiences that are higher cost (e.g. a private helicopter tour of Manhattan). Accordingly, experience social networking process 10 may be configured to allow user 36 to select a preferred cost within cost field 1304 of search window 1300.

Another factor that may be considered is age 1306. For example, in the event that user 36 is alone or with a spouse/adult friend, user 36 may wish to consider adult experiences (e.g. visiting various bars/clubs in SoHo). Alternatively, in the event that user 36 is with family (which includes minor children), user 36 may wish to only consider experiences that do not have age restrictions (e.g. visiting the fair in Central Park). Accordingly, experience social networking process 10 may be configured to allow user 36 to select a preferred age within age field 1308 of search window 1300.

Another factor that may be considered is duration 1310. For example, how long an experience is user 36 considering. Are they looking for an experience that may last all day (e.g. a tour of Napa Valley) or they looking for an experience that may be considerably shorter (e.g. a tour of Alcatraz Island). Accordingly, experience social networking process 10 may be configured to allow user 36 to select a preferred duration within duration field 1312 of search window 1300.

Another factor that may be considered is mood 1314. For example, is user 36 interested in an energetic adventure (climbing the stairs to the observation deck of the Empire State Building) or a more relaxed experience (e.g., riding the Circle Line around Manhattan). Accordingly, experience social networking process 10 may be configured to allow user 36 to select a preferred mood within mood field 1316 of search window 1300.

Another factor that may be considered is location 1318. For example, is user 36 interested in an experience at their current location (e.g., New York City) or an experience in a location that they will be visiting in the future (e.g., Paris, France). Accordingly, experience social networking process 10 may be configured to allow user 36 to select a preferred location within location field 1320 of search window 1300. Search windows 1300 may also include "my current location" button 1322 that may allow user 36 to quickly define their current location (as determined by e.g., triangulation or GPS technology) as their preferred location.

Additionally, through one or more configuration menus (not shown), user 36 may be able to define a radius/tolerance for location field 1320. For example, experience social networking process 10 may be configured to allow user 36 to define an experience as being at a certain location if it is within e.g., a 5 mile, a 10 mile, or a 25 mile radius of the preferred location.

Another factor that may be considered is season 1324. For example, user 36 may only be able to go skiing at Hunter Mountain during the winter, while user 36 may only be able to go hang-gliding in the Adirondacks during the summer. Accordingly, experience social networking process 10 may be configured to allow user 36 to select a preferred season within season field 1326 of search window 1300. Search windows 1300 may also include "my current season" button 1328 that may allow user 36 to quickly define the current season (as determined by an available calendar) as their preferred season.

Another factor that may be considered is weather 1330. For example, user 36 may only desire to go to the Jersey Shore when it is sunny, while user 36 may only be interested in performing an indoor activity (e.g., going to the Museum of Natural History) when it is rainy/cold outside. Accordingly, experience social networking process 10 may be configured to allow user 36 to select preferred weather within weather field 1332 of search window 1300. Search windows 1300 may also include "my current weather" button 1334 that may allow user 36 to quickly define the current weather for their current location (as determined by e.g., triangulation or GPS technology and an accessible weather service) as their preferred weather.

Another factor that may be considered is time/date 1336. For example, user 36 can only watch a sunrise in the morning and can only watch a sunset in the evening. Further, user 36 may only be able to attend a Friday Night Harbor Cruise on a Friday night (as opposed to a Thursday Night). Accordingly, experience social networking process 10 may be configured to allow user 36 to select a preferred time/date within time/date field 4.2.38 of search window 1300. Search windows 1300 may also include "my current time/date" button 1340 that may allow user 36 to quickly define the current time/date (as determined by an available clock/calendar) as their preferred time/date.

Once search window 1300 is wholly or partially populated by user 36, user 36 may select (via on-screen pointer 130 or a hand gesture) "search" button 1342 within search window 1300. In this way, experience social networking process 10 may receive 1200 a request for suggested experience data from user 36.

In some embodiments, a user (e.g., user 36) may be associated with user profile data stored in experience data store 100. The phrase "user profile data" as used herein, may refer to any of the factors listed above, as well as any information that the user has allowed to be shared. For example, some types of user profile data may include, but are not limited to, the user's age, interests, geographical location, sex, religion, etc.

As discussed above, experience social networking process 10 may determine 1202 location data for a particular user (e.g. user 36). Location data may be determined using any suitable technique (e.g. automatically, through manual user entry, etc.). For example, in some embodiments, determining a user's location may include receiving location coordinates using global positioning systems, some of which may include, but are not limited to, global positioning systems, assisted global positioning systems, differential global positioning systems, etc. Additionally and/or alternatively, determining a location may be based upon, at least partially, information from a WiFi network, information obtained based on near-field communications (NFC), radio frequency identification information, Bluetooth, and ultra-wide band communication information. In some embodiments, determining a location may include receiving an indication that a user has checked into the location. In some embodiments, the location data may be included within the request for suggested experience data from the first user and/or may be received separate from the request. For example, the location data may be determined through a user's mobile computing device using techniques known in the art and may be provided to experience social networking process 10.

Accordingly, experience social networking process 10 may be configured to determine 1204 one or more interests for user 36 based at least partially on user profile data associated with user 36. In this way, experience social networking process 10 may identify an interest of user 36 by reviewing information pertaining to the user (e.g. his or her social networking pages, blogs, websites, etc.). These interests may be used by experience social networking process 10 to identify appropriate experience data cards for each particular user. For example, if user 36 lists kayaking as an interest on his or her social networking page, this may be taken into account when determining a suggested experience for user 36 as is discussed in further detail below.

Additionally and/or alternatively, determining an interest for the first user may include determining an interest from a second user profile, which may be associated with the first user's profile. For example, experience social networking process 10 may be configured to determine that user 36 and user 38 are in the same social network (e.g. friends, coworkers, etc.). Accordingly, when determining an interest for the first user (e.g. user 36), experience social networking process 10 may identify one or more interests of user 36's contact(s), in this example, the interests of user 38. For example, experience social networking process 10 may identify that user 38 is interested in skydiving and may determine that user 36 may be interested in a similar activity because they are in the same social network and/or circle.

Once the interests and/or location data for the first user have been determined, experience social networking process 10 may determine 1206 at least one suggested experience based at least in part on the location data for the first user and the one or more determined interests for the first user. For example, in the example listed above, if experience social networking process 10 determines that user 36 is interested in kayaking and is currently located near a lake, which is known for kayaking, then experience social networking process 10 may provide kayaking at that particular lake to user 36 as a suggested experience.

In some embodiments, experience social networking process 10 may further include providing a second suggested experience to the first user. The second suggested experience may be based upon, at least partially, a relationship between the first suggested experience and the second suggested experience. The relationship between the first and second experience may take on any number of forms. For example, the relationship may include, but is not limited to, a travel time between the first suggested experience and the second suggested experience, a starting location of one of the first suggested experience and the second suggested experience, an ending location of one of the first suggested experience and the second suggested experience, etc.

Referring also to FIG. 20, upon selecting "search" button 1342, result set 1450 may be generated by experience social networking process 10 that includes a plurality of experience data cards that satisfy the above-described search criteria. In this way, experience social networking process 10 may provide 1208 the at least one suggested experience to user 36 in response to the received request.

User 36 may cycle through and review the individual experience data cards (namely experience data cards 1452, 1454, 1456, 1458, 1460 included within result set 1450) in the manner described above. While only five experience data cards are shown to be included within result set 1450, this is for illustrative purposes only and is not intended to be a limitation of this disclosure.

Example System 5

A card-based experience database may allow individual users to add experiences (in the form of card-based descriptions of experiences that they have had) and collect experiences (in the form of copying a card-based experience description from the experience database to the user's experience to do list.

However, such a card-based system is only valuable if it is populated with experience data cards. Further, when initially launching such a user-driven system, such a database would have very few cards until the database is populated with cards submitted by users. Accordingly, the system may be configured to have experience data cards generated based upon information included within content feeds (such as social media feeds). Accordingly, the system may be configured to monitor such content feeds and provide the same to data processing bodies, who may analyze the content feed and (if available) extract experience content, which may be provided to the system so that experience data cards may be generated.

As discussed above, experience database 100 may include a plurality of experience data cards (e.g. experience data cards 102, 104, 106, 108, 110, 112, 114, 116, 118, 120, 122). Further and as discussed above, these experience data cards may be added to experience database 100 in a variety of different ways (e.g., manually from scratch, automatically based upon social media streams, manually based upon photographs, and/or manually based upon human processing of data).

Figure 21:
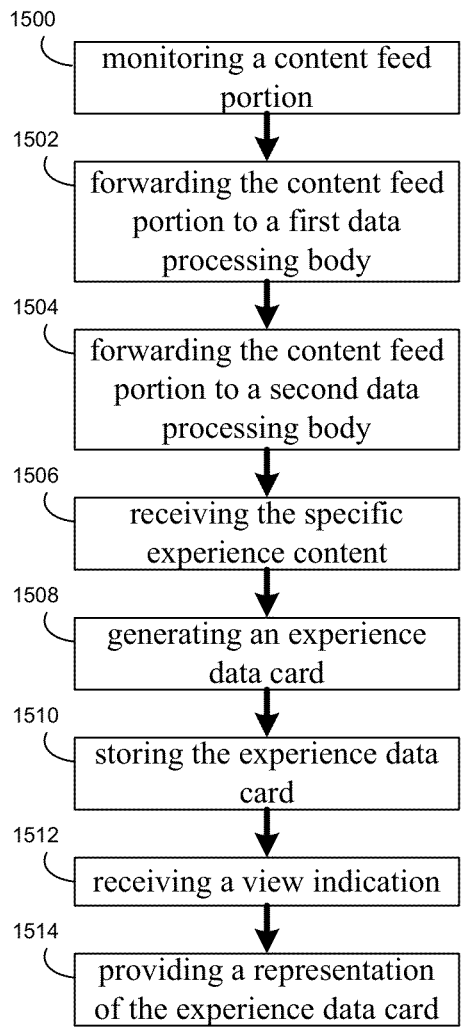
FIG. 21 is a diagrammatic view of a flowchart depicting operations consistent with an embodiment of the experience social networking process of FIG. 1.
Figure 22:
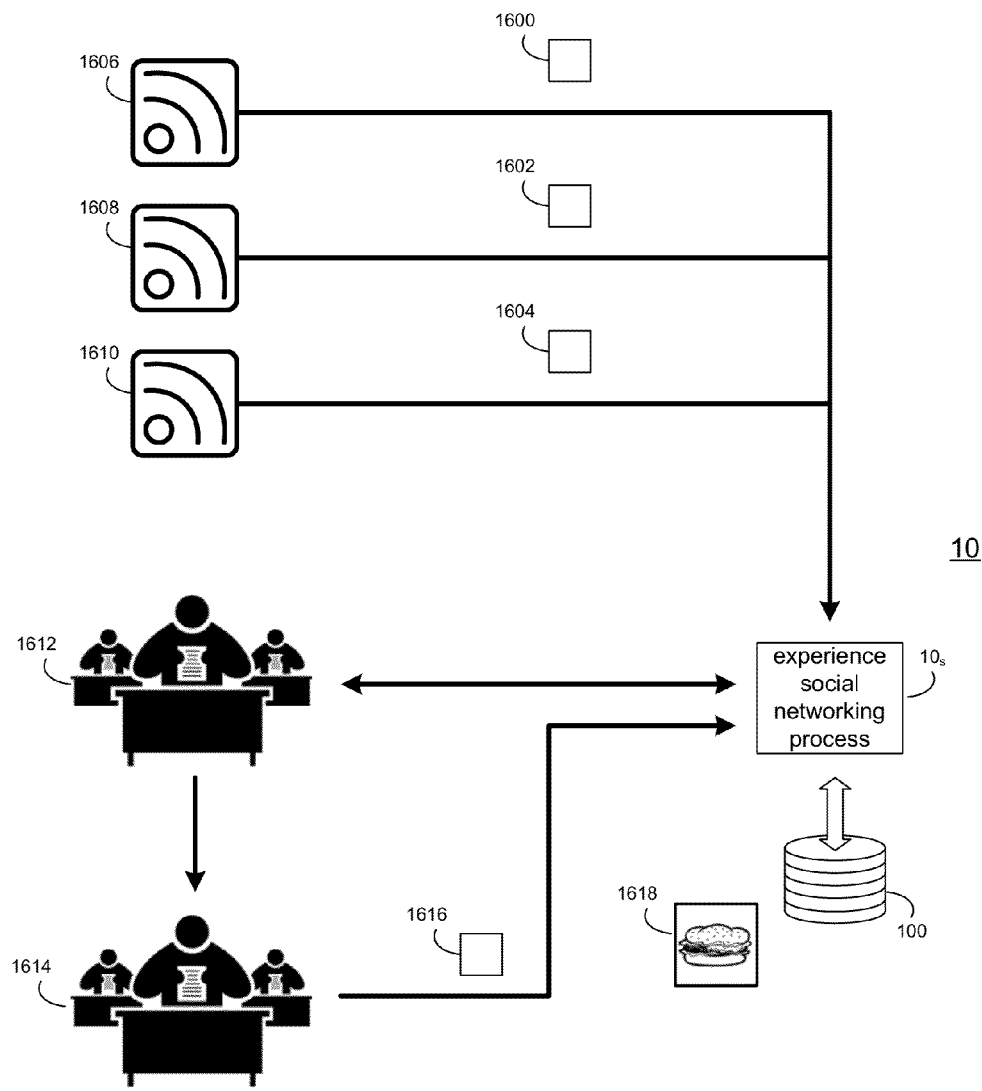
FIG. 22 is a diagrammatic representation of multiple content feed portions being processed by the experience social networking process of FIG. 1.

Referring also to FIGS. 21 & 22, experience social networking process 10 may be configured to monitor 1500 a content feed portion (e.g., content feed portions 1600, 1602, 1604) that may include experience content. These content feed portions (e.g., content feed portions 1600, 1602, 1604) may be a portion of a content feed (content feeds 1606, 1608, 1610 respectively), examples of which may include but are not limited to social media streams, RSS feeds, and XML formatted content streams.

For example, experience social networking process 10 may be configured to monitor one or more social media streams that are e.g. associated with a food critic. As food critics are in the business of reviewing restaurants, such a social media feeds may be a rich resource for obtaining information that may be used to populate experience data cards that concern visiting restaurants.

Experience social networking process 10 may be configured to forward 1502 the monitored content feed portion (e.g., one or more of content feed portions 1600, 1602, 1604) to first data processing body 1612 so that first data processing body 1612 may make a determination concerning whether the content feed portion (e.g., one or more of content feed portions 1600, 1602, 1604) includes experience content. For example, if experience social networking process 10 is configured to monitor the above-described social media stream of the food critic, some portion of the content included within that social media stream may concern the experiences of the food critic when they visit various restaurants and may discuss the meals that they experience (i.e. highly relevant experience content). However, some portion of the content included within that social media stream may concern the opinion of the food critic with respect to various spices (i.e. highly irrelevant experience content). Accordingly, first data processing body 16 may review the information embedded within these content feed portions (e.g., one or more of content feed portions 1600, 1602, 1604) to determine whether relevant experience content is present within the content feed portion.

An example of first data processing body 1612 may include one or more human data review professionals, such as a team of people that manually review the content feed portion (e.g., one or more of content feed portions 1600, 1602, 1604) to determine whether relevant experience content is present within the content feed portion.

If first data processing body 1612, after reviewing the content included within the above-described content feed portion, determines that the content feed portion (e.g., one or more of content feed portions 1600, 1602, 1604) includes experience content, the content feed portion (e.g., one or more of content feed portions 1600, 1602, 1604) may be forwarded 1504 to second data processing body 1614 to extract the specific experience content deemed to be included within the content feed portion (e.g., one or more of content feed portions 1600, 1602, 1604) by first data processing body 1612. When forwarding the content feed portion (e.g., one or more of content feed portions 1600, 1602, 1604) from first data processing body 1612 to second data processing body 1614, this forwarding operation may be processed directly (e.g. from first data processing body 1612 to second data processing body 1614) or via experience social networking process 10 (e.g. first data processing body 1612 forwards the content feed portion (e.g., one or more of content feed portions 1600, 1602, 1604) to experience social networking process 10 and experience social networking process 10 forwards the content feed portion (e.g., one or more of content feed portions 1600, 1602, 1604) to second data processing body 1614).

When the content feed portion (e.g., one or more of content feed portions 1600, 1602, 1604) is received by second data processing body 1614, second data processing body 1614 may process the content feed portion (e.g., one or more of content feed portions 1600, 1602, 1604) to extract specific experience content 1616 that was deemed to be included within the content feed portion (e.g., one or more of content feed portions 1600, 1602, 1604) by first data processing body 1612.

An example of second data processing body 1614 may include one or more human data processing professionals, such as a team of people that manually process the content feed portion (e.g., one or more of content feed portions 1600, 1602, 1604) to extract specific experience content 1616 included within the content feed portion. Once extracted, second data processing body 1614 may provide specific experience content 1616 to experience social networking process 10.

Once specific experience content 1616 is received 1506 from the second data processing body 1614, experience social networking process 10 may generate 1508 experience data card 1618 based, at least in part, upon specific experience content 1616. Experience social networking process 10 may store 1510 experience data card 1618 in experience database 100 in the manner described above.

As discussed above, one or more of users 36, 38, 40, 42 may cycle through and review the various experience data cards included within experience database 100 using a client electronic device (e.g. data-enabled, cellular telephones 28, 30, personal digital assistant 32, personal computer 34 (respectively)). Accordingly, one or more of users 36, 38, 40, 42 may wish to view experience data card 1618 and may indicate their desire concerning the same. Accordingly, experience social networking process 10 may receive 1512 a view indication from e.g., user 36 concerning a request to view experience data card 1618 included within experience database 100. Accordingly and in response to the same, experience social networking process 10 may provide user 36 with a representation of experience data card 1618, which may be rendered on display 54 included within client electronic device 28.

Example System 6

In some embodiments, experience social networking process 10 may provide techniques for saving data associated with photographs. For example, techniques for saving metadata along with the photo are described. This data may include exchangeable image file format (exif) data such as the date, time of day, global positioning system location, camera settings, aperture settings, thumbnails, descriptions, etc. As discussed in further detail hereinbelow, this data may be used at a later date to help identify and/or create a proposed experience data card for a user of a social network.

Figure 23:
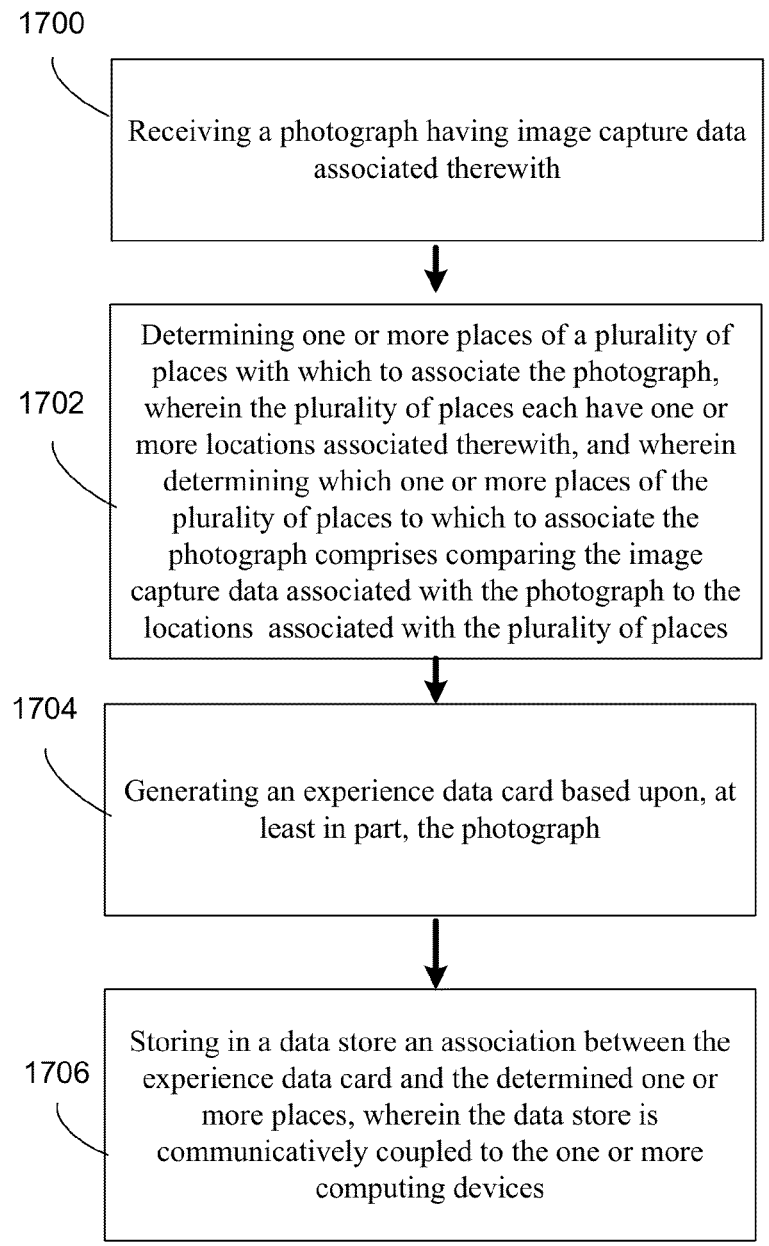
FIG. 23 is a diagrammatic view of a flowchart depicting operations consistent with an embodiment of the experience social networking process of FIG. 1.
Figure 24:
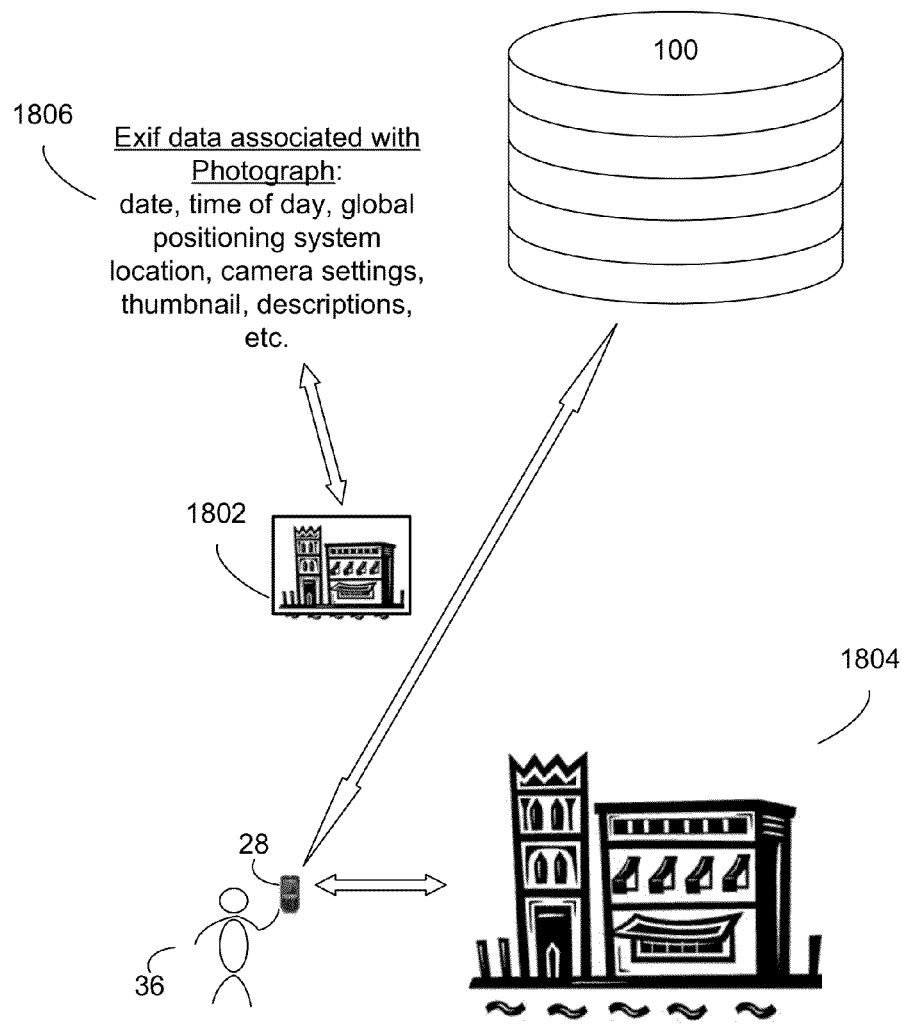
FIG. 24 is a diagrammatic view of a photograph having image capture data consistent with an embodiment of the experience social networking process of FIG. 1.
Figure 25:
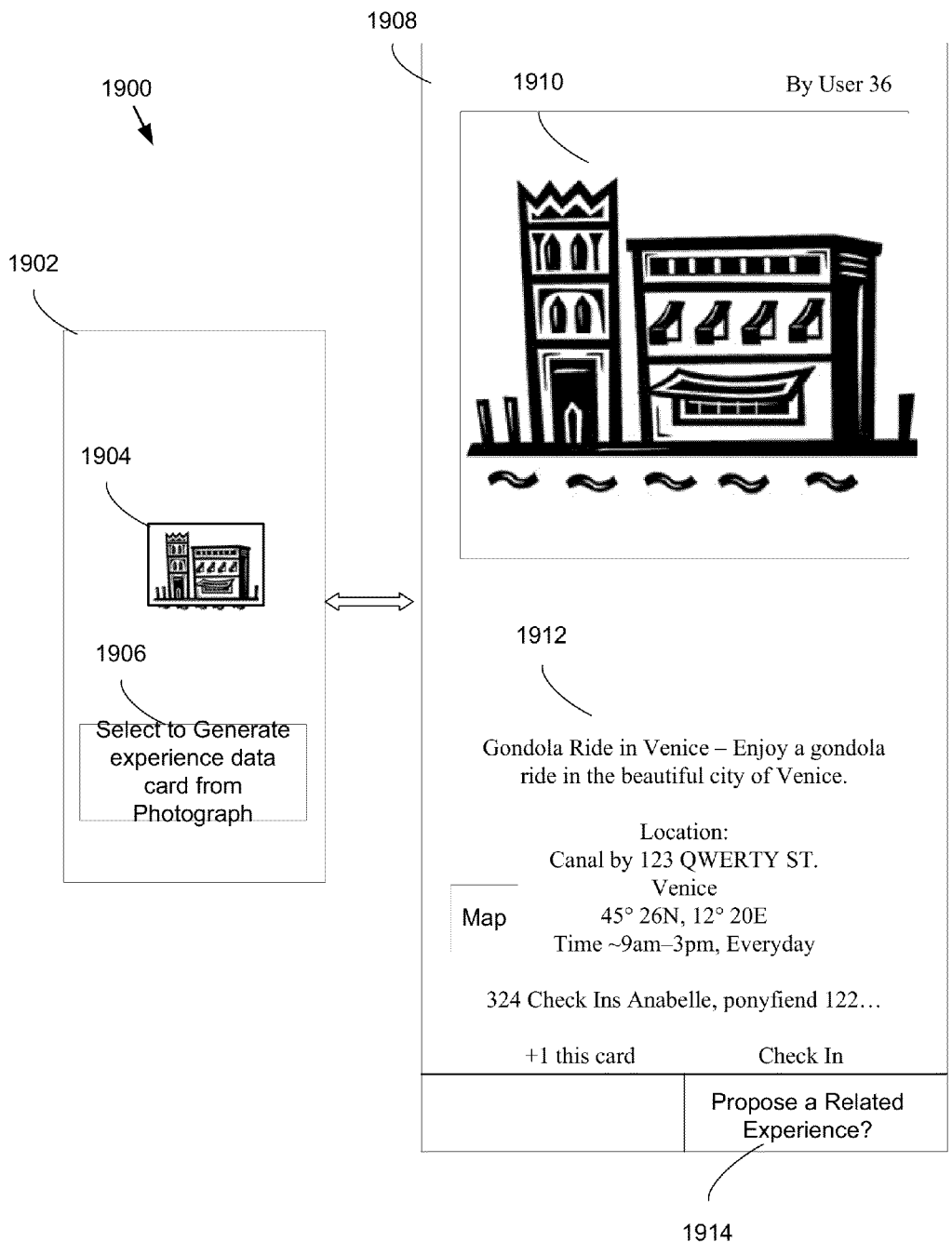
FIG. 25 is a diagrammatic view of a photograph having image capture data consistent with an embodiment of the experience social networking process of FIG. 1.
Figure 26:
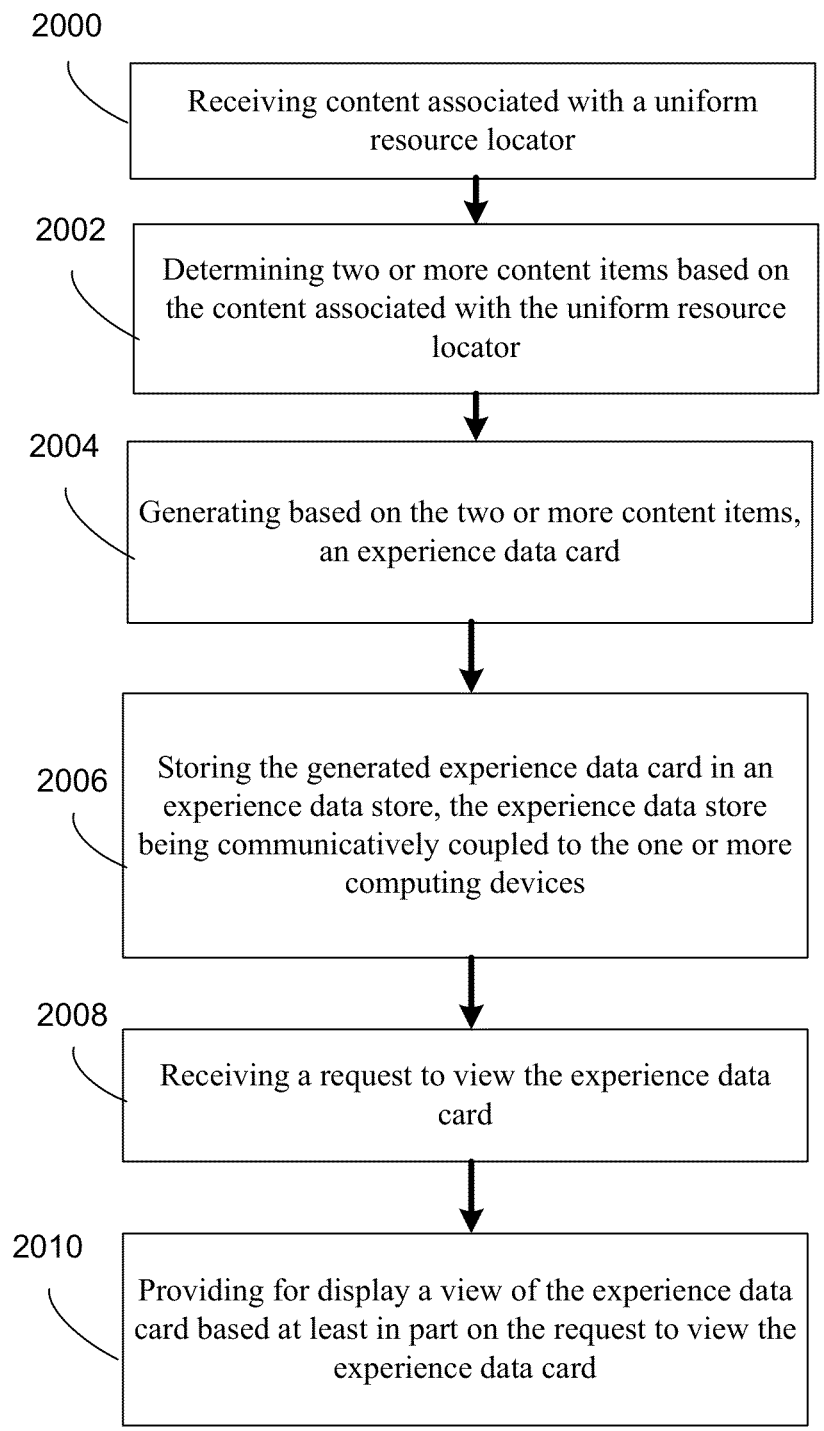
FIG. 26 is a diagrammatic view of a flowchart depicting operations consistent with an embodiment of the experience social networking process of FIG. 1.

Referring also to FIGS. 23-25, experience social networking process 10 may be configured to receive 1700 a photograph having image capture data associated therewith. The phrase "image capture data" as used herein, may refer to any data associated with a photograph. In some embodiments, image capture data may include, but is not limited to, data associated with exchangeable image file format (exif) standard.

Figure 6:
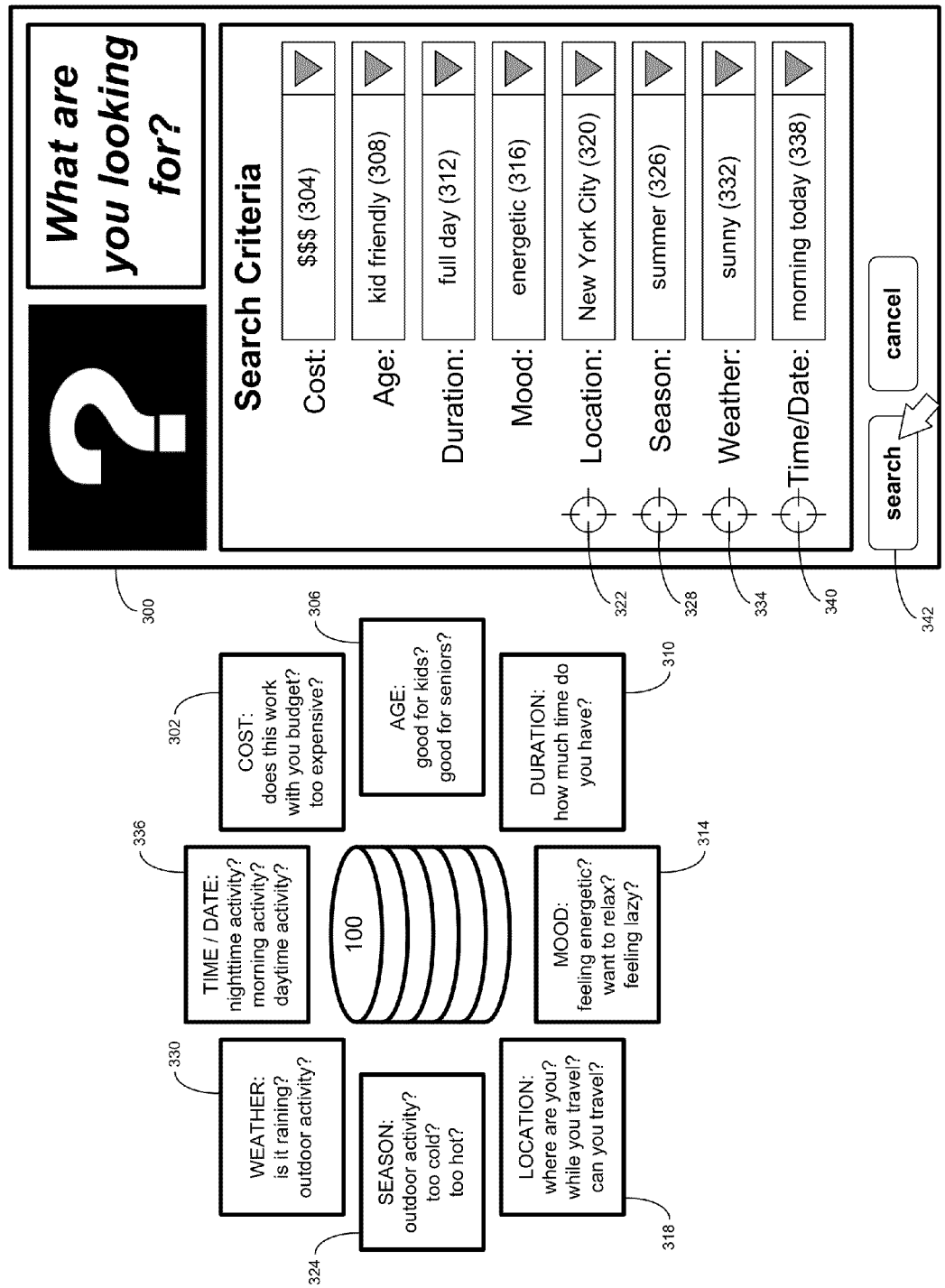
FIG. 6 is a diagrammatic view of a search window rendered by the experience social networking process of FIG. 1.

For example, and referring to FIG. 24, a user (e.g. user 36) may use a camera or camera-enabled device (e.g., smartphone 28) to take a photograph of an experience that he or she has participated in or wishes to participate in at a later date. In this particular example, user 36 has taken a photograph 1802 of a Gondola Ride in Venice 1804. Photograph 1802 may include image capture data such as that described above. Once the photograph 1802 has been taken, user 36 may decide to store the photograph and/or send it experience database 100 as is shown in FIG. 6.2. The transmission of photograph 1802 may occur using various data transmission techniques such as those known in the art (e.g. wireless transmission, USB upload and transmission, etc.).

In some embodiments, experience social networking process 10 may determine 1702 one or more places of a plurality of places with which to associate photograph 1802. Each of the plurality of places may have one or more locations associated therewith. For example, photograph 1802 may have a particular set of global position system (GPS) coordinates associated therewith. From these GPS coordinates, experience social networking process 10 may determine that photograph 1802 was taken of one or more places associated with those coordinates (e.g. the gondola ride company, the sandwich shop next door, etc.). In this way, a number of possible places may have the same GPS coordinates, each having their own distinct location. In some embodiments, experience social networking process 10 may determine at a date later than the actual date the photograph was generated. Additionally and/or alternatively, determining may occur in a geographical location that differs from the geographical location of the one or more places. For example, experience social networking process 10 may determine to associate the photograph of the Venice Gondola Ride with the Venice Gondola Ride Company while the user (e.g. user 36) is home in New York.

In some embodiments, experience social networking process 10 may determine which place with which to associate the photograph using any number of suitable techniques. For example, in some embodiments, experience social networking process 10 may compare image capture data 1806 associated with photograph 1802 to the locations associated with the plurality of places (e.g. the gondola ride company, the sandwich shop next door, etc.). In this way, experience social networking process 10 may be configured to compare and/or match a particular place with a particular location.

Referring now to FIG. 25, in some embodiments, experience social networking process 10 may generate 1704 an experience data card based upon, at least in part, the photograph (e.g. photograph 1802). Accordingly, experience social networking process 10 may provide a user interface 1902, which may be configured to allow a user (e.g. user 36) to generate an experience data card based upon a photograph. As shown in FIG. 25, user interface 1902 may include an image 1904 of the photograph of the Gondola ride in Venice. User interface 1902 may further include a user-selectable option 1906 to generate an experience data card such as experience data card 1908 shown in FIG. 6.3. Experience data card 1908 may include some or all of the information in the embodiments described herein. For example, experience data card 1908 may include an image 1910 of the photograph as well as description information 19012. Experience social networking process 10 may store 1706 an association between experience data card 1908 and the determined one or more places, in a data store (e.g., experience database 100), which may be communicatively coupled to one or more computing devices (e.g. computing device 12).

As shown in FIG. 25, experience social networking process 10 may generate an experience data card 1908. Accordingly, experience data card 1908 may include a proposed experience associated with the photograph (e.g. the Gondola ride in Venice experience). Additionally and/or alternatively, experience social networking process 10 may allow for one or more users (e.g. user 36) to share the proposed experience with one or more participants of a social network. For example, user 36 might wish to share the proposed experience with his contacts and/or circles. In some embodiments, experience social networking process 10 may allow a user (e.g. users 36, 38, 40, 42) to either modify or accept the proposed experience.

Additionally and/or alternatively, experience social networking process 10 may suggest one or more additional proposed experiences based upon the image capture data associated with the photograph. In this way, experience social networking process 10 may provide a user (e.g. user 36) with the option of generating a related experience. FIG. 25 includes a "propose a related experience" button, which when selected by a user, may generate one or more additional proposed experiences. The additional proposed experience may be based on any number of factors, including but not limited, to a distance between the experience associated with experience data card 1908 and any nearby experiences. In some embodiments, this may be based upon the GPS coordinates taken from the original photograph. Numerous other factors may also be considered when determining the additional proposed experience.

Example System 7

In some embodiments, experience social networking process 10 may provide techniques for automatically generating an experience data card based upon at least partially a uniform resource locator ("URL"). In this way, experience social networking process 10 may automatically obtain photos, business locations, descriptions, etc. from a particular website and use that information to generate an experience data card. In some embodiments, the generated experience data card may be updated and/or edited by one or more users (e.g. users 36, 38, 40, 42). Some embodiments described herein may be used in accordance with a web browser (e.g. as an add-on to GOOGLE CHROME, etc.).

For example, user 36 may go to a website for a concert and access a webpage describing the details of the concert. User 36 may click a button to generate an experience data card based on the contents of the webpage. Experience social networking process 10 may parse the content of that web page in order to get an image, date, time, location, etc. Those data items are made into a storable experience data card and are stored. Once the generated experience data card has been stored, user 36 and other users (e.g. 38, 40, 42) may browse that and other experience data cards in experience data store (e.g., experience database 100), and select those that they would like to save in order to "collect" them.

Referring also to FIGS. 26-29, experience social networking process 10 may be configured to receive 2000, using one or more computing devices, content associated with a URL. In some embodiments, receiving content may include receiving a response to a hypertext transfer protocol request (HTTP). Referring now to FIG. 27, a search engine interface page 2100 is provided having a search field 2102. Search field may allow for a user to enter a particular query, in this particular example, the user has entered "Blarney Stone". Accordingly, search engine interface page 2100 may generate search results as shown in FIG. 27. Each individual search results may include a related URL. For example, a search for the phrase "blarney stone" returns URL 2104, i.e., "www.blarneycastle.ie/pages/kiss-the-blarney-stone".

As shown in FIG. 27, experience social networking process 10 may receive a user indication to generate an experience data card for the URL. For example, a user (e.g. user 36) may select generate experience data card icon 2106, and the indication may be received at a computing device such as computing device 12. Accordingly, experience social networking process 10 may request the content for the URL and may determine 2002, using the one or more computing devices, two or more content items based on the content associated with the URL. In some embodiments, determining the two or more content items may include parsing the content associated with the URL and or the associated webpage. For example, the URL and/or associated website may contain tags including various types of information including, but not limited to, date, time, location, maps, images, etc. Additionally and/or alternatively, experience social networking process 10 may determine content items by parsing (e.g., detecting dates and times by their formats, etc).

Accordingly, once the content items have been determined, experience social networking process 10 may generate 2004 an experience data card based on the two or more content items associated with the URL. The content items may include, but are not limited to, text, pictures, audio, video, etc, that may be associated with a particular URL and/or webpage.

Additionally and/or alternatively, experience social networking process 10 may store 2006, using the one or more computing devices, the generated experience data card in an experience data store (e.g., experience database 100). As discussed above, the experience data store may be communicatively coupled to the one or more computing devices (e.g. computing device 12) and the experience data card may contain various information, including, but not limited to, a title, description, photo, expiration date, author, address, comments, and rating information, etc.

In some embodiments, experience social networking process 10 may receive 2008, at the one or more computing devices, a request to view the experience data card from one or more users (e.g., users 36, 38, 40, 42). Upon receiving the request, experience social networking process 10 may provide 2010 for display, using the one or more computing devices, a view of the experience data card based at least in part on the request to view the experience data card. As discussed above, experience social networking process 10 may enable a user to provide user commentary regarding the experience data card. Additionally and/or alternatively, experience social networking process 10 may receive an indication from a user (e.g., users 36, 38, 40, 42) that they would like to associate the experience data card with a personalized data store (e.g., their personalized list within experience database 100).

Figure 28:
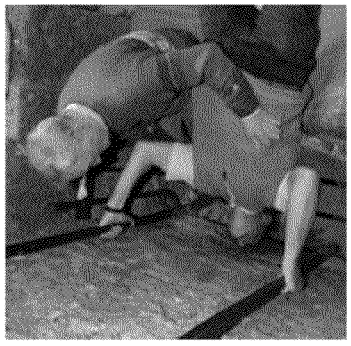
FIG. 28 is a diagrammatic view of a webpage consistent with an embodiment of the experience social networking process of FIG. 1.

Referring also to FIG. 28, experience social networking process 10 may be configured to generate an experience data card based upon the content of a webpage such as webpage 2200. In this particular example, a user (e.g. user 36) may be viewing the webpage: http://www.blarneycastle.ie/pages/kiss-the-blarney-stone. Accordingly, user 36 may select generate experience data card icon 2202. The option to generate an experience data card may be provided using any suitable technique. For example, the user may right click on a mouse to pull up a menu or use any suitable approach. Additionally and/or alternatively, the generate experience data card icon could be provided as a button associated with a web browser. Additionally and/or alternatively, experience social networking process 10 may allow a user to select a portion of the webpage (e.g. http://www.blarneycastle.ie/pages/kiss-the-blarney-stone) and generate an experience data card based upon the selected portion.

Figure 29:
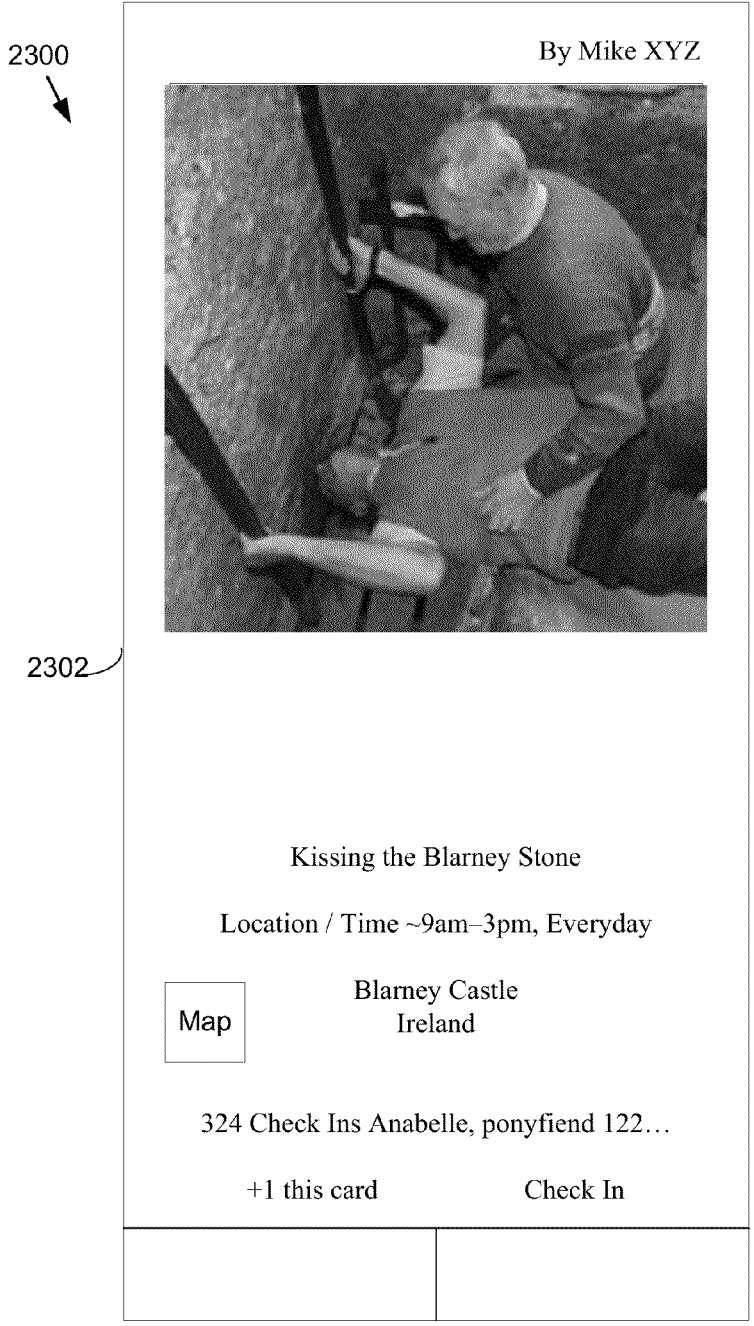
FIG. 29 is a diagrammatic view of an experience data card rendered by the experience social networking process of FIG. 1.

FIG. 29 depicts an example of an experience data card 2302 that may be rendered on a user's computing device (e.g. client electronic devices 28, 30, 32, 34) using either of the embodiments shown in FIGS. 27 and 28. As shown in FIG. 29, experience data card 2302 may include any or all of the information described herein. For example, in this particular embodiment, an image from the webpage is provided (e.g. http://www.blarneycastle.ie/pages/kiss-the-blarney-stone).

Example System 8

A card-based experience database may allow individual users to add experiences (in the form of card-based descriptions of experiences that they have had) and collect experiences (in the form of copying a card-based experience description from the experience database to the user's experience to do list. Unfortunately, if left unchecked, the experience database would quickly get littered with multiple copies of identical/quasi-identical experience data cards. Accordingly, when adding such experiences to the card-based experience database, procedures may be employed to prevent the duplication of experience data cards previously included in the database and/or the occurrence of multiple cards for one experience.

As discussed above, experience database 100 may include a plurality of experience data cards (e.g. experience data cards 102, 104, 106, 108, 110, 112, 114, 116, 118, 120, 122), wherein these experience data cards may be added to experience database 100 in a variety of different ways.

Figure 30:
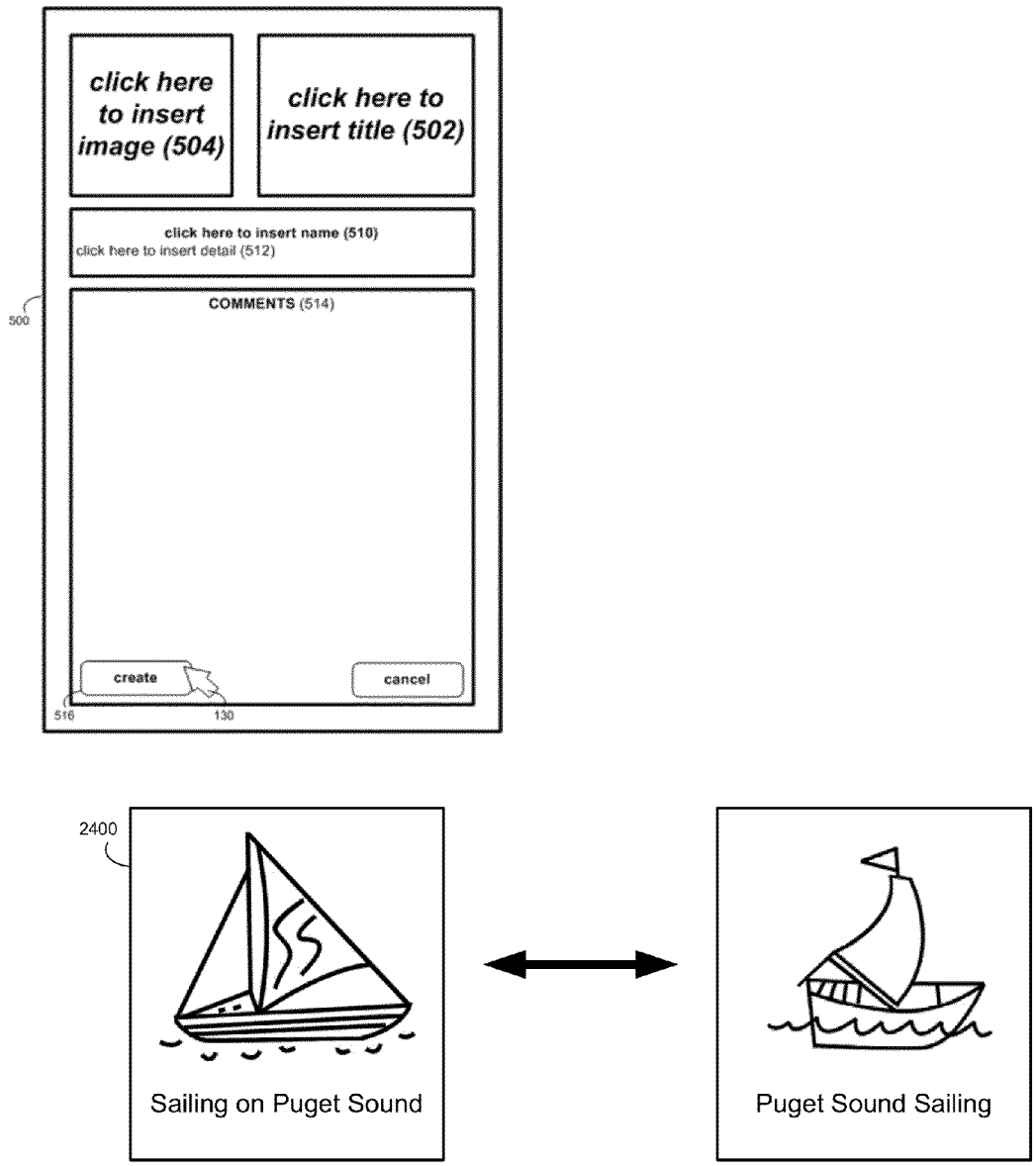
FIG. 30 is a diagrammatic view of a card creation window rendered by the experience social networking process of FIG. 1.
Figure 31:
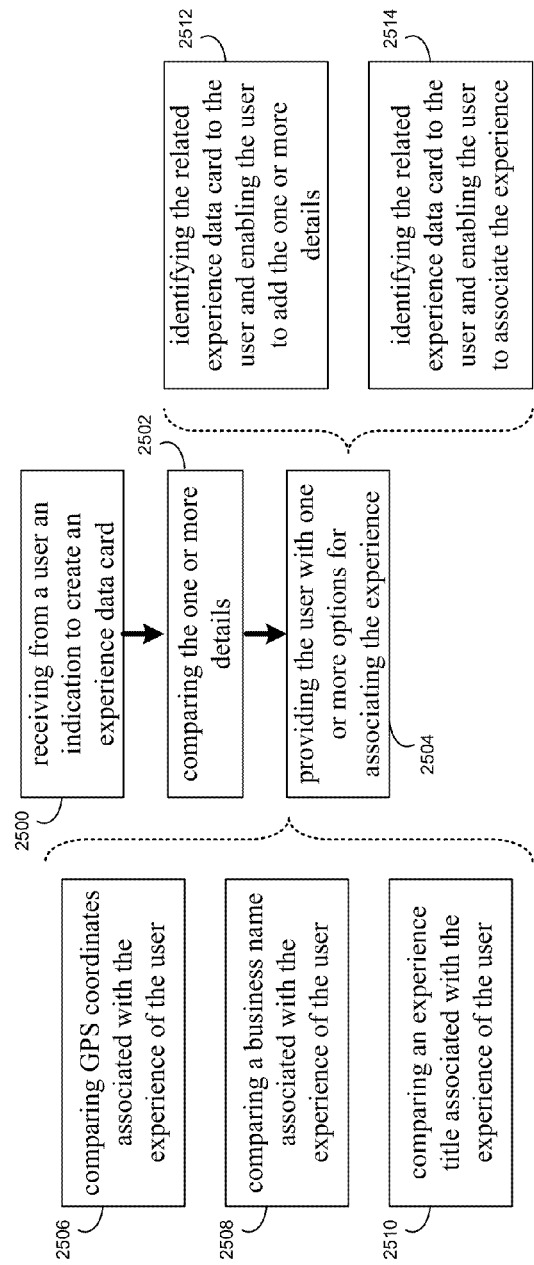
FIG. 31 is a diagrammatic view of a flowchart depicting operations consistent with an embodiment of the experience social networking process of FIG. 1.

As discussed above and referring also to FIGS. 30 & 31, experience social networking process 10 may be configured to allow a user (e.g. user 36) to manually generate an experience data card from scratch. For example, user 36 may select "+" button 142 (see FIGS. 2, 3, 7, 10) via on-screen pointer 130 or a hand gesture, which may result in experience social networking process 10 rendering card creation window 500. Card creation window 500 may be configured to allow user 36 to generate one of the above-described experience data cards.

Once the various fields within card creation window 500 are populated by user 36, user 36 may select "create" button 516 (via on-screen pointer 130 or a hand gesture), thus generating an indication of the intent of user 36 to generate an experience data card. The above-described indication may provide one or more details (as defined within e.g., fields 502, 504, 510, 512) concerning the experience that user 36 wishes to memorialize within the experience data card. Upon experience social networking process 10 receiving 2500 from user 36 the above-described indication to create an experience data card for inclusion within experience database 100, experience social networking process 10 may compare 2502 the details associated with the indication to details associated with the experience data cards included within experience database 100 to determine if matching details exist.

The above-described details may include one or more of text-based details (e.g., a written description of an experience), photographic details (e.g., a photograph related to an experience), video-based details (e.g., a video related to an experience), audio-based details (e.g., an audio recording related to an experience), and location-based details (e.g., the location of the experience).

For example, if the location-based details are GPS coordinates, comparing 2502 the one or more details may include comparing 2506 the GPS coordinates associated with the experience of user 36 with GPS coordinates associated with the experience data cards included within experience database 100 to determine if matching details exist.

Alternatively, if the text-based details include a business name, comparing 2502 the one or more details may include comparing 2508 a business name associated with the experience of user 36 with a business name associated with the experience data cards included within experience database 100 to determine if matching details exist.

Additionally, if the text-based details include an experience title, comparing 2502 the one or more details may include comparing 2510 an experience title associated with the experience of user 36 with an experience title associated with the experience data cards included within experience database 100 to determine if matching details exist.

In the event that comparison 2502 does not result in any matching details being identified, experience social networking process 10 may generate the experience data card (e.g., experience data card 2400) defined within card creation window 500.

Conversely, in the event that comparison 2502 does identify matching details, experience social networking process 10 may provide 2504 user 36 with one or more options for associating the experience of user 36 with the related experience data card (i.e., experience data card 2402; the experience data card with the matching details).

For example, when providing 2504 user 36 with options, experience social networking process 10 may identify 2512 the related experience data card (e.g., experience data card 2402) to user 36 and enable user 36 to add the one or more details concerning the experience of user 36 (in the form of commentary, as defined above) to related experience data card 2402. Accordingly, user 36 may be able to add commentary to experience data card 2402 in the manner discussed above and illustrated in FIG. 5.

Alternatively, when providing 2504 user 36 with options, experience social networking process 10 may identify 2514 the related experience data card (e.g., experience data card 2402) to user 36 and enable user 36 to associate the experience of user 36 with related experience data card 2402. For example, experience social networking process 10 may allow user 36 to have their new experience data card (e.g., experience data card 2400) be a sub-card of related experience data card 2402. Accordingly, the experience data cards may be hierarchical, in that the highest card is e.g., boating on Puget Sound, followed by a sub-card of sailing on Puget Sound, followed by a sub-sub-card of sailing on Puget Sound in the fall.

Example System 9

It may be desirable for the above-described system to define a "card" for an experience that has not yet occurred. For example, a card for a New Year's Eve event in Time Square that will not occur for six months, a card for a farewell concert by a musician that will not occur until next summer, and a card for a charity event that will not occur until next fall. Once defined, the system may be configured to allow a user to "check in" to or register for these future experiences associated with these "cards", wherein checking in will show the intent of the user to attend the future experience As discussed above, experience database 100 may include a plurality of experience data cards (e.g. experience data cards 102, 104, 106, 108, 110, 112, 114, 116, 118, 120, 122). These experience data cards may be added to experience database 100 in a variety of different ways (e.g., manually from scratch, automatically based upon social media streams, manually based upon photographs, and/or manually based upon human processing of data). In addition to experiences that have already occurred, experience social networking process 10 may allow for the generation of experience data cards concerning experiences that will occur in the future.

Figure 32:
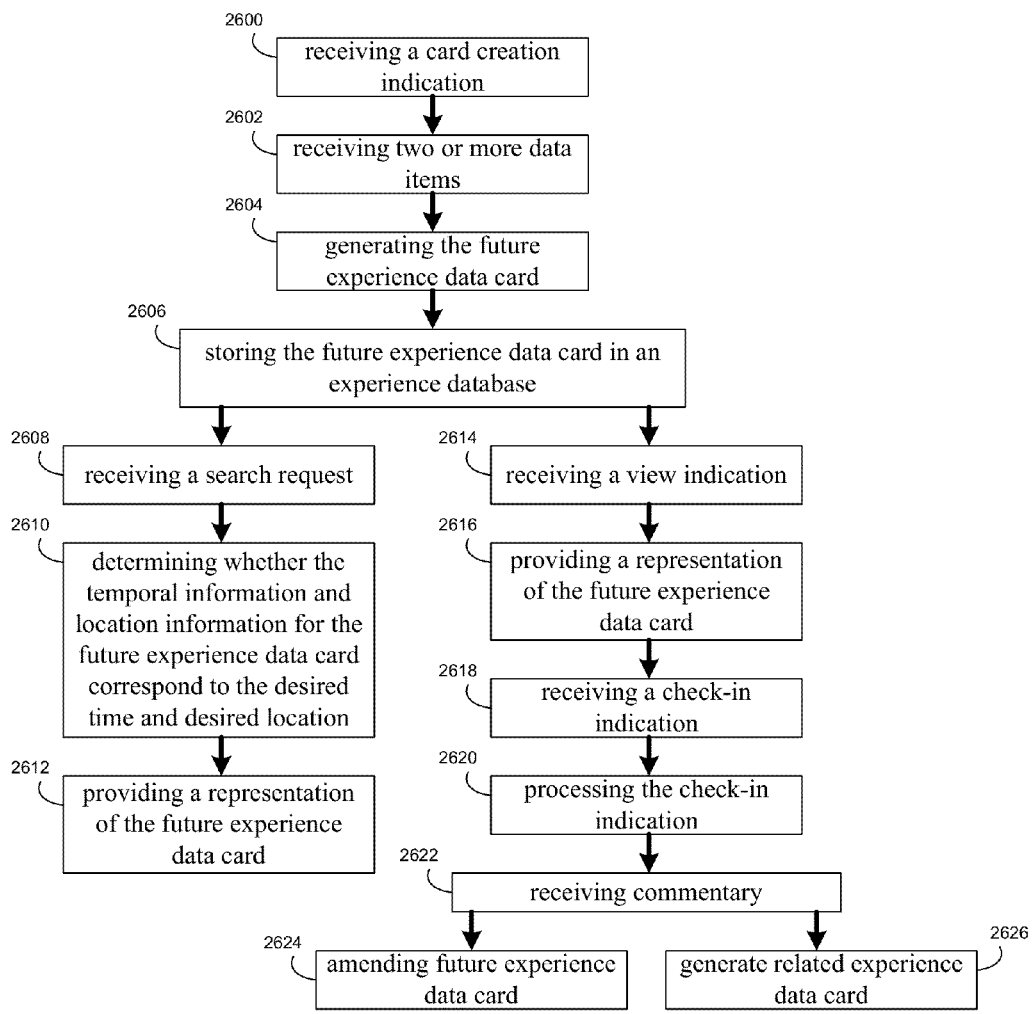
FIG. 32 is a diagrammatic view of a flowchart depicting operations consistent with an embodiment of the experience social networking process of FIG. 1.
Figure 33:
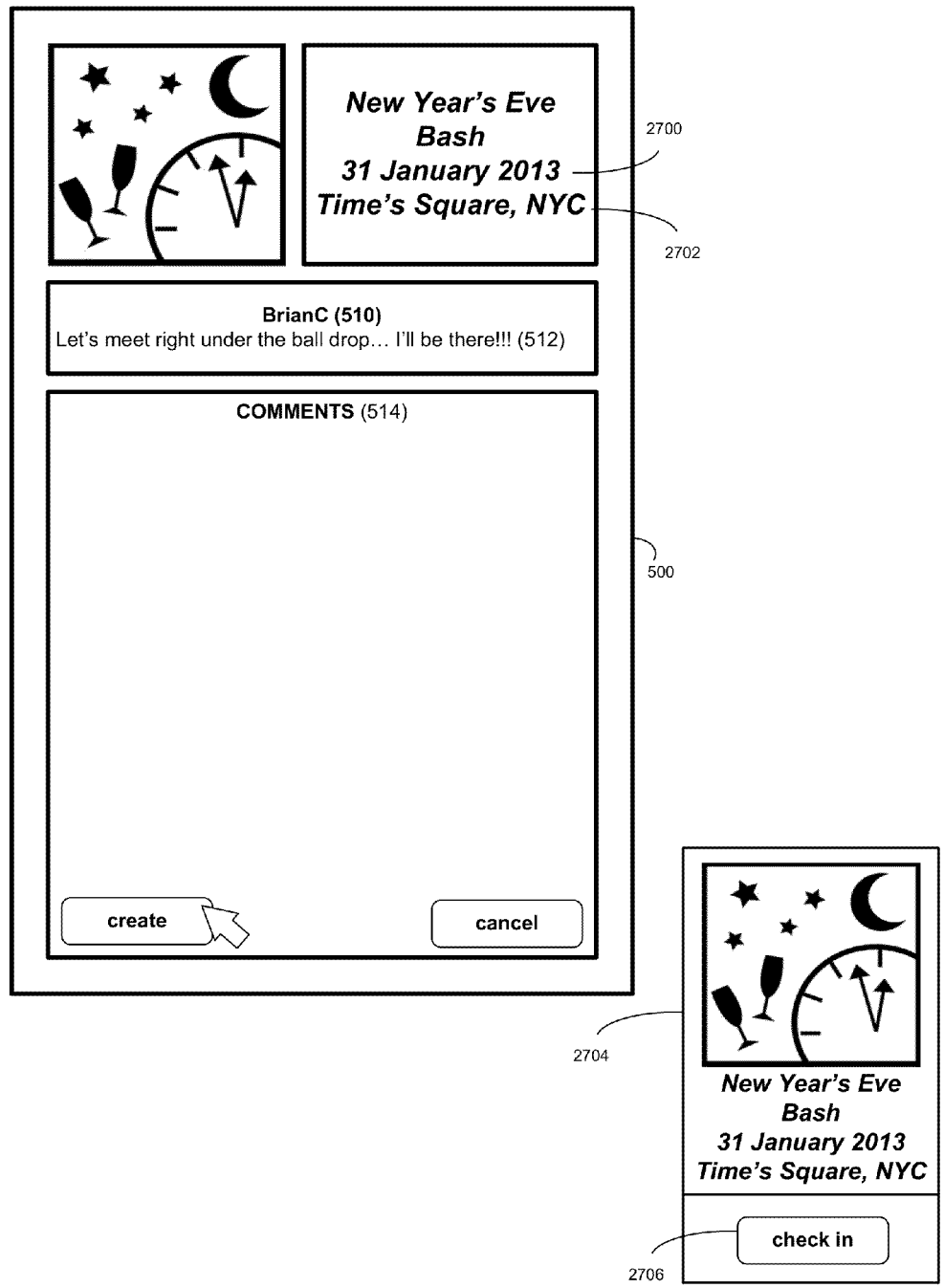
FIG. 33 is a diagrammatic view of a card creation window rendered by the experience social networking process of FIG. 1.

Referring also to FIGS. 32 & 33, experience social networking process 10 may be configured to manage future experiences by allowing a user (e.g. user 36) to generate an experience data card for a future experience. For example, user 36 may select "+" button 142 (see FIGS. 2, 3, 7, 10) via on-screen pointer 130 or a hand gesture. Upon experience social networking process 10 receiving 2600 this card creation indication from user 36 (concerning a request to create a future experience data card), experience social networking process 10 may render card creation window 500. Card creation window 500 may be configured to allow user 36 to generate such a future experience data card.

When generating such a future experience data card, experience social networking process 10 may require user 36 to provide at least two data items related to the future experience (i.e., New Year's Eve Bash), such as temporal indication 2700 (i.e., 31 Jan. 2013) for the future experience (i.e., New Year's Eve Bash) and location information 2702 (Time's Square, NYC) for the future experience (i.e., New Year's Eve Bash). Upon receiving 2602 the two above-described pieces of data (namely the temporal indication and location information for the future experience), experience social networking process 10 may generate 2604 future experience data card 2704 based, at least in part, upon these two data items. Once generated 2604, future experience data card 2704 may be stored 2606 on experience database 100.

Figure 34:
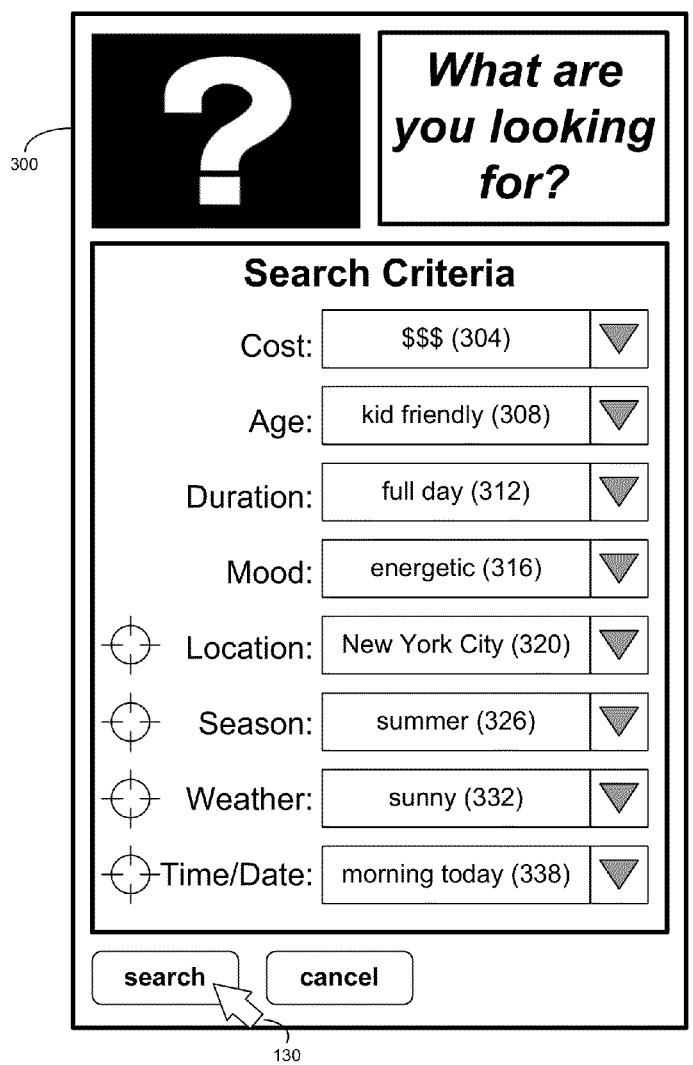
FIG. 34 is a diagrammatic view of a search window rendered by the experience social networking process of FIG. 1.

As discussed above, in order to allow user 36 to more efficiently search the various experience data cards (e.g. experience data cards 102, 104, 106, 108, 110, 112, 114, 116, 118, 120, 122) included within experience database 100, experience social networking process 10 may be configured to allow user 36 to search experience database 100. For example and referring also to FIG. 34, user 36 may select (via e.g. on-screen pointer 130 or a hand gesture) search button 140 (see FIG. 2) and experience social network process 10 may render search window 300 that may allow user 36 to efficiently search experience database 100.

As with the traditional experience data cards (e.g. experience data cards 102, 104, 106, 108, 110, 112, 114, 116, 118, 120, 122), experience social networking process 10 may be configured to allow user 36 to search future experience data cards (e.g., future experience data card 2704) as well. Accordingly, through the use of search window 300, user 36 may craft a search request that may be received 2608 from a user (e.g., user 38) of experience database 100 concerning experiences that will occur in the future at a desired time (as defined within field 338) and at a desired location (as defined within field 320).

Experience social networking process 10 may determine 2610 whether the temporal information (i.e., 31 Jan. 2013) and location information (Time's Square, NYC) for the future experience data card (i.e., the future experience data card for New Year's Eve Bash) correspond to the desired time (as defined within field 338) and the desired location (as defined within field 320).

If the temporal information (i.e., 31 Jan. 2013) and location information (Time's Square, NYC) for the future experience data card (i.e., the future experience data card for New Year's Eve Bash) correspond to the desired time (as defined within field 338) and the desired location (as defined within field 320), experience social networking process 10 may provide 2612 a representation of the result set (e.g., future experience data card 2704) to the requesting user (e.g., user 38).

As discussed above, the various experience data cards may be cycled through and viewed by the various users of experience social networking process 10. Accordingly, upon experience social networking process 10 receiving 2614 a view indication from a user (e.g., user 38) of experience database 100 concerning future experience data card 2704 (as stored within experience database 100), experience social networking process 10 may provide 2616 a representation of future experience data card 2704 to user 38. While in this particular example, different users are discussed as having created future experience data card 2704 and querying future experience data card 2704, this is for illustrative purposes only and is not intended to be a limitation of this disclosure, as other configurations are possible (e.g., the same user may create, query, and view the future experience data card).

Assume for illustrative purposes that when a user (e.g., user 36) is cycling through the various experience data cards included within experience database 100 (including future experience data card 2704), the user (e.g., user 38) wishes to "check in" to the future experience defined within future experience data card 2704. Accordingly, the user (e.g., user 38) may select (via on-screen pointer 130 or a hand gesture) "check in" button 2706 to generate a check in indication. Accordingly, upon experience social networking process 10 receiving 2618 a check in indication from the user (e.g., user 38) concerning checking in to future experience data card 2704, the check-in indication received from the user may be processed 2620 by experience social networking process 10.

Commentary may be received 2622 (in the manner discussed above and shown in FIG. 5) from the user (e.g., user 38) concerning the future experience associated with future experience data card 2704 and experience social networking process 10 may amend 2624 future experience data card 2704 to include the commentary received from the user (e.g., user 38). As discussed above and for this disclosure, the commentary may include any commentary that may be provided by users (e.g., text-based information; photo-based information; video-based information; audio-based information; ratings; symbols; colors; and mood indicators). Alternatively, experience social networking process 10 may generate 2626 a related experience data card (not shown) that is associated with future experience data card 2704 (in the manner described above and illustrated in FIG. 30), wherein the related experience data card includes the commentary received from the user (e.g., user 38). Such a related experience data card may function as a sub-card that is related and linked to future experience data card 2704.

Card/Database Usage:

Example System 10

When the above-described experience "cards" are generated, it may be desirable to include one or more glyphs (e.g., a symbol that conveys information nonverbally) to characterize the experience, so that users who are reviewing the experience "cards" may quickly scan the glyphs to determine what the experience is about. For example, a "knife & fork" glyph may be utilized to characterize an experience concerning food; a "martini glass" glyph may be utilized to characterize an experience concerning alcohol; and a "top hat" glyph may be utilized to characterize a formal experience.

Figure 35:
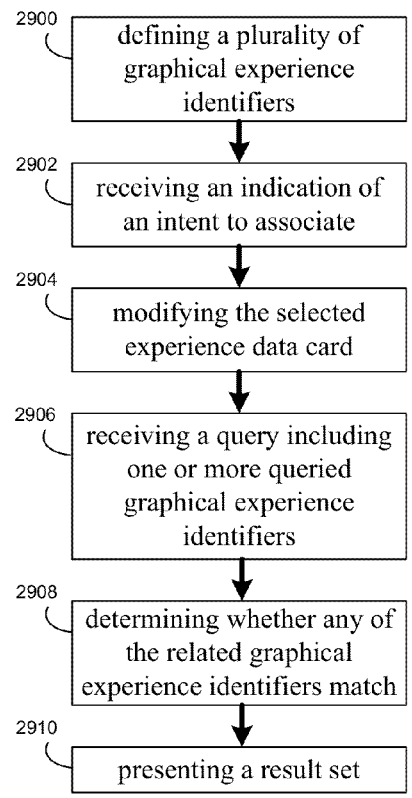
FIG. 35 is a diagrammatic view of a flowchart depicting operations consistent with an embodiment of the experience social networking process of FIG. 1.
Figure 36:
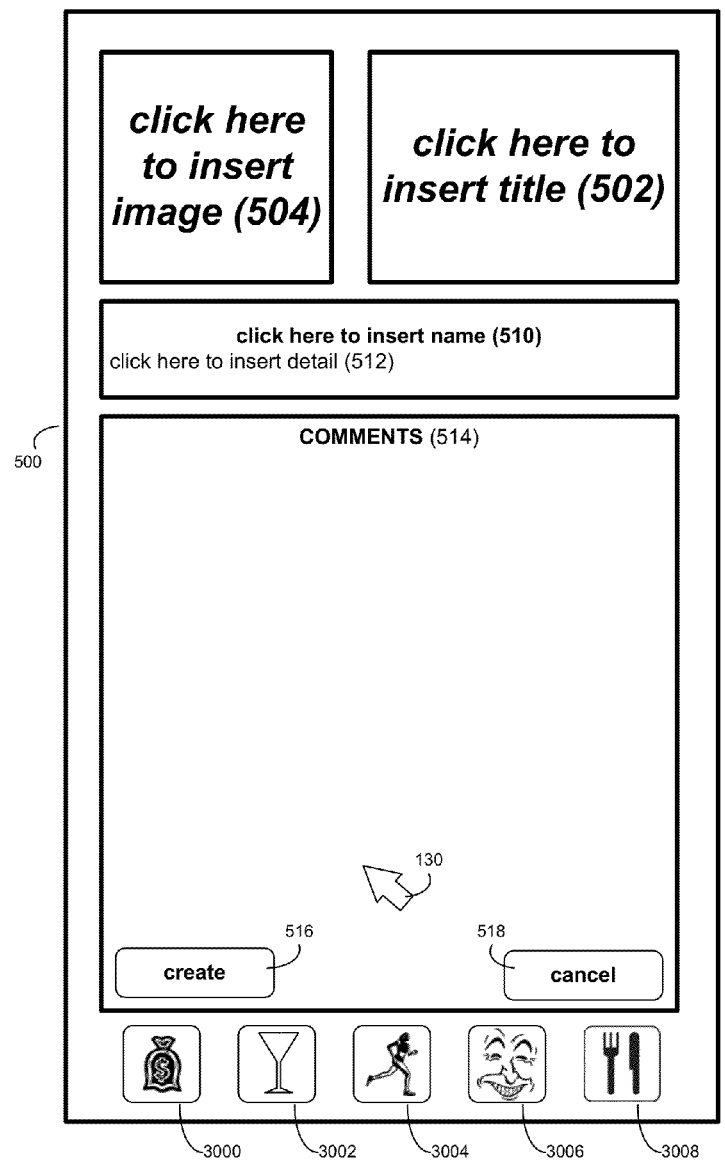
FIG. 36 is a diagrammatic view of a card creation window rendered by the experience social networking process of FIG. 1.

Referring also to FIGS. 35 & 36, experience social networking process 10 may be configured to allow a user to graphically categorize the above-referenced experience data cards (e.g. experience data cards 102, 104, 106, 108, 110, 112, 114, 116, 118, 120, 122). As discussed above, the above-referenced experience data cards (e.g. experience data cards

102, 104, 106, 108, 110, 112, 114, 116, 118, 120, 122) may be stored in experience database 100 and may each be associated with a particular experience.

Experience social networking process 10 may be configured to define 2900 a plurality of graphical experience identifiers (e.g., graphical experience identifiers 3000, 3002, 3004, 3006, 3008) for use within experience database 100. Each of these graphical experience identifiers (e.g., graphical experience identifiers 3000, 3002, 3004, 3006, 3008) may be configured to visually categorize and graphically represent a particular type of experience.

For example, graphical experience identifier 3000 is generally shown to visually include a bag of money and may be used to visually categorize and graphically represent an experience that is more expensive than the average experience.

Further, graphical experience identifier 3002 is generally shown to visually include a martini glass and may be used to visually categorize and graphically represent an experience that involves alcohol/adult beverages.

Additionally, graphical experience identifier 3004 is generally shown to visually include a runner and may be used to visually categorize and graphically represent an experience that is generally athletic in nature.

Further still, graphical experience identifier 3006 is generally shown to visually include a laughing face and may be used to visually categorize and graphically represent an experience that is funny/enjoyable/entertaining.

Additionally, graphical experience identifier 3008 is generally shown to visually include a knife and fork and may be used to visually categorize and graphically represent an experience that involves food.

While five graphical experience identifiers (namely graphical experience identifiers 3000, 3002, 3004, 3006, 3008) are discussed above, this is for illustrative purposes only and is not intended to be a limitation of this disclosure as the number of graphical experience identifiers defined 2900 by experience social networking process 10 may be increased or decreased in accordance with the objectives of an administrator (not shown) of experience social networking process 10.

Accordingly, when using card creation window 500 to generate an experience data card in the manner discussed above (e.g., by populating title entry field 502, image entry field 504, naming field 510, and detail field 512), experience social networking process 10 may be configured to allow e.g. user 36 to visually categorize and graphically represent the experience defined within the experience data card being generated.

For example, experience social networking process 10 may be configured to include graphical experience identifiers 3000, 3002, 3004, 3006, 3008 along e.g. the bottom of card creation window 500. In the event that user 36 wishes to associate one or more of graphical experience identifiers 3000, 3002, 3004, 3006, 3008 with the experience data card being generated, user 36 may simply select (via on-screen pointer 130 or a hand gesture) the appropriate graphical experience identifiers, thus generating an intent-to-associate indication for use by experience social networking process 10. Upon receiving 2902 this intent-to-associate indication from user 36 (concerning their intent to associate one or more related graphical experience identifiers, chosen from the plurality of graphical experience identifiers (e.g., graphical experience identifiers 3000, 3002, 3004, 3006, 3008), with the experience data card being generated), experience social networking process 10 may modify 2904 the experience data card being generated to associate the experience data card being generated with the related graphical experience identifier(s).

Accordingly, when populating card creation window 500, user 36 may simply select one or more of graphical experience identifiers 3000, 3002, 3004, 3006, 3008 to indicate that they wish to visually categorize and graphically represent the experience defined within the experience data card being generated. Upon receiving 2902 this indication from user 36, the experience data card being generated may be modified 2904 to associate the experience data card being generated with the one or more related graphical experience identifiers.

For example, if the experience data card being generated concerned an experience at a particular high-end nightclub, user 36 may wish to select graphical experience identifiers 3000, 3002, 3008. Alternatively, if the experience data card being generated concerned a particular show at an inexpensive comedy club, user 36 may wish to select graphical experience identifiers 3002, 3006, 3008.

As discussed above, once the various fields within card creation window 500 are populated by user 36, user 36 may select "create" button 516 (via on-screen pointer 130 or a hand gesture), thus resulting in experience social networking process 10 generating the experience data card defined within card creation window 500. Alternatively, user 36 may select "cancel" button 518 (via on-screen pointer 130 or a hand gesture) to abort the experience data card creation process.

While graphical experience identifiers are described above as being used to modify new experience data cards that are being generated by e.g., user 36, this is for illustrative purposes only and is not intended to be a limitation of this disclosure as other configurations are possible. For example, experience social networking process 10 may be configured to allow e.g. user 36 to modify existing experience data cards (i.e., experience data cards generated by third parties) to include one or more graphical experience identifiers. Specifically, experience social networking process 10 may be configured so that when a user updates an existing experience data card (e.g. to add commentary), that user may also be able to select one or more of the above-described graphical experience identifiers (e.g., graphical experience identifiers 3000, 3002, 3004, 3006, 3008) for inclusion within the card.

Figure 37:
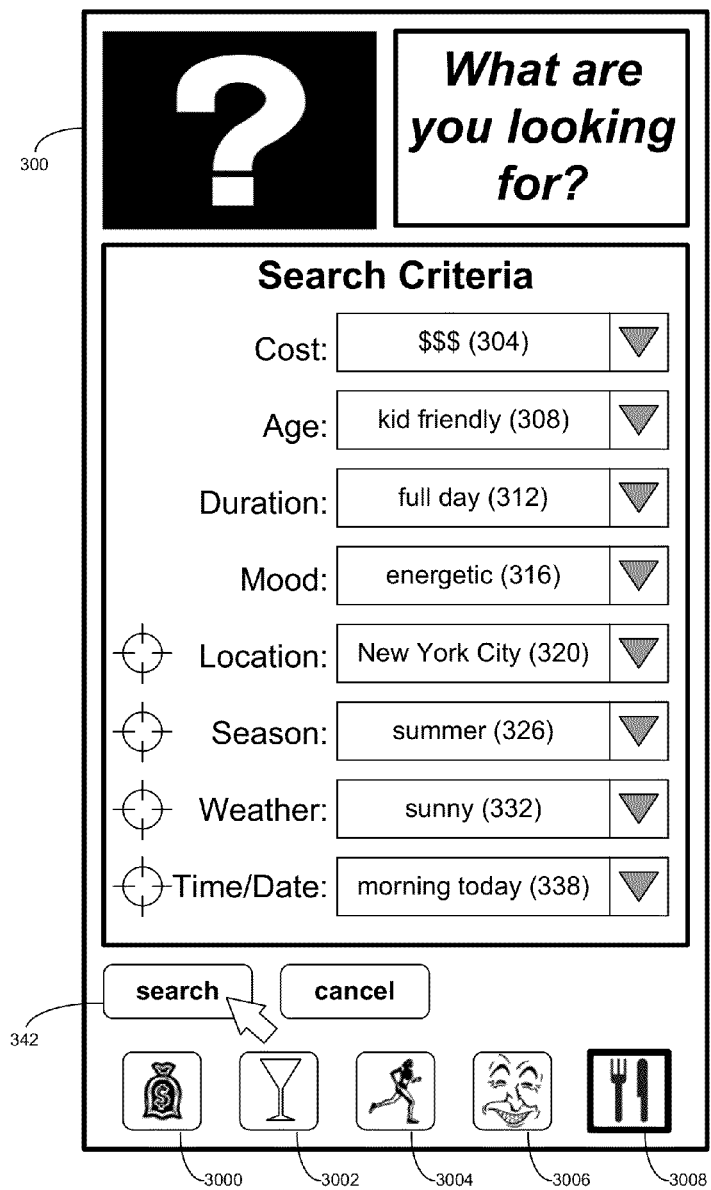
FIG. 37 is a diagrammatic view of a search window rendered by the experience social networking process of FIG. 1.

As discussed above, in order to allow user 36 to more efficiently search the various experience data cards (e.g. experience data cards 102, 104, 106, 108, 110, 112, 114, 116, 118, 120, 122) included within experience database 100, experience social networking process 10 may be configured to allow user 36 to search experience database 100. For example and referring also to FIG. 37, user 36 may select (via e.g. on-screen pointer 130 or a hand gesture) search button 140 (see FIG. 2) and experience social network process 10 may render search window 300 that may allow user 36 to efficiently search experience database 100. Search window 300 may include graphical experience identifiers 3000, 3002, 3004, 3006, 3008 so that user 36 may select (via e.g. on-screen pointer 130 or a hand gesture) one or more of graphical experience identifiers 3000, 3002, 3004, 3006, 3008 to further refine the search criteria.

For example, assume that user selects graphical experience identifier 3006 (in addition to the search criteria defined within fields 304, 308, 312, 316, 320, 326, 332, 338) and then selects "search" button 342, experience social networking process 10 may receive 2906 the related query, which includes one or more queried graphical experience identifiers (namely graphical experience identifier 3006) and may determine 2908 whether any of the graphical experience identifiers included within/related to the experience data cards included within experience database 100 match any of the queried graphical experience identifiers (namely graphical experience identifier 3006). Naturally, any additional search criteria defined within fields 304, 308, 312, 316, 320, 326, 332, 338 may also be taken into consideration when processing the above-described query.

When at least one of the graphical experience identifiers included within/related to the experience data cards included within experience database 100 matches at least one of the queried graphical experience identifiers (namely graphical experience identifier 3006), a result set (such as result set 350 shown in FIG. 7) may be generated and presented 2910 to the provider of the query, which in this example is user 36. Naturally, any result set presented 2910 to user 36 may take into consideration the additional search criteria defined within fields 304, 308, 312, 316, 320, 326, 332, 338 of search window 300.

Example System 11

In some embodiments, experience social networking process 10 may provide techniques for creating a canonical object, which may provide a link to one or more experience data cards. The phrase "canonical object" as used herein may refer to its plain meaning as well as a single representative object that represents all other objects of that type.

As discussed herein, the experience data cards may be stored in a database of experiences. Each experience data card may be updated, e.g. it may be editable by other users of the social network once they have participated in the experience themselves. The updated experience may be stored and accessible by the members of the social network. The experience data cards may be accessed in any number of ways including, but not limited to, third party websites, social streams, mobile phones, etc.

Referring now to FIG. 38, a website 3200 is provided. Website 3202 may include a user-selectable option 3202, which may allow a user (e.g. user 36) to store an experience data card that may be related to the website. For example, a user (e.g. user 36) who is exploring a website may see content that they would like to save for later. In this way, the user may be able to grab this content by grabbing the canonical object from the website without having to copy a string of text. The canonical object may appear in a number of places. For example, in multiple websites, within a social networking stream, on user cellphones, etc. Accordingly, an action taken on an object in one place (e.g. the website discussed above) may affect the object everywhere (e.g. a comment on the experience).

In some embodiments, experience social networking process 10 may be configured to provide, via one or more computing devices, experience content concerning one or more experiences to a third-party server, wherein third-party server serves the experience content for public consumption through a third-party website. In some embodiments, the third party website may include, but is not limited to, an entertainment, tourism, or review website.

In some embodiments, experience social networking process 10 may be configured to receive, on the one or more computing devices, user commentary concerning the experience content served by third-party server, wherein the user commentary is based, at least in part, upon user feedback provided by one or more users via the third-party website.

In some embodiments, experience social networking process 10 may be configured to modify, via the one or more computing devices, the experience content based at least in part upon the user commentary, thus generating modified experience content.

In some embodiments, experience social networking process 10 may be configured to store the modified experience content on a database accessible via the one or more computing devices. Experience social networking process 10 may be configured to provide the modified experience content to one or more additional parties.

Additionally and/or alternatively, the user commentary may be provided via an applet running on the third-party server, via a social stream, or using any additional approach.

Example System 12

More specifically, embodiments herein provide techniques for creating an experience data card, which may provide a link to a summary corresponding to a user's experience as is described above. This summary may be stored in a database of experiences (e.g. experience database 100). The summary of the experience may be updated, e.g. it may be editable by other members of the social network once they have participated in the experience themselves. The updated experience may be stored and accessible by the members of the social network. Experience data card may be accessed in any number of ways including, but not limited to, third party websites, social streams, mobile phones, etc.

In some embodiments, the experience data card may be configured to be displayed in a manner that is different for different users based on particular criteria, such as social affinity. For example, images associated with the experience data card may be tailored to that particular user. This determination may be made based upon the user's social graph. In this way, the appearance of the experience data card may vary from user to user.

For example, imagine that a social networking stream has one experience data card to denote the cupcakes at a particular bakery. One of user 36's friends (user 38) may have updated that experience data card by adding a photo of her (user 38) eating the cupcake. When this experience data card is shown to be shown to user 36, the server serving the experience data card may select the photo of user 38 to show to user 36 (based, e.g., on the fact that user 38 is in user 36's circles or the two users' accounts are linked as "friends" in a social network). Therefore, the photo shown with the experience data card may not be a generic photo of cupcakes from that bakery (which might have been the original photo included with the experience data card), but instead that of one of user 36's friends eating the cupcake. The experience data card may remain canonical, i.e., all actions taken on that object (e.g. a comment) affect all other instantiations of the cupcake object, though the appearance, description, etc of the object may vary from user to user.

Figure 39:
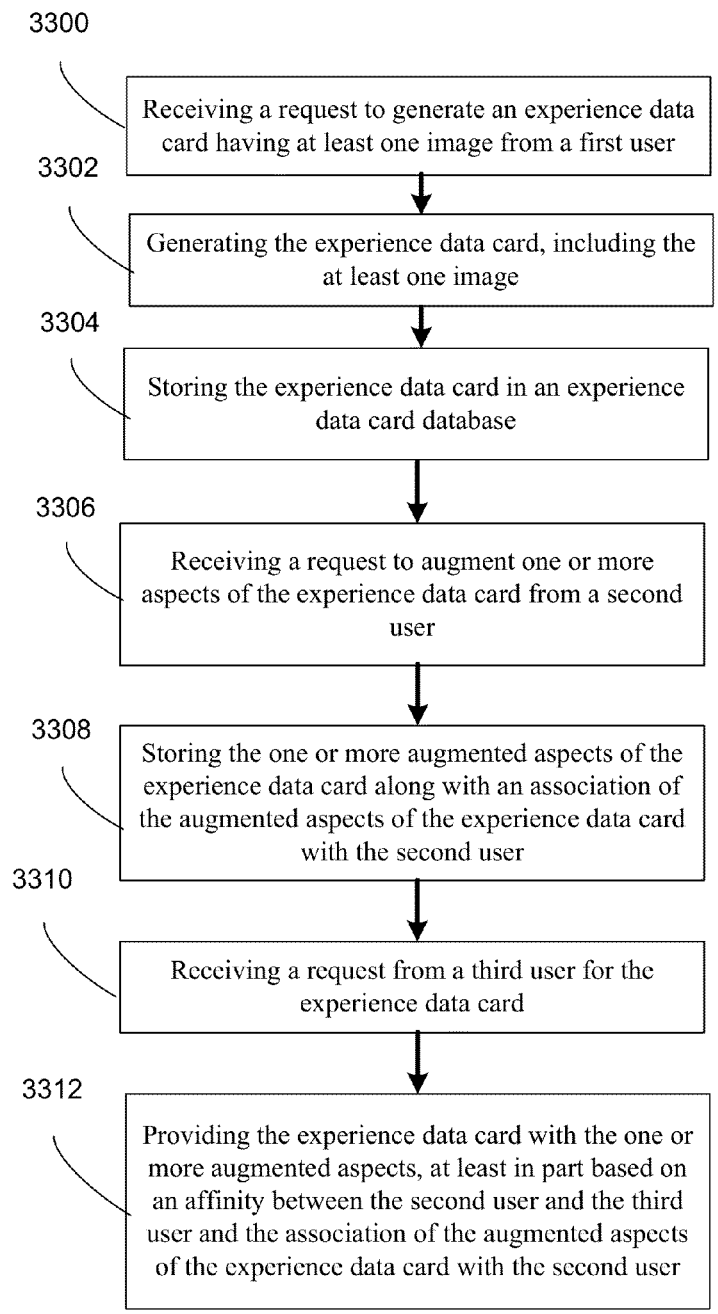
FIG. 39 is a diagrammatic view of a flowchart depicting operations consistent with an embodiment of the experience social networking process of FIG. 1.
Figure 40:
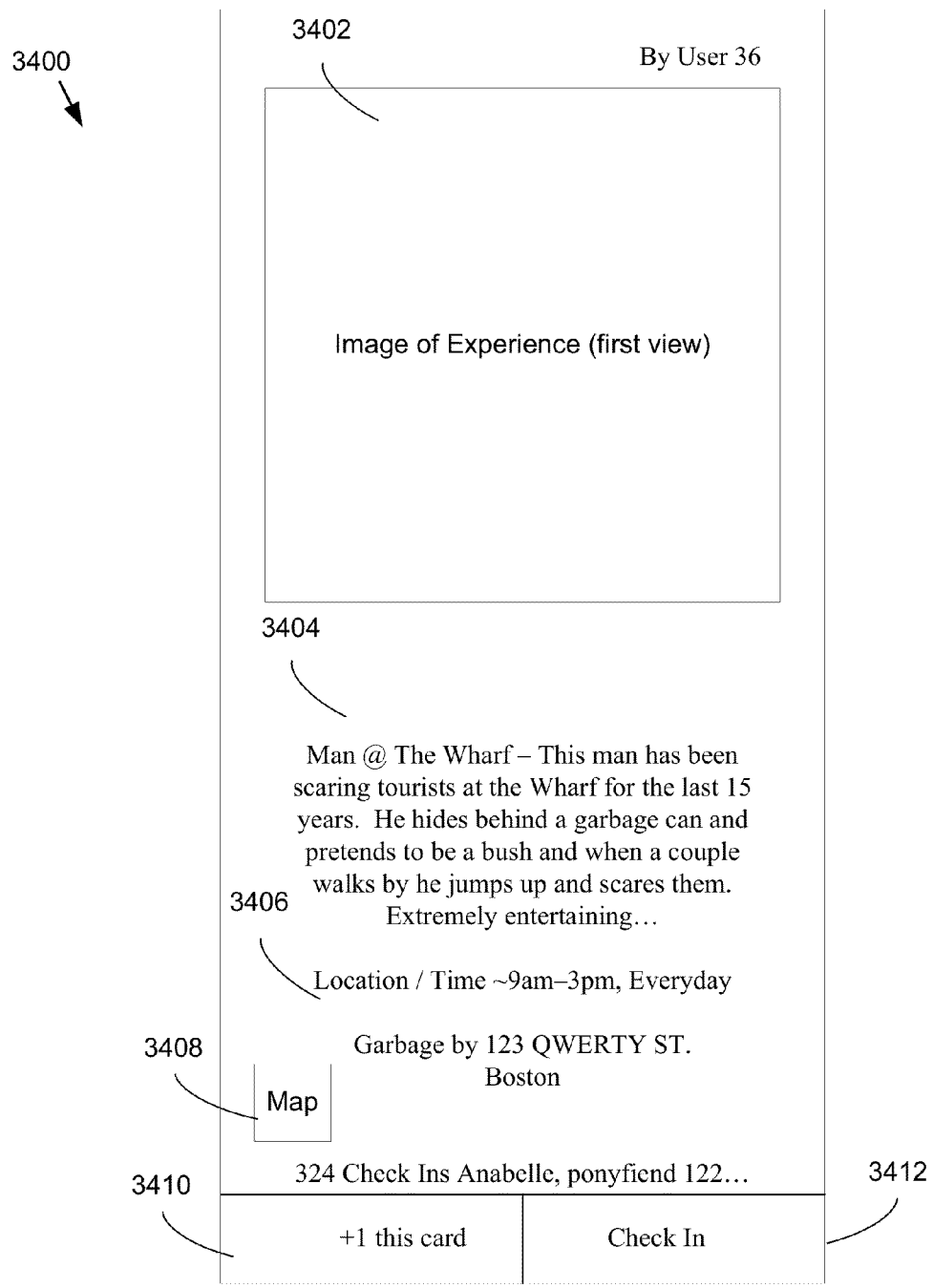
FIG. 40 is a diagrammatic view of an experience data card rendered by the experience social networking process of FIG. 1.
Figure 41:
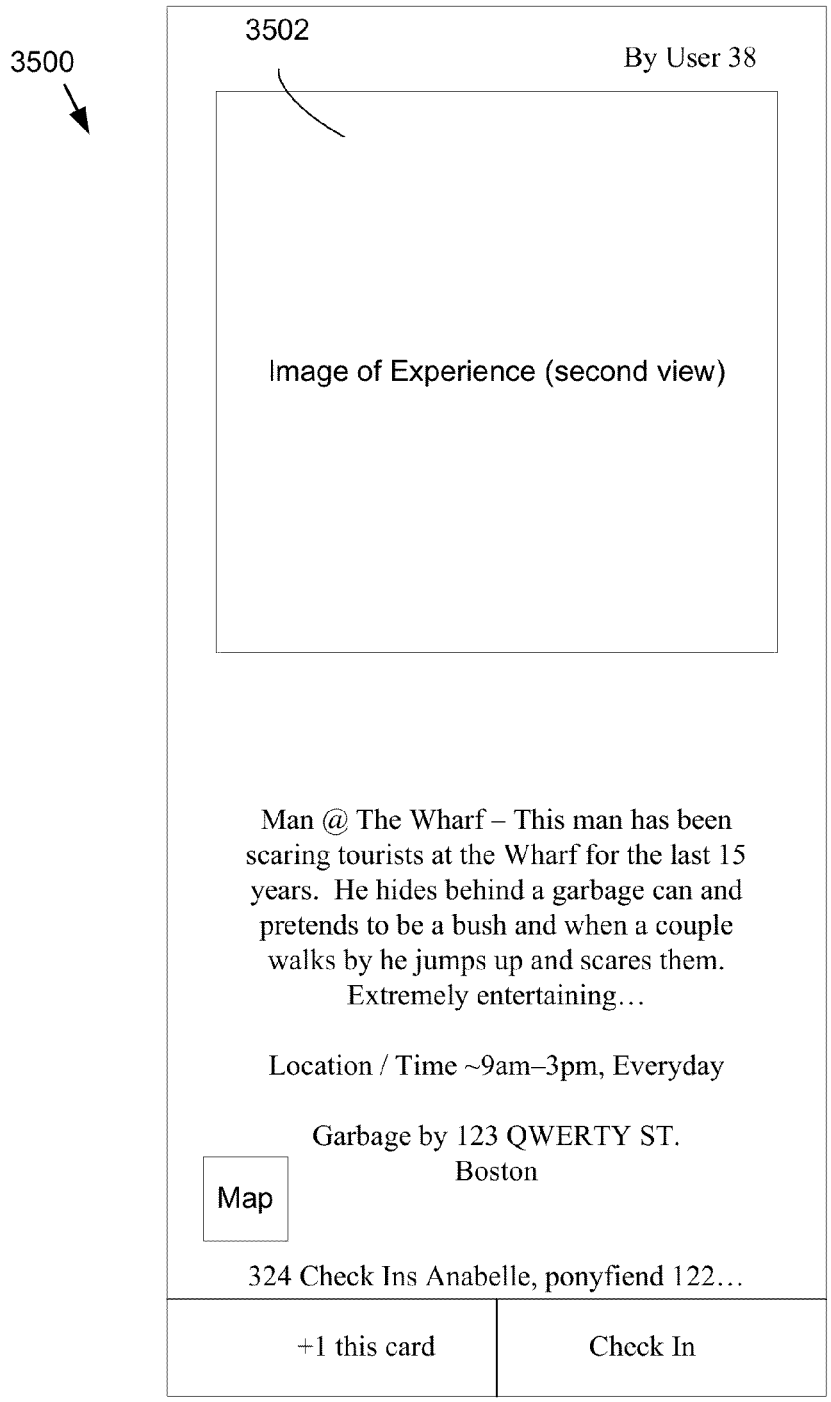
FIG. 41 is a diagrammatic view of an experience data card rendered by the experience social networking process of FIG. 1.

Referring to FIGS. 39-41 and as discussed above, experience social networking process 10 may be configured to receive user commentary concerning a user experience via client electronic devices (e.g., data-enabled, cellular telephones 28, 30, personal digital assistant 32, personal computer 34, laptop computer (not shown), a tablet computer (not shown) or a touch screen computer (not shown). As discussed above, a particular user (e.g. user 36) may wish to create an experience data card for any conceivable experience as is discussed in further detail hereinbelow.

Experience social networking process 10 may be configured to receive 3300 a request, at one or more computing devices, to generate an experience data card having at least one image from a first user (e.g. user 36). The experience data card may be generated in accordance with any of the techniques described herein.

Accordingly, experience social networking process 10 may be configured to generate 3302 a user experience data card including the at least one image. For example, a first user (e.g., one or more of users 36, 38, 40, 42) may witness an experience at a particular venue (e.g., the odd behavior of the man@the wharf shown in FIG. 40). The first user (e.g. user 36) may then generate user commentary, e.g., description of the man at the wharf, and store it as an experience data card (e.g., experience data card 3400) in experience database 100. The user commentary need not be limited to descriptions as it may also include pictures, a location, a description, etc.

Experience social networking process 10 may be configured to store 3304, using the one or more computing devices, the experience data card in an experience data card database. For example, experience data card database 100 shown in FIG. 1.

A second user (e.g., user 38) may then go and witness the man at the wharf as set forth in the experience data card. Accordingly, experience social networking process 10 may be configured to receive 3306, a request, using the one or more computing devices, to augment one or more aspects of the experience data card from a second user. In this way, the second user (e.g., user 38) may then update the experience described in the experience data card to reflect his or her own experience. Additionally and/or alternatively, the second user (e.g., user 38) may decide that the experience described in the experience data card is one that they wish to enjoy at some future time. In this example, the second user (e.g., user 38) may save the experience data card to a future experience list. As such, experience social networking process 10 may allow for individual users (e.g. user 38) to generate future experience lists that may be stored for their review and completion at a later date.

As discussed above, experience social networking process 10 may be configured to store the user experience data card (e.g. experience data card 3400) in experience database 100. In some embodiments, experience social networking process 10 may store 3308, using the one or more computing devices, the one or more augmented aspects of the experience data card along with an association of the augmented aspects of the experience data card with the second user;

Additionally and/or alternatively, the stored user experience data card (e.g. experience data card 3400) may correspond to a first view of the user experience data card. For example, experience data card 3400 may include an image 3402, which relates in some way to the experience. In this particular example, a photo showing the Man at the Wharf may be associated with experience data card 3400.

As discussed above, experience data card may include numerous types of information, including, but not limited to, image 3402, description 3404, location/timing information 3406, geographical information 3408, and user commentary features 3410 and 3412. This information may be stored in experience database 100 and associated with experience data card 3400. It should be noted that the type and manner of information set forth on experience data card 3400 is merely provided by way of example, as any type of information may be included and may be displayed in any suitable manner.

In some embodiments, experience social networking process 10 may be configured to receive a request for an experience data card from a second user (e.g., user 38). For example, user 38 may cycle through and review the various experience data cards located within experience database 100 using a client electronic device (e.g. data-enabled, cellular telephones 28, 30, personal digital assistant 32, personal computer 34, laptop computer (not shown), a tablet computer (not shown) or a touch screen computer (not shown), etc.). In this particular example, assume that user 38 would like to learn more about experience data card 3400, i.e., the Man at the Wharf experience, which was created by user 36. Upon receiving the request from user 38, experience social networking process 10 may be configured to provide 3308 user experience data card 3400 to user 38.

In some embodiments, once user 38 has received user experience data card 3400, he or she may wish to participate in the experience themselves. For example, user 38 may participate in the Man at the Wharf experience, possibly getting their picture taken with the man, etc. User 38 may then provide commentary regarding the experience via a client electronic device (e.g. data-enabled, cellular telephones 28, 30, personal digital assistant 32, personal computer 34, laptop computer (not shown), a tablet computer (not shown) or a touch screen computer (not shown), etc.). Additionally and/or alternatively, experience social networking process 10 may allow user 38 to save the user experience data card to his or her future experience list.

In the event that user 38 does participate in the experience, experience social networking process 10 may be configured to receive feedback from user 38 concerning user experience data card 3400. The feedback may include user commentary such as the pictures and descriptions described above. For example, the user commentary may include the picture taken of user 38 and the Man at the Wharf.

In this way, experience social networking process 10 may be configured to generate a second view of the user experience data card 3500. The second view may be based at least partially upon the feedback/user commentary from user 38. For example, the second view of user experience data card 3500 may include image 3502, which may include the photo of user 38 and the man at the wharf. In other words, the second view (e.g. FIG. 41) may provide a user experience data card that is distinct from the first view of the experience data card shown in FIG. 40. It should be noted that the distinct aspects of user experience data card 3500 shown in FIG. 41 are not limited merely to altering images, as the second user (e.g. user 38) may alter any or all aspects of user experience data card 3400 (e.g., description, time, layout of the card, etc.).

In some embodiments, experience social networking process 10 may be configured to receive 3310 a request, using the one or more computing devices, from a third user for the experience data card. For example, user 40 may wish to receive the experience data card associated with the Man at the Wharf experience after reviewing the experiences within experience database 100.

Accordingly, experience social networking process 10 may be configured to provide 3312, using the one or more computing devices, the experience data card with the one or more augmented aspects provided by the second user (e.g. user 38). In some embodiments, this determination may be based on an affinity between the second user (e.g. user 38) and the third user (e.g. user 40) and the association of the augmented aspects of the experience data card with user 38.

In some embodiments, experience social networking process 10 may be configured to rank one or more affinities between the third user (e.g. user 40) and each of the first user (e.g. user 36) and the second user (e.g. user 38). Experience social networking process 10 may be configured to provide the most appropriate experience data card based upon the rankings. For example, if user 40 is a friend of user 36 and does not know user 38 then that version of experience data card may be provided. Additionally and/or alternatively, experience social networking process 10 may be configured to dynamically update the rankings, based upon one or more received comments associated with the experience data card. In some embodiments, experience social networking process 10 may be configured to determine whether the second user and the third user are linked in a social network. If it is determined that there is a link (e.g. a social networking link) then experience social networking process 10 may provide a version of the experience data card based upon that determination. The experience data card may be accessed using any of the techniques described herein such as via a social networking stream Example System 13

In some embodiments, upon request, a suggested experience may be selected from the database of experiences and provided to a user based upon a wide variety of factors. Some of these factors may include, but are not limited to, weather condition, a temperature condition, a time of day, a mood, a theme, the time of year, the geographic location, an expiration date, a social affinity, an experience rating, experience partners, etc. For example, if a user in a particular location requests a suggested experience on a Friday at 1:00 pm, an experience related to Bingo Fridays starting nearby at 2:00 pm may be the most relevant. Thus, this portion of the result set may be presented to the user. However, on a Wednesday, this experience may be demoted and may not be the most relevant. Thus, on a Wednesday, Bingo Fridays may not be the first experience presented to the user.

In order to allow user 36 to more efficiently search the various experience data cards (e.g. experience data cards 102, 104, 106, 108, 110, 112, 114, 116, 118, 120, 122) included within experience database 100, experience social networking process 10 may be configured to allow user 36 to search experience database 100. For example and referring also to FIG. 43, user 36 may select (via e.g. on-screen pointer 132 or a hand gesture) search button 140 (see FIG. 2) and experience social network process 10 may render search window 3700 that may allow user 36 to efficiently search experience database 100.

Specifically, when searching experience database 100, user 36 may take into consideration several factors. For the following discussion, the factors discussed are for illustrative purposes only and are not intended to be a limitation of this disclosure. For example, the factors searchable within experience database 100 may be configured in accordance with the objectives of an administrator (not shown) of experience social networking process 10.

One such factor that may be considered is cost 3702. For example, in the event that user 36 does not wish to/cannot spend a lot of money, user 36 may wish to only consider experiences that are low-cost (e.g. a walk through Central Park in the spring). Alternatively, in the event that cost is a lesser concern, user 36 may wish to consider experiences that are higher cost (e.g. a private helicopter tour of Manhattan). Accordingly, experience social networking process 10 may be configured to allow user 36 to select a preferred cost within cost field 3704 of search window 3700.

Another factor that may be considered is age 3706. For example, in the event that user 36 is alone or with a spouse/adult friend, user 36 may wish to consider adult experiences (e.g. visiting various bars/clubs in SoHo). Alternatively, in the event that user 36 is with family (which includes minor children), user 36 may wish to only consider experiences that do not have age restrictions (e.g. visiting the fair in Central Park). Accordingly, experience social networking process 10 may be configured to allow user 36 to select a preferred age within age field 3708 of search window 3700.

Another factor that may be considered is duration 13.2.10. For example, how long an experience is user 36 considering. Are they looking for an experience that may last all day (e.g. a tour of Napa Valley) or they looking for an experience that may be considerably shorter (e.g. a tour of Alcatraz Island). Accordingly, experience social networking process 10 may be configured to allow user 36 to select a preferred duration within duration field 3712 of search window 3700.

Another factor that may be considered is mood 3714. For example, is user 36 interested in an energetic adventure (climbing the stairs to the observation deck of the Empire State Building) or a more relaxed experience (e.g., riding the Circle Line around Manhattan). Accordingly, experience social networking process 10 may be configured to allow user 36 to select a preferred mood within mood field 3716 of search window 3700.

Another factor that may be considered is location 3718. For example, is user 36 interested in an experience at their current location (e.g., New York City) or an experience in a location that they will be visiting in the future (e.g., Paris, France). Accordingly, experience social networking process 10 may be configured to allow user 36 to select a preferred location within location field 3720 of search window 3700. Search windows 3700 may also include "my current location" button 3722 that may allow user 36 to quickly define their current location (as determined by e.g., triangulation or GPS technology) as their preferred location.

Additionally, through one or more configuration menus (not shown), user 36 may be able to define a radius/tolerance for location field 3720. For example, experience social networking process 10 may be configured to allow user 36 to define an experience as being at a certain location if it is within e.g., a 5 mile, a 10 mile, or a 25 mile radius of the preferred location.

Another factor that may be considered is season 3724. For example, user 36 may only be able to go skiing at Hunter Mountain during the winter, while user 36 may only be able to go hang-gliding in the Adirondacks during the summer. Accordingly, experience social networking process 10 may be configured to allow user 36 to select a preferred season within season field 3726 of search window 3700. Search windows 3700 may also include "my current season" button 3728 that may allow user 36 to quickly define the current season (as determined by an available calendar) as their preferred season.

Another factor that may be considered is weather 3730. For example, user 36 may only desire to go to the Jersey Shore when it is sunny, while user 36 may only be interested to performing an indoor activity (e.g., going to the Museum of Natural History) when it is rainy/cold outside. Accordingly, experience social networking process 10 may be configured to allow user 36 to select preferred weather within weather field 3732 of search window 3700. Search windows 3700 may also include "my current weather" button 3734 that may allow user 36 to quickly define the current weather for their current location (as determined by e.g., triangulation or GPS technology and an accessible weather service) as their preferred weather.

Another factor that may be considered is time/date 3736. For example, user 36 can only watch a sunrise in the morning and can only watch a sunset in the evening. Further, user 36 may only be able to attend a Friday Night Harbor Cruise on a Friday night (as opposed to a Thursday Night). Accordingly, experience social networking process 10 may be configured to allow user 36 to select a preferred time/date within time/ date field 3738 of search window 3700. Search windows 3700 may also include "my current time/date" button 3740 that may allow user 36 to quickly define the current time/date (as determined by an available clock/calendar) as their preferred time/date.

Figure 42:
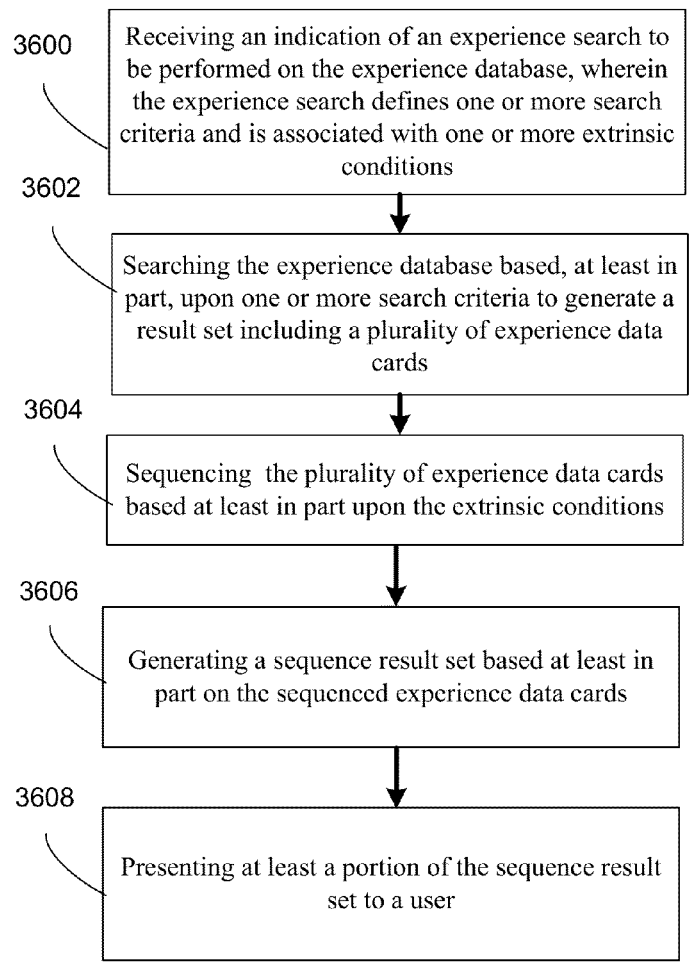
FIG. 42 is a diagrammatic view of a flowchart depicting operations consistent with an embodiment of the experience social networking process of FIG. 1.
Figure 43:
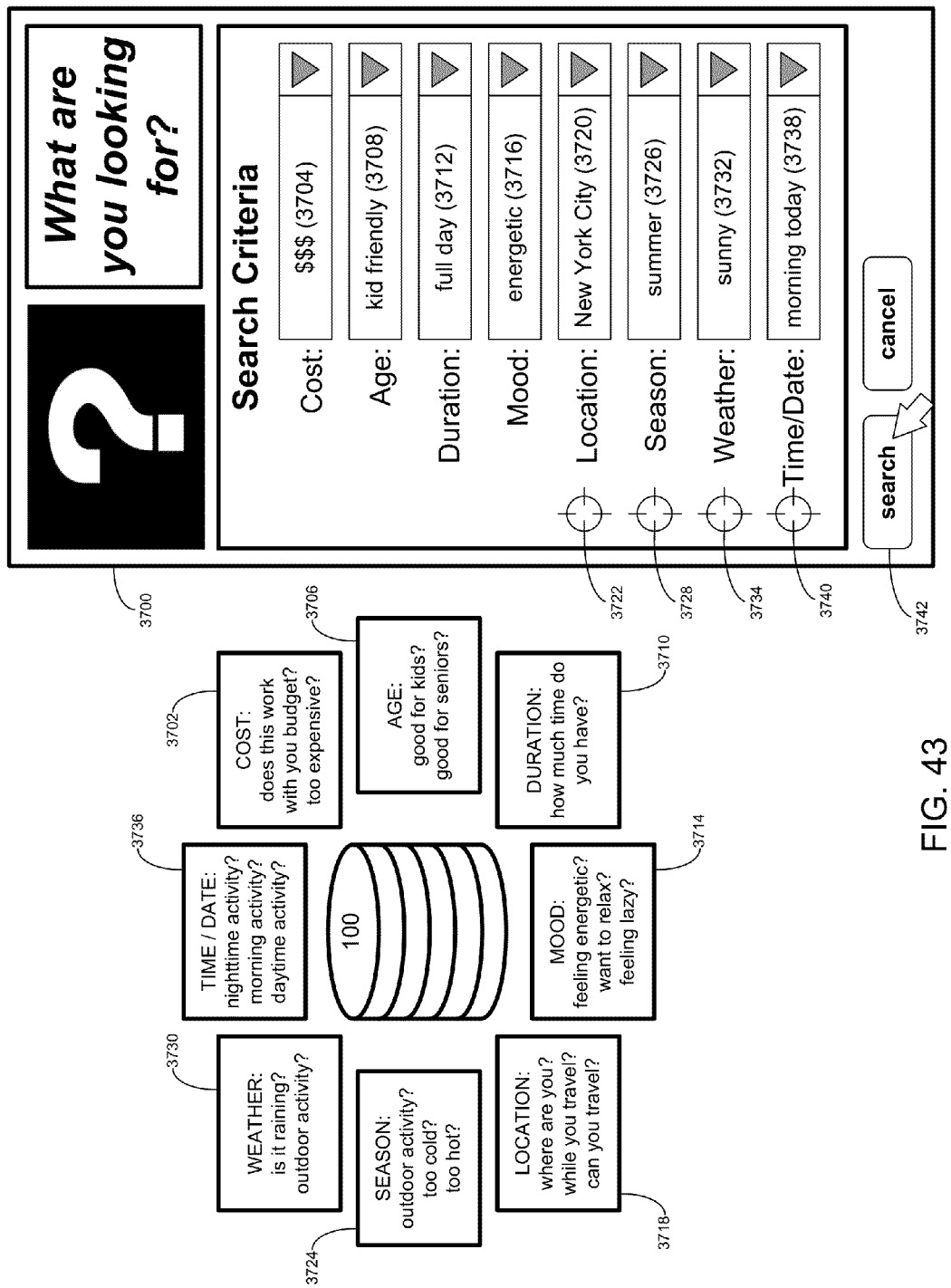
FIG. 43 is a diagrammatic view of a search window rendered by the experience social networking process of FIG. 1.
Figure 44:
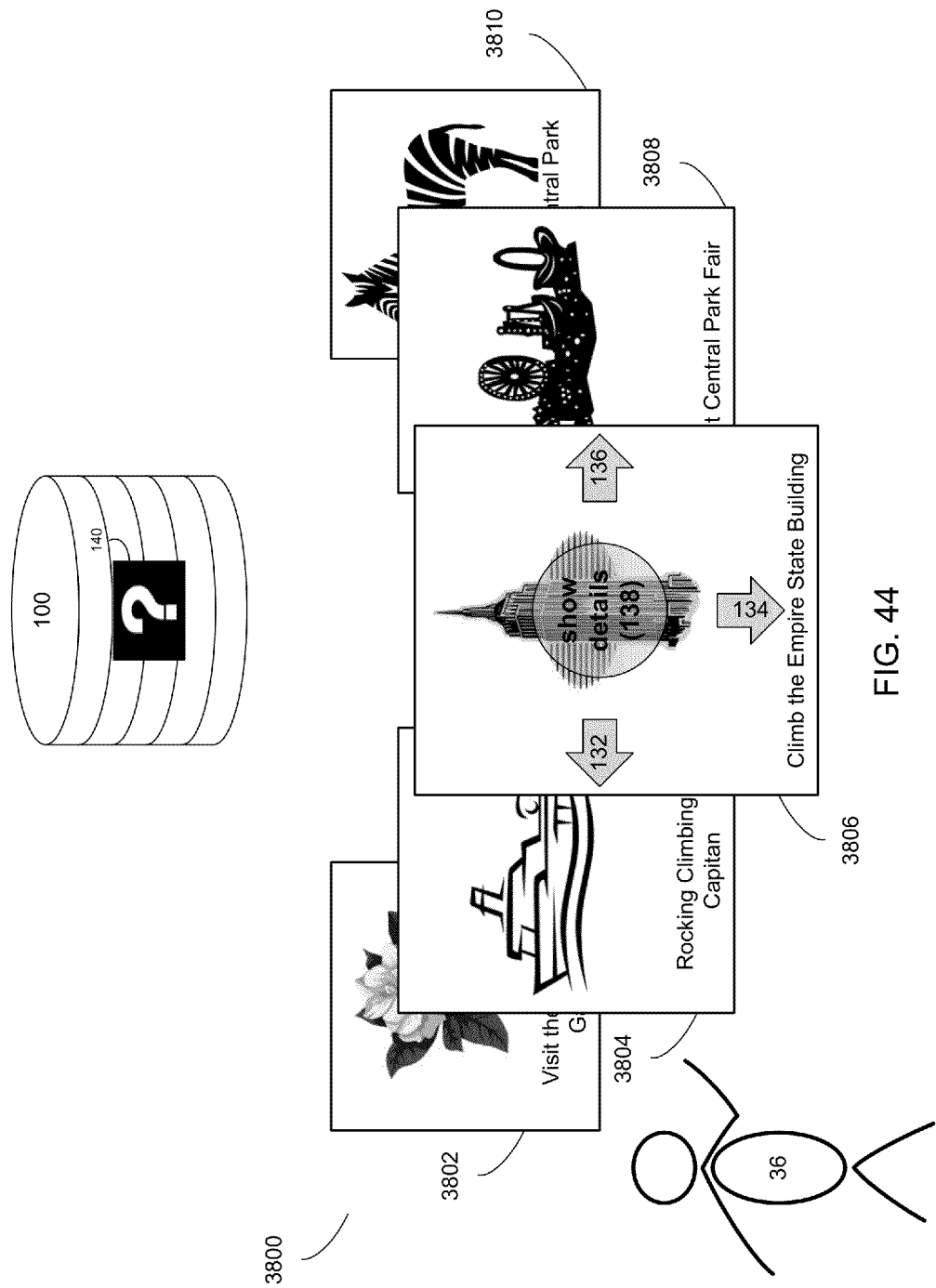
FIG. 44 is a diagrammatic view of a result set generated by the experience social networking process of FIG. 1.

Referring now to FIGS. 42-44, in some embodiments, experience social networking process 10 may be configured to receive 3600, on one or more computing devices, an indication of an experience search to be performed on the experience database. For example, user 36 may want to search experience database 100 as discussed above. The experience search may define one or more search criteria and may be associated with one or more extrinsic conditions such as those set forth in FIG. 4.3.

In some embodiments, experience social networking process 10 may be configured to search 3602, on the one or more computing devices, the experience database based, at least in part, upon one or more search criteria to generate a result set including a plurality of experience data cards. One particular result set 3800 is shown in FIG. 44.

As discussed above, experience social networking process 10 may be configured to sequence 3604, on the one or more computing devices, the plurality of experience data cards based at least in part upon the extrinsic conditions. For example, if a user (e.g. user 36) in a particular location requests a suggested experience on a Friday at 1:00 pm, an experience related to Bingo Fridays starting nearby at 2:00 pm may be the most relevant. Thus, this portion of the result set may be presented to the user. However, on a Wednesday, this experience may be demoted and may not be the most relevant. Thus, on a Wednesday, Bingo Fridays may not be the first experience presented to the user.

Accordingly, experience social networking process 10 may be configured to generate 3606, using the one or more computing devices, a sequence result set (e.g. 3800) based at least in part on the sequenced experience data cards. In this way, experience social networking process 10 may be configured to present 3608, on the one or more computing devices, at least a portion of the sequence result set 3800 to a user (e.g. user 36). In some embodiments, presenting at least a portion of the sequence result set may be based upon, at least in part, a popularity metric. For example, the popularity metric may be based upon, at least partially, a gross rating from all users of the experience database. Additionally and/or alternatively, the popularity metric may be based upon a social affinity associated with the user (e.g. user 36).

As discussed above, and referring again to FIG. 43, once search window 3700 is wholly or partially populated by user 36, user 36 may select (via on-screen pointer 130 or a hand gesture) "search" button 3742 within search window 3700. Referring also to FIG. 44, upon selecting "search" button 3742, result set 3800 may be generated by experience social networking process 10 that includes a plurality of experience data cards that satisfy the above-described search criteria. User 36 may cycle through and review the individual experience data cards (namely experience data cards 3802, 3804, 3806, 3808, 3810 included within result set 3800) in the manner described above. While only five experience data cards are shown to be included within sequence result set 3800, this is for illustrative purposes only and is not intended to be a limitation of this disclosure.

As discussed above, any number of factors and/or extrinsic conditions may be used as a basis for the experience data card search. Some extrinsic conditions/factors may include, but are not limited to, a weather condition and a temperature condition, a mood, a theme, and a time of year, a geographic location, an expiration date, a social affinity, an experience rating, experience partners, a time of day, etc.

Additionally and/or alternatively, experience social networking process 10 may be configured to provide, on the one or more computing devices, a second user with an option to create a comment associated with an experience of the sequence result set. For example, user 38 may wish to create a comment associated with a experience data card created by user 36. Accordingly, experience social networking process 10 may be configured to allow user 38 to upload his/her comment and may also allow for user 38 to store the comment from user 38 in the experience database in association with the sequence result set.

Example System 14

It may be desirable for the above-described system to put together an itinerary for you when you have a defined period of time to spend at a certain location. For example, when a user visits New York City and has a day for which they have nothing scheduled, it may be desirable for the user to e.g. identify the period of time that they have available so that the system may search the above-described experience database to determine what experiences are available within the defined period of time identified by the user. Depending on the resources available to the system, driving/walking directions may be provided to the user and/or weather conditions may be considered, As discussed above, in order to allow a user (e.g., user 36) to more efficiently search the various experience data cards (e.g. experience data cards 102, 104, 106, 108, 110, 112, 114, 116, 118, 120, 122) included within experience database 100, experience social networking process 10 may be configured to allow user 36 to search experience database 100.

Figure 45:
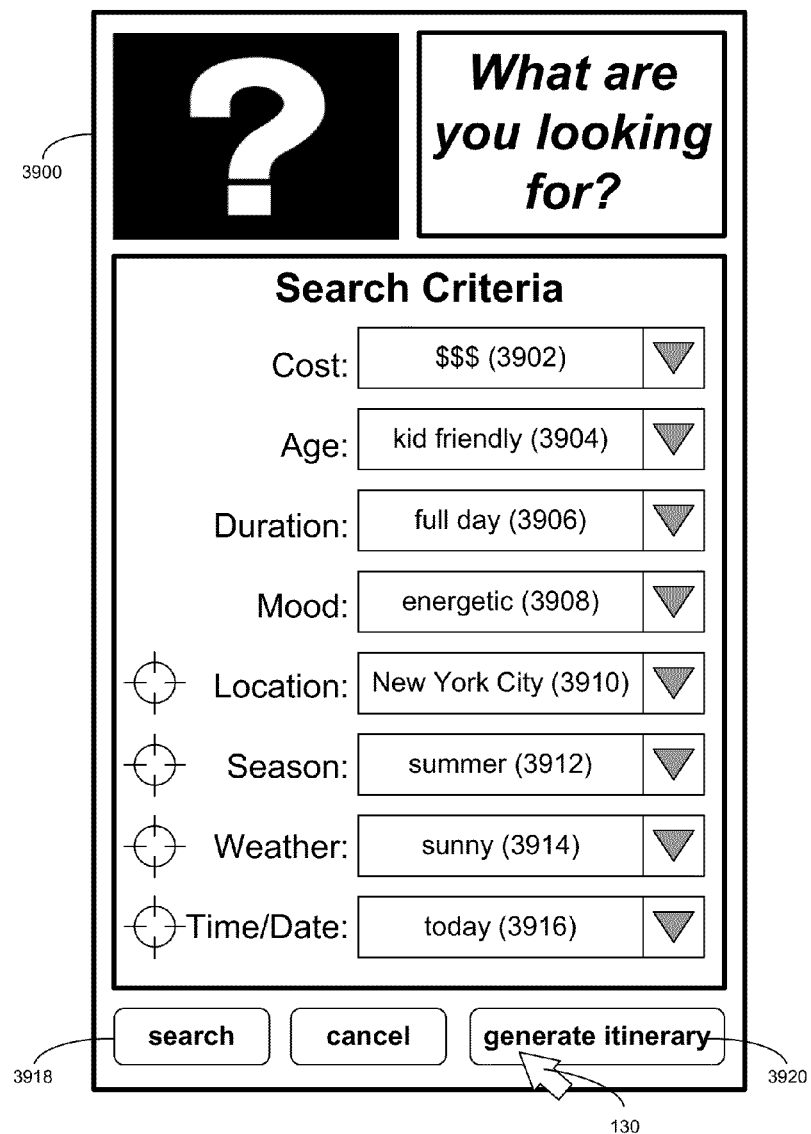
FIG. 45 is a diagrammatic view of a search window rendered by the experience social networking process of FIG. 1.

For example and referring also to FIG. 45, user 36 may select (via e.g. on-screen pointer 130 or a hand gesture) search button 140 (see FIG. 2) and experience social network process 10 may render search window 3900 that may allow user 36 to efficiently search experience database 100.

Specifically, when searching experience database 100, user 36 may take into consideration several factors. For the following discussion, the factors discussed are for illustrative purposes only and are not intended to be a limitation of this disclosure. For example, the factors searchable within experience database 100 may be configured in accordance with the objectives of an administrator (not shown) of experience social networking process 10. Examples of such factors include: cost 3902; age 3904; duration 3906; mood 3908; location 3910; season 3912; weather 3914; and time/date 3916.

As discussed above, once search window 3900 is wholly or partially populated by user 36, user 36 may select (via on-screen pointer 130 or a hand gesture) "search" button 3918 within search window 3900. As discussed above, this would result in experience social networking process 10 generating a result set (see FIG. 7) that provides user 36 with various experience options (in the form of a plurality of experience data cards).

Figure 46:
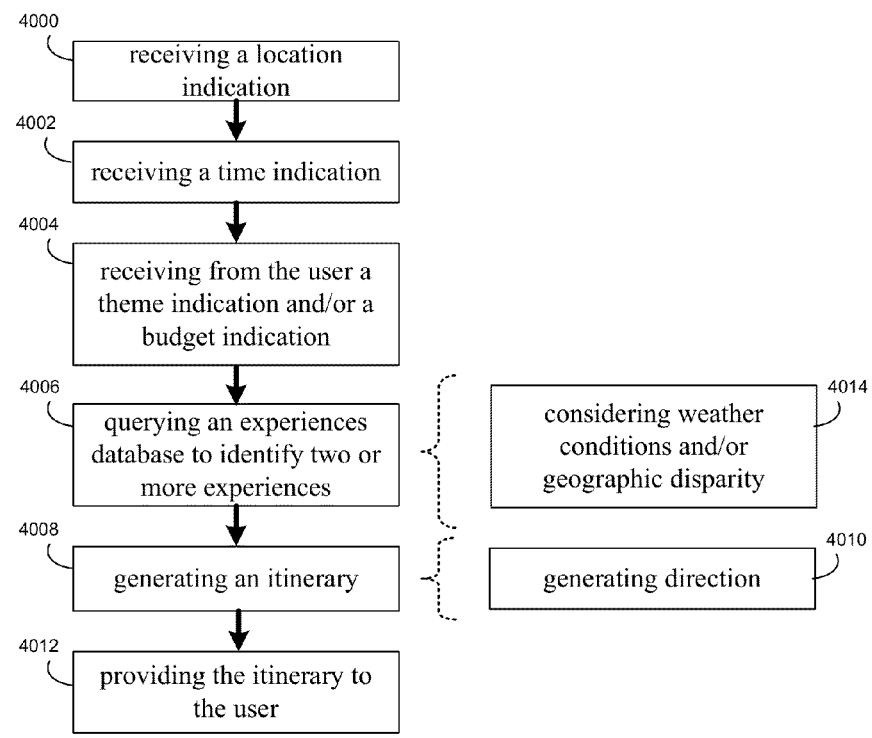
FIG. 46 is a diagrammatic view of a flowchart depicting operations consistent with an embodiment of the experience social networking process of FIG. 1.
Figure 47:
FIG. 47 is a diagrammatic view of an itinerary rendered by the experience social networking process of FIG. 1.

Referring also to FIGS. 46 & 47, experience social networking process 10 may be further configured to allow for the generation of an itinerary for e.g. user 36. For example, search window 3900 may be configured to include "generate itinerary" button 3920 that may result in the generation of itinerary 4100. For example, experience social networking process 10 may be configured to receive 4000 a location indication from user 36 concerning a chosen location for potential experiences. This location indication may be defined by user 36 within location field 3910 of search window 3900 and may be based on the current location of user 36 or a future location of user 36 (e.g., a planned vacation).

Additionally, experience social networking process 10 may be configured to receive 4002 a time indication. This time indication may be defined by user 36 within duration field 3906 of search window 3900. When defining an itinerary, the above-referenced time indication would typically be a time frame. For example, duration field 3906 is shown to define "full day".

Additionally, experience social networking process 10 may receive additional data points from user 36. For example, experience social networking process 10 may receive 4004 from user 36 a theme indication (concerning a desired theme for the potential experiences) and/or a budget indication (concerning a requested budget for the potential experiences). Such a themes may be defined within mood field 3908, examples of which may include energetic, relaxing, scary, or funny. Cost field 3902 within search window 3900 is shown to define the budget as "$$$", wherein this budget may be middle-of-the-road with "$" being the lowest budget and "$$$$$" being the highest budget. Additionally, user 36 may provide experience social networking process 10 with additional indications through the use of age field 3904; season field 3912; weather field 3914; and time/date field 3916.

Upon user 36 selecting "generate itinerary" button 3920, experience social networking process 10 may query 4006 experience database 100 to identify two or more experiences (and their related experience data cards) that may be sequentially performed within the defined time period (i.e., "full day" as defined within field 3906) at the chosen location ("New York City" as defined within field 3910). Experience social networking process 10 may generate 4008 itinerary 4100 for user 36 based, at least in part, upon the two or more experiences defined above. When generating 4008 itinerary 4100, experience social networking process 10 may generate 4010 directions to each of the two or more experiences (to be discussed below in greater detail).

Experience social networking process 10 may provide 4012 itinerary 4100 to user 36 by e.g. rendering itinerary 4100 on display 54 included within client electronic device 28.

For example, assume that user 36 is visiting New York City for a day with his family and that he defines the various fields included within search window 3900 in the manner discussed above. Upon selecting "generate itinerary" button 3920, experience social networking process 10 may generate 4008 itinerary 4100 for user 36. Assume for illustrative purposes that at the time itinerary 4100 was generated, user 36 and his family were in Central Park. In this particular example, itinerary 4100 defines three experiences for user 46 and his family (plus two transportation experiences). For example, as user 36 and his family are already in Central Park, itinerary 4100 recommends that user 46 and his family visit the Central Park Zoo from 8:00 a.m.-11:00 a.m. From 11:00 a.m. to 12:00 a.m., itinerary 4100 recommends that user 36 and his family travel to South Street Seaport.

Experience social networking process 10 may be configured to consider 4014 various conditions when generating itinerary 4100, such as geographic disparity between experiences and weather conditions.

If experience social networking process 10 interfaces with an external mapping/direction service, experience social networking process 10 may provide user 36 with e.g. walking directions, driving directions, or mass transit directions between the experiences. Further, if experience social networking process 10 interfaces with a weather service, experience social networking process 10 may modify directions based upon the weather forecast. For example, when it is raining or very cold, experience social networking process 10 may not recommend walking from one experience to another experience or travelling on a boat.

Upon arriving at South Street Seaport, itinerary 4100 recommends that user 36 and his family take the Circle Line around Manhattan Island from 12:00 p.m. until 4:00 p.m. Upon returning to South Street Seaport, itinerary 4100 recommends that user 36 and his family travel to CitiField in Queens to watch a New York Mets baseball game from 6:00 p.m. to 10:00 p.m. Accordingly, through the use of experience social networking process 10, a visitor to a city that they are not familiar with may quickly have a custom itinerary generated for them.

Example System 15

It may be desirable for the above-described system to allow a user to check into the various experiences associated with the "cards" included within the experience database. For example, if the experience is trying the twin lobster tail at a certain waterfront San Francisco seafood restaurant, a user may "check in" to that experience upon dining there and trying the twin lobster tail. When checking in, the user may add a photo (e.g., of the Bay or a pair of lobster tails) and may provide commentary (e.g., "Better than 1 ever thought lobster could be").

Figure 48:
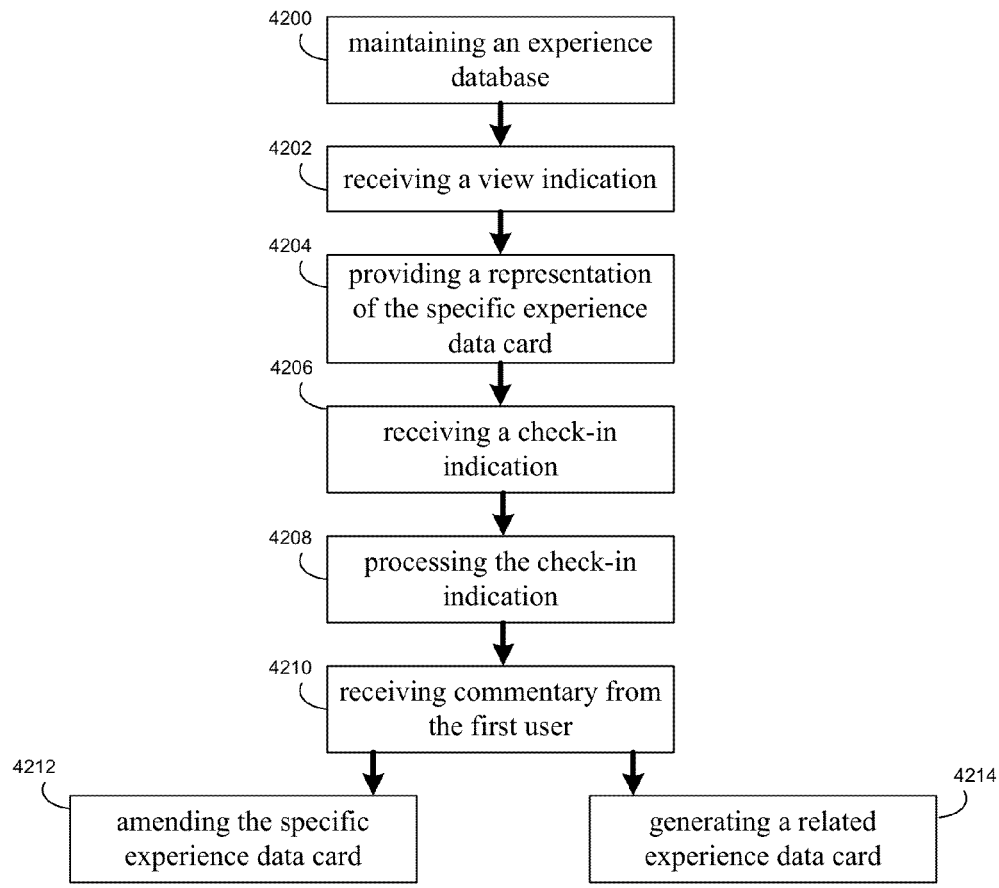
FIG. 48 is a diagrammatic view of a flowchart depicting operations consistent with an embodiment of the experience social networking process of FIG. 1.
Figure 49:
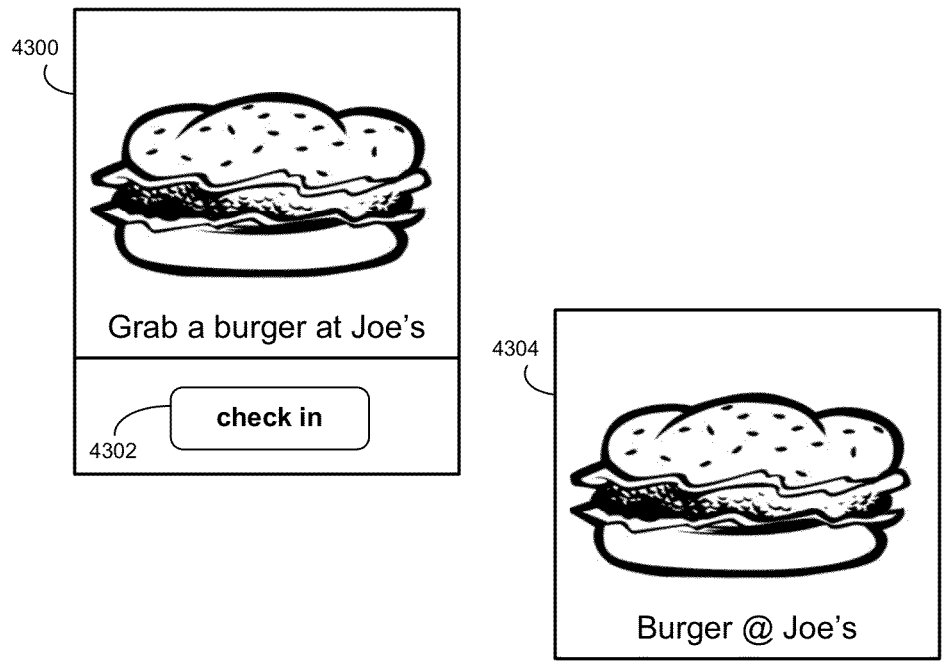
FIG. 49 is a diagrammatic view of two experience data cards rendered by the experience social networking process of FIG. 1.

As discussed above and referring also to FIGS. 48-49, experience social networking process 10 may be configured to maintain 4200 experience database 100. As discussed above, experience database 100 may include a plurality of experience data cards (e.g. experience data cards 102, 104, 106, 108, 110, 112, 114, 116, 118, 120, 122) that are each associated with an experience and are each accessible by users of experience database 100.

Further, one or more of the experience data cards included within experience database 100 may include availability criteria. For example, the availability criteria defined within an experience data card may define one or more prerequisite experience data cards. For example, if the experience data card in question concerned a technically complex dive, that experience data card may require that a user check in to an experience data card for a less technically complex dive first. Accordingly, in the event that the particular user doing the searching did not check into the prerequisite experience data card (i.e., the less technically complex dive), the experience data card in question (i.e., the more technically complex dive) may not appear in any query result sets until the user checks into the prerequisite experience data card.

As discussed above, one or more of users 36, 38, 40, 42 may cycle through and review the various experience data cards included within experience database 100 using a client electronic device (e.g. data-enabled, cellular telephones 28, 30, personal digital assistant 32, personal computer 34 (respectively)). Accordingly, one or more of users 36, 38, 40, 42 may wish to view an experience data card and may indicate their desire concerning the same, which may be the result of executing a query that produced a result set that included the experience data card in question.

Accordingly, experience social networking process 10 may receive 4202 a view indication from e.g., user 36 concerning a request to view experience data card 4300 included within experience database 100. Accordingly and in response to the same, experience social networking process 10 may provide 4204 user 36 with a representation of experience data card 4300, which may be rendered on display 54 included within client electronic device 28.

Further assume for illustrative purposes that when a user (e.g., user 36) reviews experience data card 4300, user 36 wishes to "check in" to the experience defined within experience data card 4300 (namely grabbing a burger at Joe's). Accordingly, the user (e.g., user 38) may select (via on-screen pointer 130 or a hand gesture) "check in" button 4302 to generate a check in indication. The check in indication may include a temporal indicator (date/time of check in) and a location indicator (location of check in). Upon experience social networking process 10 receiving 4206 a check in indication from the user (e.g., user 36) concerning checking in to experience data card 4300, the check-in indication received 4206 from the user may be processed 4208 by experience social networking process 10.

Commentary may be received 4210 (in the manner discussed above and shown in FIG. 5) from the user (e.g., user 36) concerning the experience associated with experience data card 4300 and experience social networking process 10 may amend 4212 experience data card 4300 to include the commentary received from the user (e.g., user 36). As discussed above and for this disclosure, the commentary may include any commentary that may be provided by users (e.g., text-based information; photo-based information; video-based information; audio-based information; ratings; symbols; colors; and mood indicators). Alternatively, experience social networking process 10 may generate 4214 related experience data card 4304 that is associated with experience data card 4300 (in the manner described above and illustrated in FIG. 30), wherein related experience data card 4304 includes the commentary received from the user (e.g., user 36). Such a related experience data card may function as a sub-card that is related to and linked to experience data card 4300.

While in this particular example, the original generator of experience data card 4300 is not defined, it is understood that experience data card 4300 may be generated by the same user that checked into experience data card 4300 (e.g., user 36) or by a different user than checked into experience data card 4300 (e.g., user 38). Accordingly, the same user or different users may create, query, and view the experience data cards).

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer implemented method comprising:
   receiving, by at least one of one or more computing devices, an indication of an experience search by a first user to be performed on an experience database including experience data documenting experiences that have occurred with respect to a plurality of users, wherein the experience search by the first user defines one or more search criteria and is associated with one or more extrinsic conditions;
   searching, by at least one of the one or more computing devices, the experience database based, at least in part, upon the one or more search criteria defined by the first user to generate a result set including certain of the plurality of experience data cards, wherein each of the certain of the plurality of experience data cards includes a digital representation having one or more images used to document a respective user's experience;
   sequencing, by at least one of the one or more computing devices, the certain of the plurality of experience data cards based at least in part upon the extrinsic conditions, and generating, by at least one of the one or more computing devices, a sequence result set based at least in part on the sequenced experience data cards wherein the sequence result set includes an experience data card created by a second user; and
   determining a social affinity between the first user and the second user in a social network; and
   responsive to determining that the first user and the second user are directly connected in the social network, presenting, by at least one of the one or more computing devices, at least a portion of the sequence result set to the first user the portion of the sequence result set presented to the first user including the experience data card created by the second user documenting the second user's experience that has occurred relating to the search criteria defined by the first user.

2. The computer-implemented method of claim 1, wherein the extrinsic conditions include one or more of a weather condition and a temperature condition.

3. The computer-implemented method of claim 1, wherein the extrinsic conditions include one or more of a mood, a theme, and a time of year.

4. The computer-implemented method of claim 1, wherein the extrinsic conditions include one or more of a geographic location and an expiration date.

5. The computer-implemented method of claim 1, wherein the extrinsic conditions include one or more of an experience rating and experience partners.

6. The computer-implemented method of claim 1, further comprising:
    providing, by at least one of the one or more computing devices, the first user with an option to create a comment associated with an experience of the sequence result set.

7. The computer-implemented method of claim 6, wherein the method further comprises storing the comment from the first user in the experience database in association with the sequence result set.

8. The computer-implemented method of claim 1, wherein presenting at least the portion of the sequence result set is based upon, at least in part, a popularity metric.

9. The computer-implemented method of claim 1, wherein the extrinsic conditions include a time of day.

10. The computer-implemented method of claim 8, wherein the popularity metric is based upon, at least in part, a gross rating from all users of the experience database.

11. The computer-implemented method of claim 8, wherein the popularity metric is based upon, at least in part, the social affinity associated with the first user.

12. A computing system comprising: at least one processor; at least one memory architecture coupled with the at least one processor; one or more software modules executed on the at least one processor and the at least one memory architecture, wherein the one or more software modules are configured to perform operations including
    receiving, by at least one of one or more computing devices, an indication of an experience search by a first user to be performed on an experience database including experience data documenting experiences that have occurred for a plurality of users and presented as a plurality of experience data cards, wherein the experience search defines one or more search criteria and is associated with one or more extrinsic conditions;
    searching, by at least one of the one or more computing devices, the experience database based, at least in part, upon the one or more search criteria defined to generate a result set including certain of the plurality of experience data cards, wherein each of the certain of the plurality of experience data cards includes a digital representation having one or more images used to document a respective user's experience that has occurred;
    sequencing, by at least one of the one or more computing devices, the certain of the plurality of experience data cards based at least in part upon the extrinsic conditions, and generating, by at least one of the one or more computing devices, a sequence result set based at least in part on the sequenced experience data cards wherein the sequence result set includes an experience data card created by a second user that documents an experience that has occurred for the second user relating to the one or more search criteria defined by the first user; and
    determining a social affinity between the first user and the second user in a social network; and
    responsive to determining that the first user and the second user are directly connected in the social network, presenting, by at least one of the one or more computing devices, at least a portion of the sequence result set to the first user, the portion of the sequence result set presented to the first user including the experience data card created by the second user documenting the second user's experience that has occurred relating to the search criteria defined by the first user.

13. The computing system of claim 12, wherein the extrinsic conditions include one or more of a weather condition and a temperature condition.

14. The computing system of claim 12, wherein the extrinsic conditions include one or more of a mood, a theme, and a time of year.

15. The computing system of claim 12, wherein the extrinsic conditions include one or more of a geographic location and an expiration date.

16. The computing system of claim 12, wherein the extrinsic conditions include one or more of an experience rating and experience partners.

17. The computing system of claim 12, wherein operations further comprise:
    providing the first user with an option to create a comment associated with an experience of the sequence result set.

18. The computing system of claim 17, wherein the comment is stored in the experience database.

19. The computing system of claim 12, wherein presenting at least the portion of the sequence result set is based upon, at least in part, a popularity metric.

20. The computing system of claim 12, wherein the extrinsic conditions include a time of day.

21. The computing system of claim 19, wherein the popularity metric is based upon, at least in part, a gross rating from all users of the experience database.

22. The computing system of claim 19, wherein the popularity metric is based upon, at least in part, the social affinity associated with the first user.

23. A computer program product residing on a non-transitory computer readable storage medium having a plurality of instructions stored thereon, which when executed by a processor, cause the processor to perform operations comprising:
    receiving, by at least one of one or more computing devices, an indication of an experience search by a first user to be performed on ~ an experience database including experience data documenting experiences of a plurality of users, wherein the experience search defines one or more search criteria and is associated with one or more extrinsic conditions;
    searching, by at least one of the one or more computing devices, the experience database based, at least in part, upon the one or more search criteria defined to generate a result set including certain of the plurality of experience data cards, wherein each of the certain of the plurality of experience data cards includes a digital representation having one or more images used to document at least one user's experience;
    sequencing, by at least one of the one or more computing devices, the certain of the plurality of experience data cards based at least in part upon the extrinsic conditions, and generating, by at least one of the one or more computing devices, a sequence result set based at least in part on the sequenced experience data cards wherein the sequence result set includes an experience data card created by a second user;

determining a social affinity between the first user and the second user in a social network; and responsive to determining that the first user and the second user are directly connected in the social network, presenting, by at least one of the one or more computing devices, at least a portion of the sequence result set to the first user the portion of the sequence result set presented to the first user including the experience data card created by the second user documenting the second user's experience that has occurred relating to the search criteria defined by the first user.

24. The computer program product of claim 23, wherein the extrinsic conditions include one or more of a weather condition and a temperature condition.

25. The computer program product of claim 23, wherein the extrinsic conditions include one or more of a mood, a theme, and a time of year.

26. The computer program product of claim 23, wherein the extrinsic conditions include one or more of a geographic location and an expiration date.

27. The computer program product of claim 23, wherein the extrinsic conditions include one or more of an experience rating and experience partners.

28. The computer program product of claim 23, wherein operations further comprise:

providing, by at least one of the one or more computing devices, the first user with an option to create a comment associated with an experience of the sequence result set.

29. The computer program product of claim 28, wherein the comment is stored in the experience database.

30. The computer program product of claim 23, wherein presenting at least the portion of the sequence result set is based upon, at least in part, a popularity metric.

31. The computer program product of claim 23, wherein the extrinsic conditions include a time of day.

32. The computer program product of claim 30, wherein the popularity metric is based upon, at least in part, a gross rating from all users of the experience database.

33. The computer program product of claim 30, wherein the popularity metric is based upon, at least in part, the social affinity associated with the first user.

* * * * *